(12) United States Patent
Karino et al.

(10) Patent No.: US 8,555,295 B2
(45) Date of Patent: Oct. 8, 2013

(54) CLUSTER SYSTEM, SERVER CLUSTER, CLUSTER MEMBER, METHOD FOR MAKING CLUSTER MEMBER REDUNDANT AND LOAD DISTRIBUTING METHOD

(75) Inventors: Shuichi Karino, Tokyo (JP); Masahiro Jibiki, Tokyo (JP)

(73) Assignee: NEC Corporation, Tokyo (JP)

( * ) Notice: Subject to any disclaimer, the term of this patent is extended or adjusted under 35 U.S.C. 154(b) by 1251 days.

(21) Appl. No.: 12/307,656

(22) PCT Filed: Jul. 4, 2007

(86) PCT No.: PCT/JP2007/063346
§ 371 (c)(1),
(2), (4) Date: Jan. 6, 2009

(87) PCT Pub. No.: WO2008/004569
PCT Pub. Date: Jan. 10, 2008

(65) Prior Publication Data
US 2009/0204981 A1    Aug. 13, 2009

(30) Foreign Application Priority Data

Jul. 6, 2006 (JP) .................................. 2006-186503
Dec. 8, 2006 (JP) .................................. 2006-331798

(51) Int. Cl.
G06F 9/54 (2006.01)

(52) U.S. Cl.
USPC ......................................... 719/328; 709/224

(58) Field of Classification Search
CPC ................... H04L 29/08747; H04L 29/08738; G06F 11/3096
See application file for complete search history.

(56) References Cited

U.S. PATENT DOCUMENTS

| 5,961,606 | A * | 10/1999 | Talluri et al. ................... 709/234 |
| 2002/0194340 | A1* | 12/2002 | Ebstyne et al. ............... 709/226 |
| 2005/0185646 | A1* | 8/2005 | Karino et al. ................. 370/389 |
| 2007/0203944 | A1* | 8/2007 | Batra et al. .................. 707/104.1 |

FOREIGN PATENT DOCUMENTS

| JP | 58-189745 A | 11/1983 |
| JP | 1983189745 A | 11/1983 |
| JP | 61-039656 A | 2/1986 |
| JP | 1986039656 A | 2/1986 |
| JP | 62-238655 A | 10/1988 |

(Continued)

OTHER PUBLICATIONS

International Search Report for PCT/JP2007/063346 mailed Sep. 25, 2007.

(Continued)

*Primary Examiner* — Andy Ho
*Assistant Examiner* — Brian W Wathen

(57) ABSTRACT

A protocol process to a reception traffic is executed by cluster members of a current use system and a backup system. The backup system discards the reception traffic subjected to the protocol process and only the current use system transfers the reception traffic to an AP. The AP makes an application process redundant in an independent method. The cluster member in charge of the protocol process to the reception traffic is determined by using a data in a lower layer and the cluster member in charge of the application process is determined by using a data in a higher layer after the protocol process.

62 Claims, 60 Drawing Sheets

(56) References Cited

FOREIGN PATENT DOCUMENTS

| JP | 1988238655 A | 10/1988 |
|---|---|---|
| JP | 3-36853 A | 2/1991 |
| JP | 7-87536 A | 3/1995 |
| JP | 08-180030 A | 7/1996 |
| JP | 1996180030 A | 7/1996 |
| JP | 2000-83045 A | 3/2000 |
| JP | 2003517221 A | 5/2003 |

OTHER PUBLICATIONS

International Preliminary Report on Patentability for PCT/JP2007/063346 issued Jan. 20, 2009.

* cited by examiner

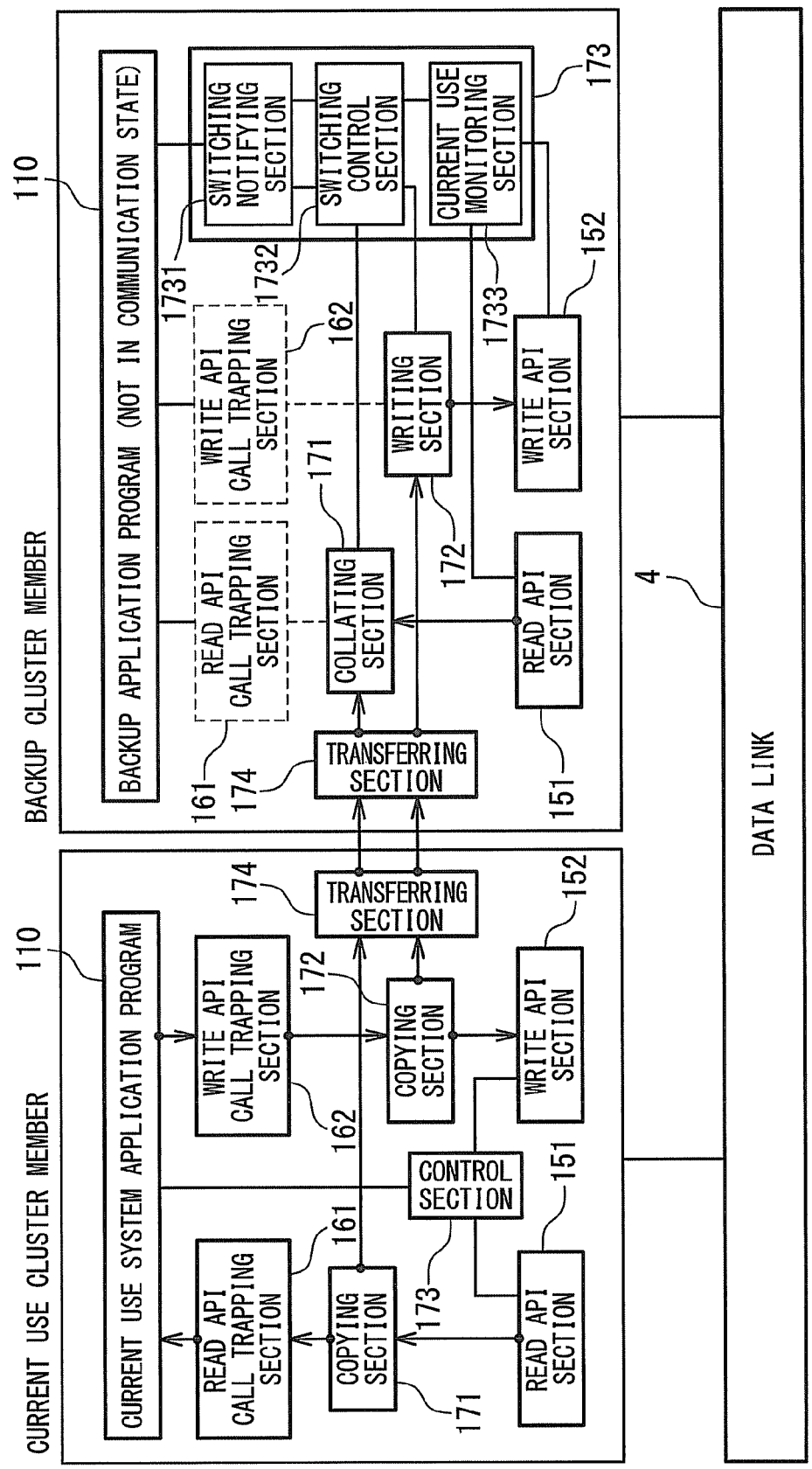

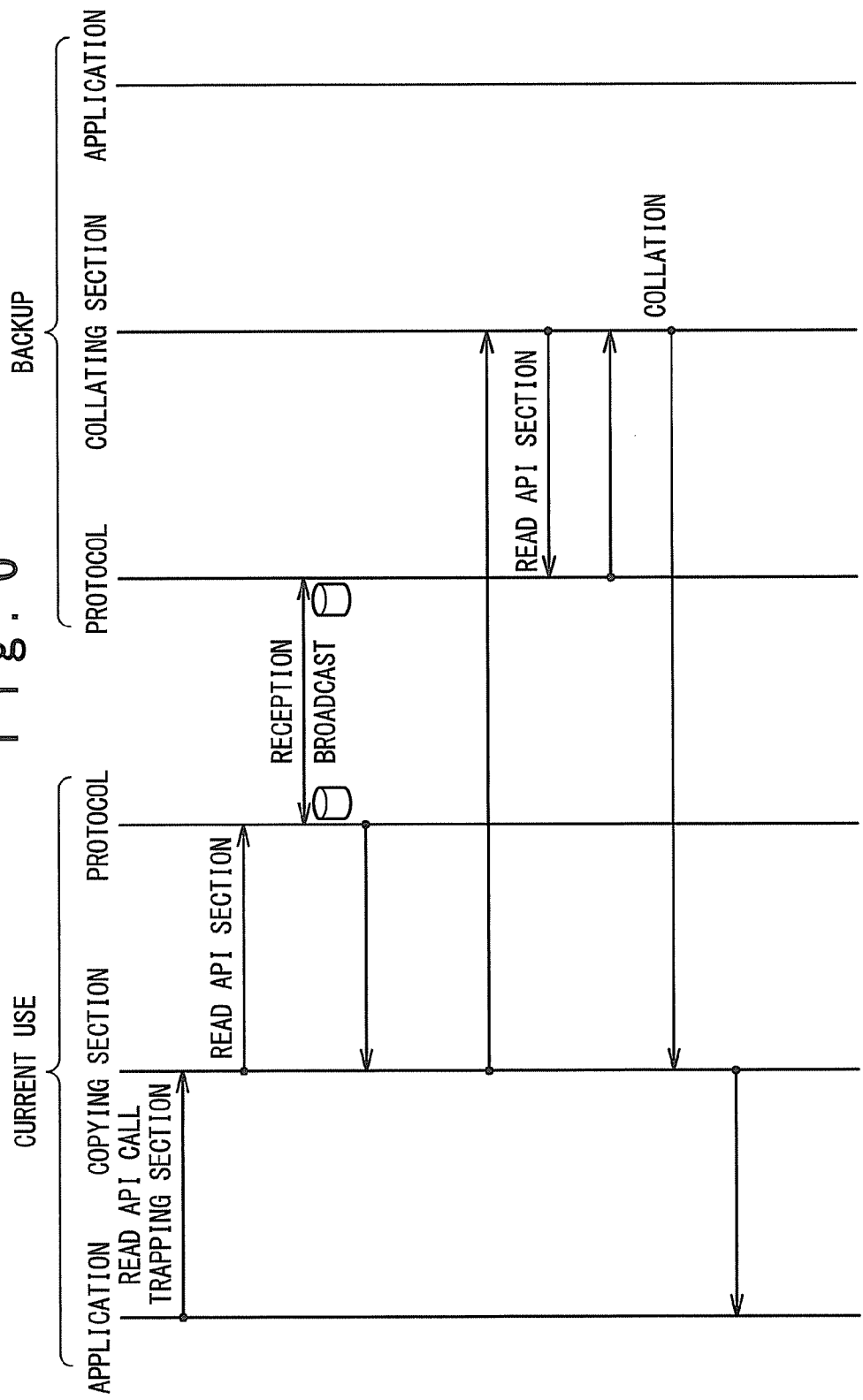

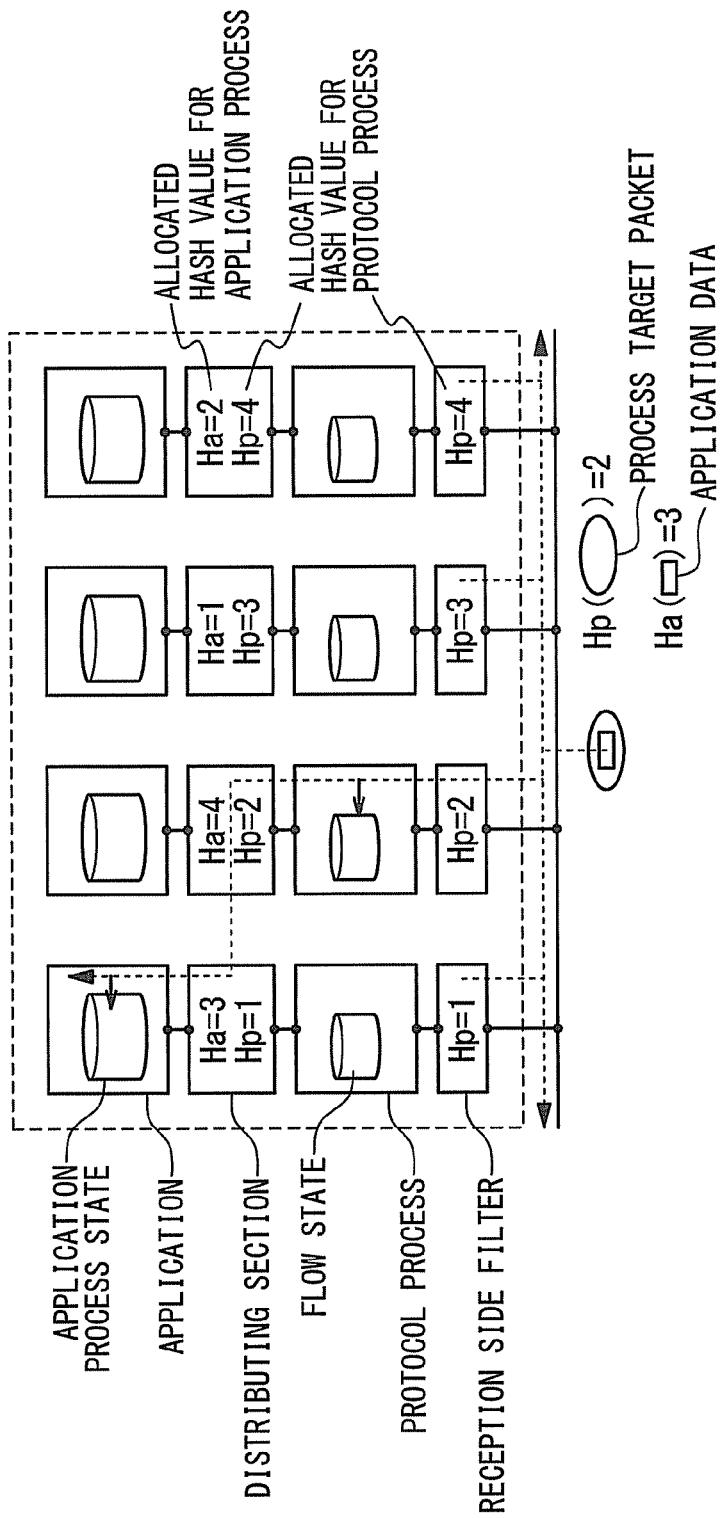

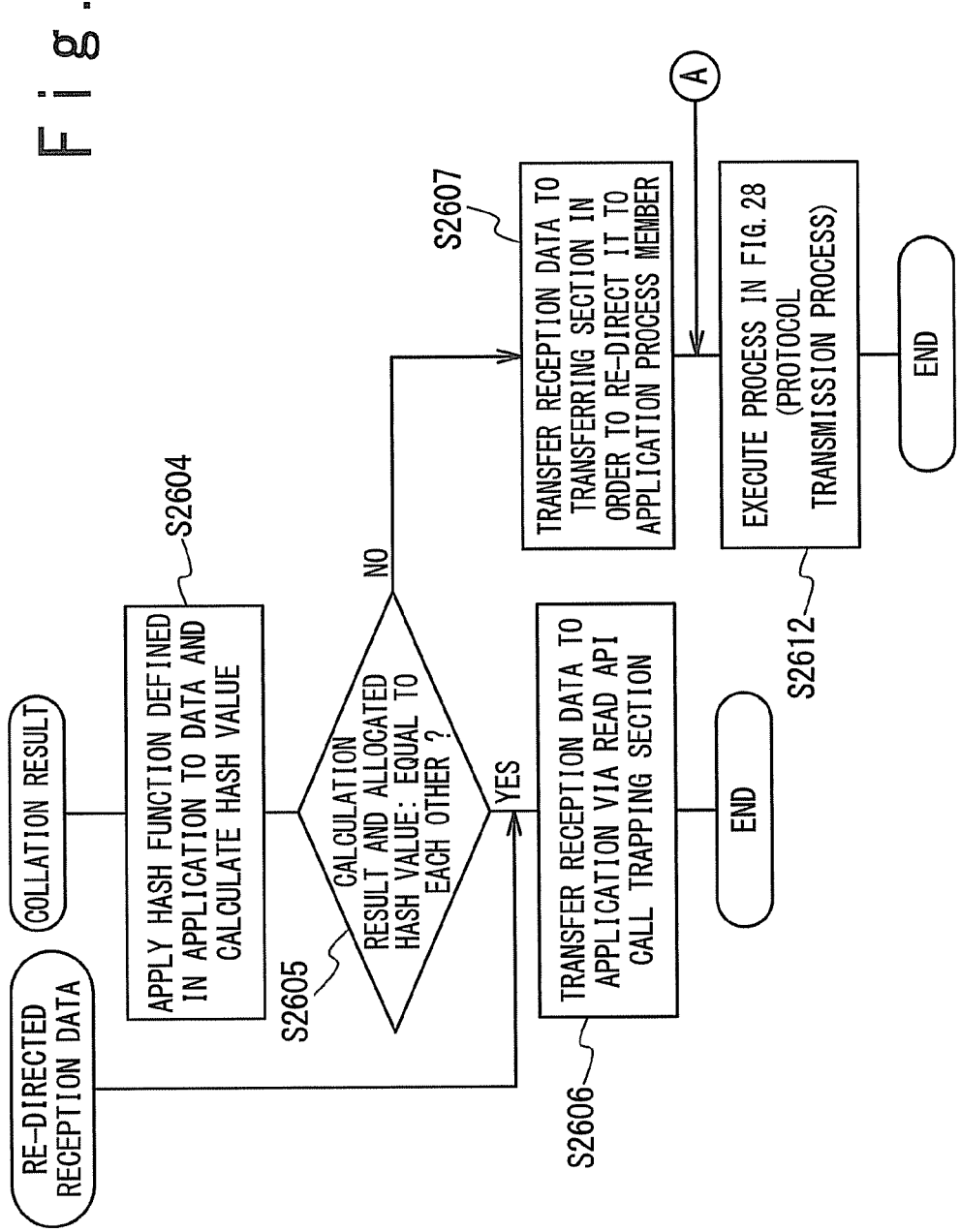

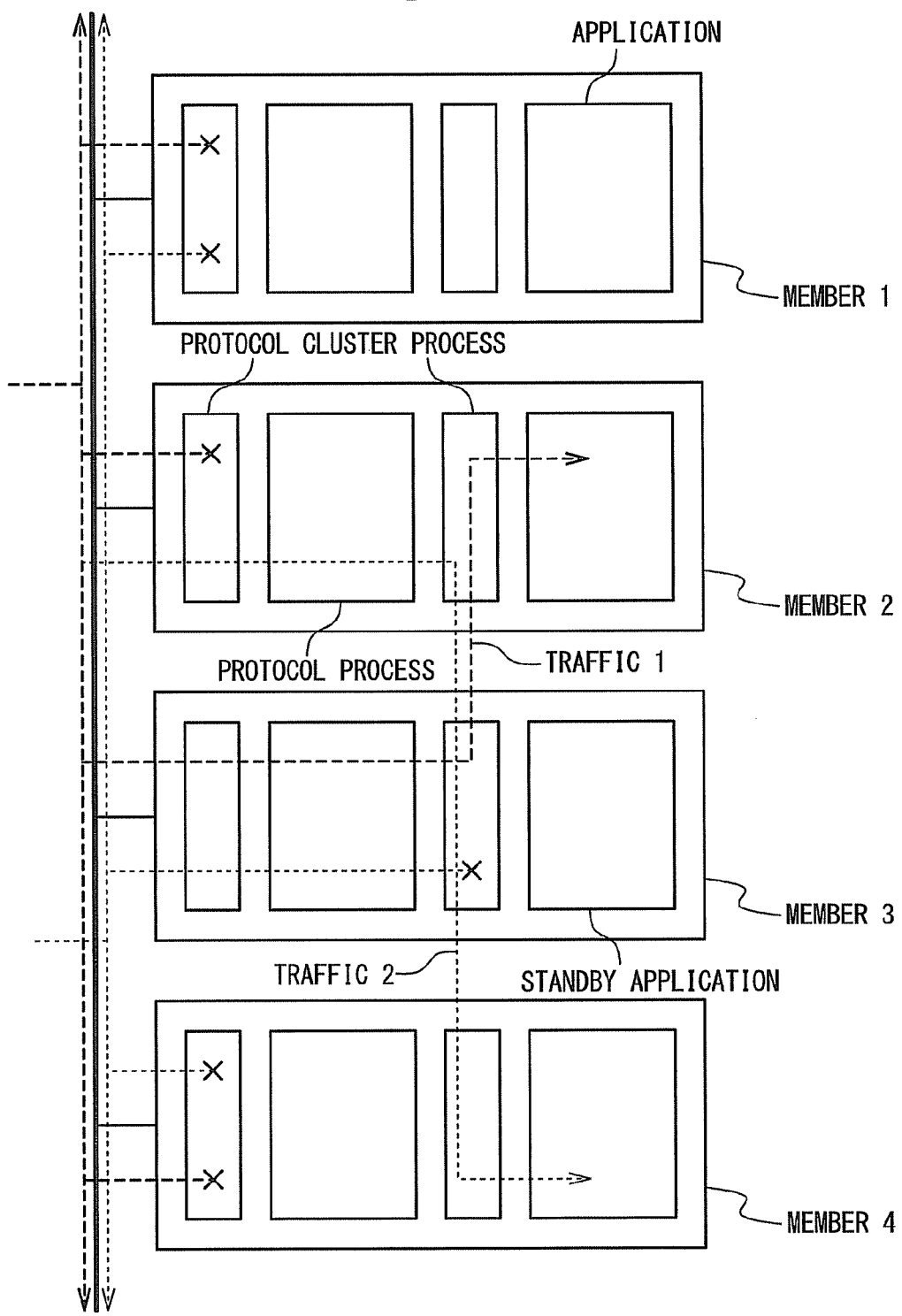

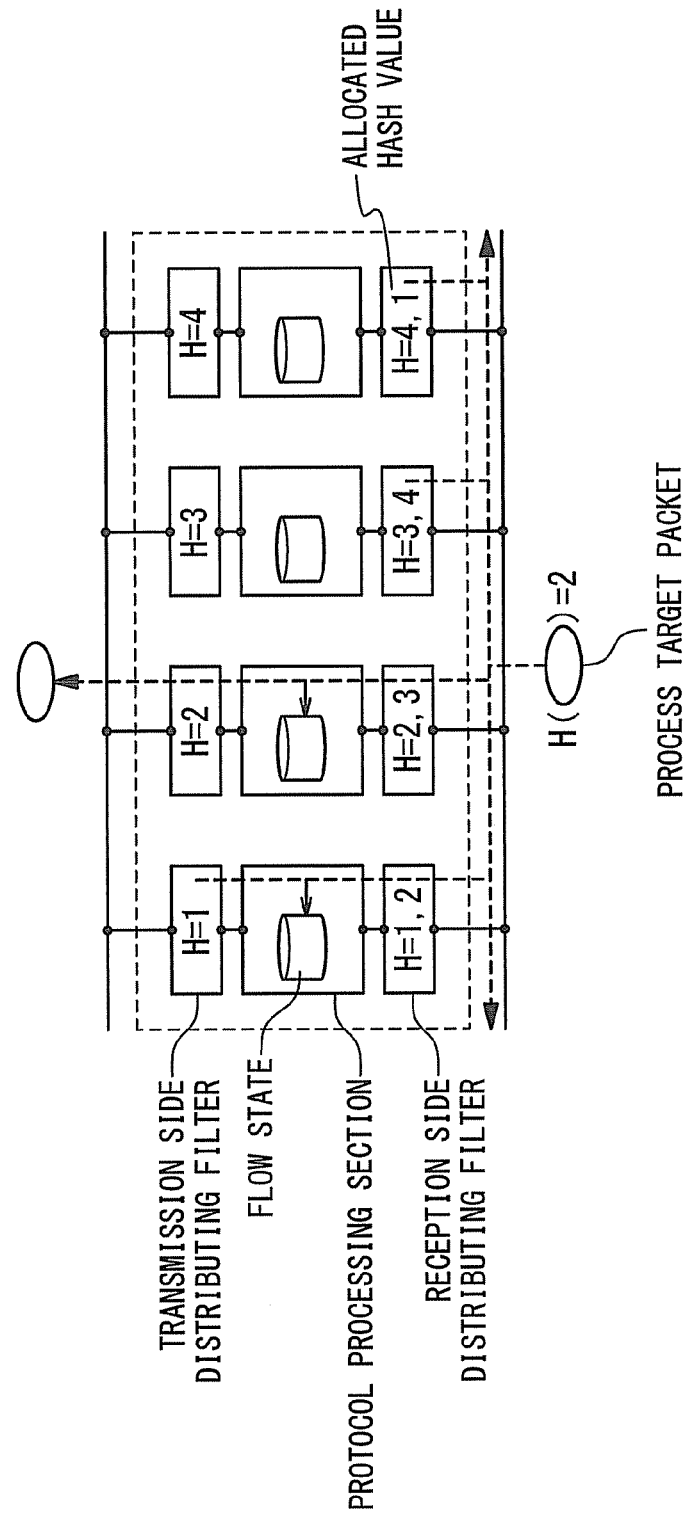

CLUSTER SYSTEM, SERVER CLUSTER, CLUSTER MEMBER, METHOD FOR MAKING CLUSTER MEMBER REDUNDANT AND LOAD DISTRIBUTING METHOD

This application is the National Phase of PCT/JP2007/063346, filed Jul. 4, 2007, which claims priority to Japanese Application No. 2006-0186503 filed Jul. 6, 2008 and Japanese Application No. 2006-331798, filed Dec. 8, 2006.

TECHNICAL FIELD

The present invention relates to a cluster system functioning as network equipment, and particularly a cluster system functioning as network equipment in which an application program is executed inside.

BACKGROUND ART

The cluster system has been conventionally used as:

(a) means adapted to construct a large-scale device which provides a single function; and (b) means adapted to construct a device with high availability.

In general, a cluster system includes a plurality of apparatuses (i.e. cluster members) capable of realizing a predetermined function even if each of them is used as a single apparatus, and an additional mechanism to make each of the cluster members to cooperate.

[Cluster System Using Load Balancer]

Although various methods are known to constitute a cluster system, a configuration in which a load balancer is placed in the boundary with another system has been used in a relatively wide. FIG. 30 shows a configuration of a cluster system 1 using a load balancer. The cluster system 1 is provided with a plurality of cluster members 11-1 to 11-$n$ and a load balancer 12. IP packets (i.e. communication data) transmitted from nodes 31 to 3$m$ via a network 2 are distributed to the cluster members 11-1 to 11-$n$ by the load balancer 12.

The cluster system 1 shown in FIG. 30 has an advantage in that events such as an apparatus configuration in a rear stage and a failover can be concealed to other systems by using the load balancer 12 and control of a load balance can be easily carried out. On the other hand, the system has a possibility that the load balancer 12 becomes a bottleneck. If the load balancer 12 is made redundant to prevent the load balancer 12 from becoming a single-point failure, the configuration becomes complicated.

[Cluster System in Broadcast Dispatch System]

In order to solve the above drawbacks, a cluster system is proposed in which the load balancer is not provided (i.e. broadcast dispatch system) (e.g. to be referred to Japanese Patent Application Publication (JP-P2003-517221A).

FIG. 31 is a block diagram showing a configuration example of a cluster system 1$a$ in the broadcast dispatch system. The cluster system 1$a$ includes n cluster members 13-1 to 13$n$. Each of the cluster members 13-1 to 13-$n$ is connected in parallel to a data link 4 which can broadcast data. The cluster members 13-1 to 13-$n$ are provided with distributing filters 14-1 to 14-$n$, respectively.

IP packets transmitted from other nodes 31 to 31$m$ to the cluster system 1$a$ are broadcasted to the cluster members 13-1 to 13-$n$ via the data link 4. Each of the cluster members 13-1 to 13-$n$ calculates a hash value of the IP packet broadcasted by the distributing filters 14-1 to 14-$n$ (e.g. hash value to a transmission source address included in a header section), and executes a receiving process to the received IP packet only if the calculated hash value is equal to a corresponding hash value allocated to its own cluster member. The IP packets transmitted from the other nodes 31 to 31$m$ are broadcasted to all the cluster members 13-1 to 13-$n$ in the cluster system 1$a$ of the broadcast dispatch system. Each of the cluster members 13-1 to 13-$n$ processes only an IP packet corresponding to a hash value allocated to its own cluster member. Thus, load balance is realized.

Furthermore, if an identical hash value is allocated to two or more cluster members in the cluster system of the broadcast dispatch system, the identical IP packet is processed by the cluster members redundantly. Accordingly, a communication redundancy process can be carried out without explicitly making a copy of a state. Thus, it is made possible to enhance scalability and availability.

Meanwhile, the cluster system of the broadcast dispatch system has been developed for apparatuses such as a router to relay a packet. These apparatuses are characterized in that a process to the packet remains in a relatively low protocol layer, and many of the apparatuses can relay the packet at high speed in a relatively simple process since a process in an application layer to the packet is not executed.

FIG. 32 is a block diagram showing a configuration example of the cluster member 13-1 shown in FIG. 31, and FIGS. 33A and 33B are provided to describe an operation of the cluster system 1$a$ shown in FIG. 31.

Referring to FIG. 32, the cluster member 13-1 is provided with a reception interface 141 and a transmission interface 142 which are connected to the data link 4 for communication with an adjacent node, protocol processing section 121, 122, . . . , and 12$k$ for processing and transferring a packet, two packet filters of a reception side distributing filter 131 and a transmission side distributing filter 132, and a filter control section 133 for setting the filters 131 and 132.

Each of the filters 131 and 132 calculates an integer value from a packet header by using a hash function and allows the packet to pass therethrough only when an integer value allocated to the filter 131 or 132 by the filter control section 133 is equal to the integer value obtained from the calculation result. In the examples shown in FIGS. 33A and 33B, four cluster members are provided to use four kinds of hash values 1 to 4, for simplification.

If an identical hash value is set to the reception side distributing filters of different cluster members by using this mechanism, an identical packet is processed redundantly in these cluster members. Traffic corresponding to the hash value is therefore processed redundantly. The hash value is set to the transmission side distributing filter in only one of the above cluster members in order to prevent an identical packet from being transmitted to the outside of the system. For example, in the example of FIG. 33A, it would be understood that traffic corresponding to a hash value 2 is processed redundantly by the cluster member on the left end and the cluster member on the right side, to duplicate a flow state.

Moreover, if sets of values in a value range of a hash function are allocated to the reception side distributing filters such that the cluster members deal with them without any gap and duplication, a load balance of the traffic can be realized. For example, the configurations of FIGS. 33A and 33B are same and cluster members are switched depending on a hash value calculated from a process target packet to realize the load balance. These cluster members are used in combination to realize a broadcast router cluster.

Other related techniques are exemplified as following. Japanese Patent Application Publication (JP-P2000-83045A) discloses a route control technique that provides a technique to constitute a router with high extension ability corresponding to the needs of increase in lines of a router due to enlargement of a network in size. Japanese Patent Application Publication (JP-A-Heisei 3-36853) discloses a call control method in an ISDN terminal apparatus and an ISDN terminal in which a software configuration in an application section is simplified and a call control for call origination and call arrival are made possible in high performance. Japanese Patent Application Publication (JP-A-Heisei 7-87536) discloses a virtual line concentration system in a switch. In this system, a control function for a subscriber line concentrator which is disposed within the same switch or outside of the switch is concealed in a common function so as for a call control application not to be conscious of presence or absence of a line concentration function.

DISCLOSURE OF INVENTION

By the way, in apparatuses such as a server which terminates communication as a host node, packets are processed which are usually transmitted and received by an application program. More specifically, in a host node H as shown in FIG. 34, a packet transmitted and received via a reception interface 141, a transmission interface 142, a protocol processing sections 121, 122, . . . , and 12k, a read API (Application Programming Interface) section 151 and a write API section 152 is processed by an application program 110. When an apparatus having the above application program 110 running thereon is clustered, a system is conventionally employed in which a load balance is performed by a load balancer in accordance with policy of the application program 110 and a state is made redundant by the application program 110 independently. However, use of the load balancer causes a state that the load balancer may become a bottleneck, as described above.

Therefore, it could be considered that the apparatus with the application program running thereon is clustered by a broadcast dispatch system. However, in this case, the following problems would arise:

(1) there is a case that the load balancing and policies for redundancy are different between an application process and a protocol process; and (2) it is necessary to make complicated states of the application process redundant while sustaining consistency thereof.

That is, in the broadcast dispatch system, since a hash operation is applied to a header section of an IP packet immediately after receiving the IP packet, there is a case that a data in an upper layer cannot be used for traffic distribution. This is because the data is encrypted by TLS (RFC 2246, The TLS Protocol Version 1.0. January 1999) by T. Dierks and C. Allen, and IPsec ESP (RFC 4303, IP Encapsulating Security Payload (ESP), December 2005) by S. Kent, or the data in the upper layer is divided by IP fragmentation. Is such a case, it is sometimes difficult to realize traffic distribution according to the data in the upper layer.

For example, when a web server (i.e. HTTP) is constituted by a cluster system of the broadcast dispatch system, it requires many resources for the all of cluster members to hold all of the contents. As a countermeasure taken against the above problem, it could be considered to distribute the contents to the cluster members in accordance of identification data of the contents. However, since the identification data of each content is written in a HTTP request as URL, it is impossible to distribute traffic by using the identification data of the content. Accordingly, entire contents need to be held by each of the cluster members.

Moreover, in the protocol process, transmission confirmation and re-transmission are carried out in consideration of a data loss on a transmission path. Accordingly, even if a broadcasted packet is processed by different cluster members independently, large inconsistency does not cause in a protocol state of each of the cluster members in many cases. As described above, the broadcast dispatch system has good affinity to the protocol process.

In contrast, the application process has a complicated state, and a displacement of a process timing is easily generated due to process scheduling or the like in the execution environment of multiple processes such as UNIX®. Therefore, even if the same data is supplied, a state inconsistency easily occurs. Moreover, the application process is generally more complicated in implementation than the protocol process, and a possibility is high that a defect is triggered by specific reception data. In such a case, since reliability is not improved even if the broadcasted data is processed by a redundancy system, the broadcast dispatch system is inappropriate.

Therefore, a cluster system of the broadcast dispatch system is demanded is which can effectively support both of the application process and the protocol process.

By the way, the protocol processing sections 121, 122, . . . , and 12k and the reception side distributing filter 131 shown in FIGS. 32 and 34 are generally realized by a kernel of an OS (operating system), and the application program 110 also requests the OS to transmit and receive an IP packet by a system call. Accordingly, in order to satisfy the above request, for example, a new function needs to be incorporated into the OS to realize the above request. However, the incorporation of the new function requires a large change in the OS.

Therefore, an object of the present invention is to provide a cluster system of a broadcast dispatch system which can effectively support both of an application process and a protocol process without adding a large change to an OS.

A cluster system or a server cluster according to an example of the present invention includes a plurality of cluster members, and each of the plurality of cluster members includes: a protocol processing section configured to execute a protocol process; a communication API section configured to read data from the protocol processing section and write data in the protocol processing section depending on a kind of call; and a trapping section configured to trap a call to the communication API section from an application program operating on a self cluster member to call the communication API section instead of the application program, to execute a process determined depending on the kind of the call, to the data read from the protocol processing section by the communication API section based on the call or the data written into the protocol processing section by the communication API section based on the call, and to execute a process determined based on a kind of a data transmitted from another cluster member to the transmitted data.

A cluster system or a server cluster according to another example of the present invention includes a plurality of cluster members, and each of the plurality of cluster members operating as a current use system includes: a current use system protocol processing section configured to execute a protocol process; a current use system communication API section configured to read a data from the current use system protocol processing section in response to a read call and to write a data in the current use system protocol processing section in response to a write call; a current use system call trapping section configured to trap the read call or the write call from an application program operating on the self cluster member, to carry out the read call to the current use system communication API section instead of the application program when the read call is trapped, to transfer the data read from the current use system protocol processing section by the current use system communication API section in response to the read call to the application program, and to carry out the write call to the current use system communication API section instead of the application program when the write call is trapped; and a current use system transferring section configured to transfer a replica data of a write data to one cluster member of a backup system to the self cluster member when the current use system call trapping section traps the write call. The cluster member operating as a backup system of the plurality includes: a backup system protocol processing section configured to execute the protocol process; a backup system communication API section configured to read a data from the backup system protocol processing section in response to a read call and to write a data in the backup system protocol processing section in response to a write call; a backup system writing section configured to carry out the write call to the backup system communication API section when the replica data is transferred from the current use system transferring section such that the replica data is written in the backup system protocol processing section; and a discarding section configured to discard a reception data and a transmission data subjected to a protocol process by the backup system protocol processing section.

A cluster system or a server cluster according to still another example includes a plurality of cluster members, and each of the plurality of cluster members includes: a protocol processing section configured to execute a protocol process; a reception side distributing filter configured to transfer the reception packet to the protocol processing section when determining that the reception packet is the reception packet to be processed in the self cluster member, based on a predetermined protocol processing distribution rule; a communication API section configured to read a data from the protocol processing section in response to a read call and to write a write data in the protocol processing section in response to a write call; a call trapping section configured to trap the read call or the write call from an application program operating on a self cluster member, to carry out the read call to the communication API section instead of the application program when trapping the read call, to transfer a reception data to the application program when a data read from the protocol processing section by the communication API section in response to the read call is the reception data from another cluster member, to transfer a transmission data to the protocol processing section when being the transmission data from another cluster member, to transfer the data to an application process distributing section in a case other than the above cases, and to transfer the transmission data instructed by the trapped write call to a protocol process distributing section when trapping the write call; the application process distributing section configured to determine the cluster member in charge of an application process to the data transferred from the call trapping section based on a predetermined application process distribution rule, to transfer the data to the application program operating on the self cluster member when the determined cluster member is the self cluster member, and to transfer the data to a transferring section when the determined cluster member is another cluster member; the protocol process distributing section configured to determine the cluster member in charge of a protocol process to the data transferred from the call trapping section based on a predetermined protocol process distribution rule, to transfer the data to the protocol processing section on the self cluster member when the determined cluster member is the self cluster member, and to transfer the data to the transferring section when the determined cluster member is another cluster member; and the transferring section configured to transmit the data transferred from the application process distributing section and the protocol process distributing section to the other cluster member.

A cluster system or a server cluster according to a yet still another example of the present invention includes a plurality of cluster members, and a traffic is distributed by picking up a portion in charge by a self cluster member from traffic broadcasted to all of the plurality of cluster members and discarding a remaining portion. The cluster system or the server cluster includes (a) a reception side distributing filter configured to hold a calculation rule used to calculate an integer value from a predetermined section of a packet and an integer value allocated to the self cluster member provided between a reception interface and a protocol processing section of each cluster member. The reception side distributing filter calculates the integer value for every packet by using the calculation rule, and transfers the packet to a receiving process of the protocol processing section only when the calculation result is equal to the allocated integer value, an identical value is allocated to the reception side distributing filters of a current use system and a backup system, and distribution of the traffic and a redundant process of a protocol process are made possible by allocating a set of integer values as the calculation results obtained based on the calculation rule to the plurality of cluster members with no space. The cluster system further includes (b) a distributing and redundancy processing section configured to hold a calculation rule used to calculate an integer value from an application data contained in the reception packet and a distribution rule as a list of integer values allocated to the plurality of cluster members is provided between the application program and the protocol processing section of each cluster member. The distributing and redundancy processing section transfers a data to the cluster member allocated with the integer value which is calculated from the reception data based on the distribution rule, such that a reading process of the data is executed when the application program of the destination cluster member executes the reading process. In the cluster system or the server cluster, the distributing and redundancy processing section holds the calculation rule used to calculate an integer value by using the same rule as the reception side distributing filter from header information used for a transmitting process of the data written by the application program and the list of the integer values allocated for all of the plurality of cluster members, calculates the integer value based on the calculation rule used for the data written by the application program, to transfer a write data to a plurality of cluster members allocated with the integer value, and to make allocation of the cluster members to the application process and a redundant protocol process controllable independently. The cluster system or the server cluster further includes (c) a transmission side packet filter configured to discard a packet processed as a backup system cluster member is provided between a transmission side interface and the protocol processing section of each of the plurality of cluster members.

A cluster system or a server cluster according to another example of the present invention includes a plurality of cluster members, and a traffic is distributed by picking up a portion in charge by a self cluster member from the traffic broadcasted to all of the plurality of cluster members and discarding a remaining portion. The cluster system or the server cluster includes a transmission side distributing filter and a reception side distributing filter provided between a transmission interface and a reception interface and a protocol processing section of each cluster member, and configured to hold a calculation rule used to calculate an integer value from a predetermined section of a packet and an integer value allocated to the self cluster member. The reception side distributing filter calculates the integer value for every packet by using the calculation rule, and transfers the packet to a receiving process of the protocol processing section only when the calculation result is equal to the allocated integer value, and the transmission side distributing filter calculates the integer value for every packet transferred from the protocol processing section by using the calculation rule, and transfers the packet to the transmission interface only when the calculation result is equal to the allocated integer value. Further, an identical value is allocated to the reception side distributing filters of a current use system and a backup system, and a redundant process is made possible by distributing the value to the transmission side distributing filter of the current use system, and distribution of the traffic and the redundant process of a protocol process are made possible by allocating a set of integer values as the calculation results obtained based on the calculation rule to the plurality of cluster members with no space.

[Operation]

A cluster member is provided with a trapping section for trapping a call issued to a communication API section by an application program operating on its own cluster member. Upon trapping the call, the trapping section calls the communication API section in place of the application program. The trapping section carries out a process corresponding to a type of the call to a data read from a protocol processing section by the communication API section in response to the call and a data written into the protocol processing section by the communication API section in response to the call. The trapping section further executes a process corresponding to a type of data to the data transmitted from another cluster member. The trapping section can be provided outside of an OS which constitutes the protocol processing section. It is therefore made possible to provide a cluster system of the broadcast dispatch type which can effectively support both an application process and a protocol process without adding a change to the OS in a large scale.

When a cluster member is made redundant for example, a current use system call trapping section and a current use system transferring section are provided on one cluster member of a current use system as a trapping section which carries out the above processes. The current use system call trapping section traps a read call and a write call issued by an application program operating on its own cluster member. When the read call is trapped, the current use system call trapping section carries out the read call to an current use system communication API section in place of the application program, and the current use system communication API section transfers a data read from the current use system protocol processing section to the application program in response to the read call. When the write call is trapped, the current use system call trapping section carries out the write call to the current use system communication API section in place of the application program. When the write call is trapped, the current use system call trapping section further transfers a data copied from a write data to a cluster member in a backup system corresponding to its own cluster member in the current use system by using the current use system transferring section.

In contrast, a backup system writing section and a discarding section are provided as a trapping section on the cluster member in the backup system. When a replica data is transferred from the current use system transferring section, the backup system writing section carries out the write call to the backup communication API section in order to write the replica data in a backup protocol processing section. The discarding section discards a reception data and a transmission data subjected to the protocol process by the backup protocol processing section.

By employing such a configuration, an identical transmission traffic and reception traffic are processed by the protocol processing section in the current use system and backup systems, as shown in FIG. 29A, while data transmission and the transfer of reception data to the application program are carried out only by the current use system cluster member. The current use system protocol processing section and the backup system protocol processing section process the identical reception traffic and transmission traffic and the states are same.

It should be noted that a complicated state of the application program can be made redundant by a unique method of the application program. Redundancy can be realized by, for example, the following method:

1. the current use system application program receives some data from a counter communication apparatus;
2. the current use system application program determines an updated content of a control data from the received data, and notifies the updated content to the backup application program by using an inter-process communication and a shared memory;
3. the backup application program updates its own control data in accordance with a notice from the current use system and responds to the current use system application program to inform whether or not the data has been successfully updated;
4. the current use system application program updates its own control data upon successful data update in the backup application program; and
5. a response is returned to the counter communication apparatus when the above processes are properly completed.

In contrast, in case of realizing a load balance, a call trapping section, an application process distributing section, a protocol process distributing section and a transferring section are provided on a cluster member as a trapping section.

The call trapping section traps a read call and the write call issued by an application program operating on its own cluster member.

When the read call is trapped, the call trapping section carries out the read call to the communication API section in place of the application program. If a data read from the protocol processing section by the communication API section in response to the read call is a reception data transmitted from another cluster member, the call trapping section transfers the read data to the application program. If the data read by the communication API section is a transmission data transmitted from the other cluster member, the call trapping section transfers the read data to the protocol processing section. In other cases, the call trapping section transfers the above data to the application process distributing section.

Moreover, when the write call is trapped, the transmission data which is instructed to be written by the trapped write call is transferred to the protocol process distributing section.

The application process distributing section determines a cluster member in charge of an application process to the data transferred from the call trapping section in accordance with an application process distribution rule set in advance. Then, if the determined cluster member is the cluster member itself, the data is transferred to the application program on its own cluster member, whereas the data is transferred to the transferring section if being determined to be another cluster member.

The protocol process distributing section also determines a cluster member in charge of a protocol process to the data transferred from the call trapping section in accordance with a protocol process distribution rule set in advance. Then, if the protocol process distributing section determines its own cluster member, the data is transferred to the protocol processing section on its own cluster member. If another cluster member is determined, the data is transferred to the transferring section.

The transferring section transfers the data transferred from the application process distributing section and the protocol process distributing section to a corresponding cluster member.

By employing such a configuration, different cluster members can be used to carry out the protocol process and the application process to a traffic, as shown in FIG. 29B.

According to the present invention, a cluster system of a broadcast dispatch type can be provided while effectively supporting both an application process and a protocol process without adding a large change to the OS. The reasons are as follows. The trapping section provided in a cluster member traps a call to the communication API section from the application program operating on its own cluster member, and calls the communication API section in place of the application program. The trapping section carries out a process corresponding to a type of the call to a data read by the communication API section from the protocol processing section in response to the call or a data written into the protocol processing section by the communication API section in accordance with the call. The trapping section further carries out a process corresponding to a type of the data to a data transmitted from another cluster member. The trapping section can be provided outside of an OS which constitutes the protocol processing section, and therefore the cluster system of the broadcast dispatch type can effectively support both the application process and the protocol process without adding a large change to the OS.

According to the present invention, a server apparatus for a trunk operation in which high reliability is required, and an application level gateway apparatus having concentrated traffic on a network can be made redundant. It is also possible to construct a server with a large processing capability in an extremely large scale by, for example, arbitrarily increasing the number of server apparatuses, each of which can also be operated as a single apparatus, to make a call control of a telephone in a communication carrier, and using the server apparatuses as a cluster apparatus for performing a load balance.

BRIEF DESCRIPTION OF DRAWINGS

FIG. 2 is a diagram showing a current use system and a backup system in the first exemplary embodiment;

FIG. 6 shows a sequence of receiving and reading a data in the first exemplary embodiment;

FIG. 13A shows an outline of a configuration of the cluster system according to a second exemplary embodiment of the present invention;

FIG. 26B is a flowchart showing an example of the reading process of a data in the third exemplary embodiment;

FIG. 29B shows the effect of the present invention;

FIG. 33A shows an operation of the cluster system of the broadcast dispatch type;

BEST MODE FOR CARRYING OUT THE INVENTION

Hereinafter, best modes for carrying out the present invention will be described in detail with reference to the attached diagrams.

First Exemplary Embodiment

Figure 1:
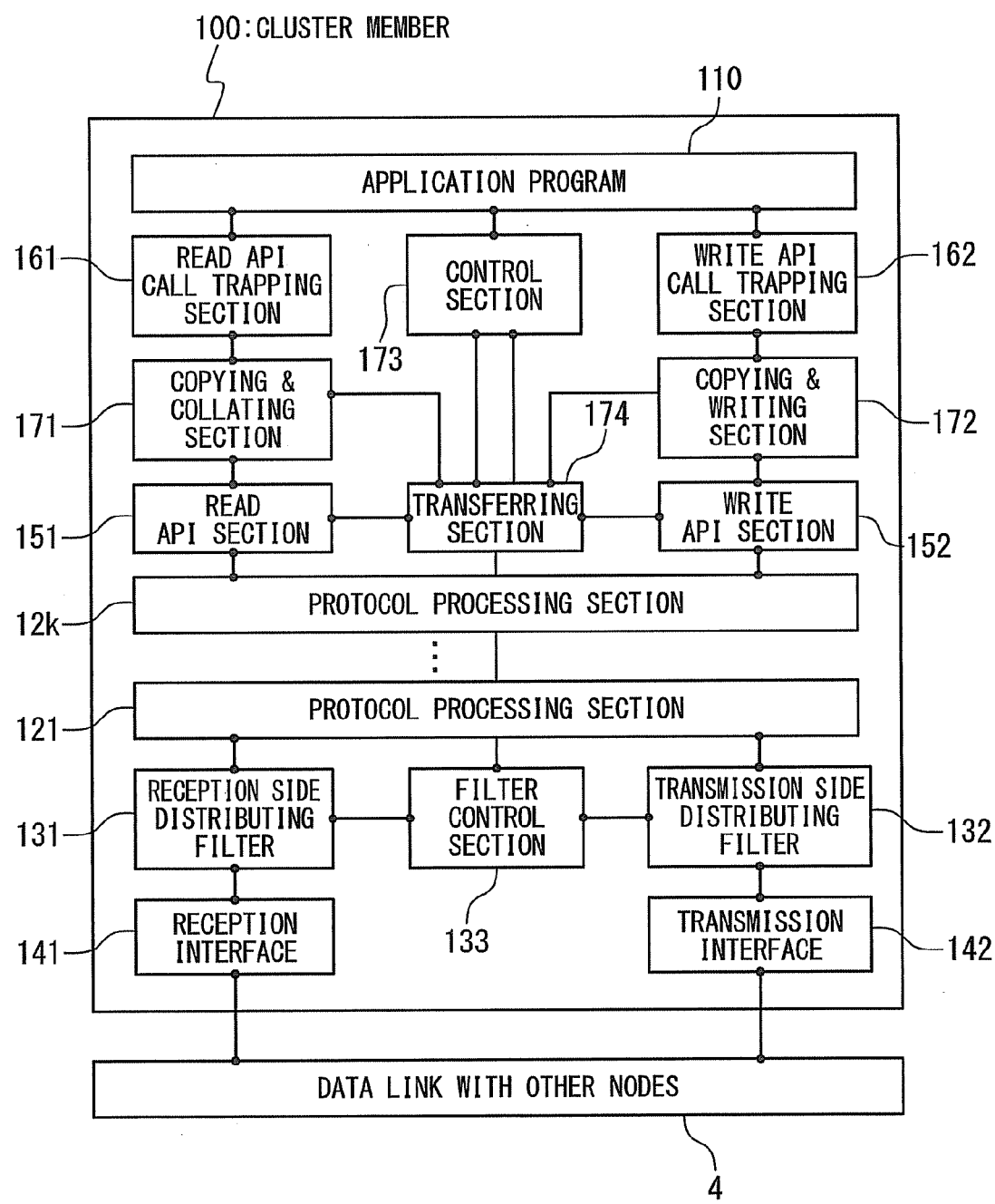
FIG. 1 shows a configuration example of a cluster member 100 used in a cluster system according to a first exemplary embodiment of the present invention.
Figure 31:
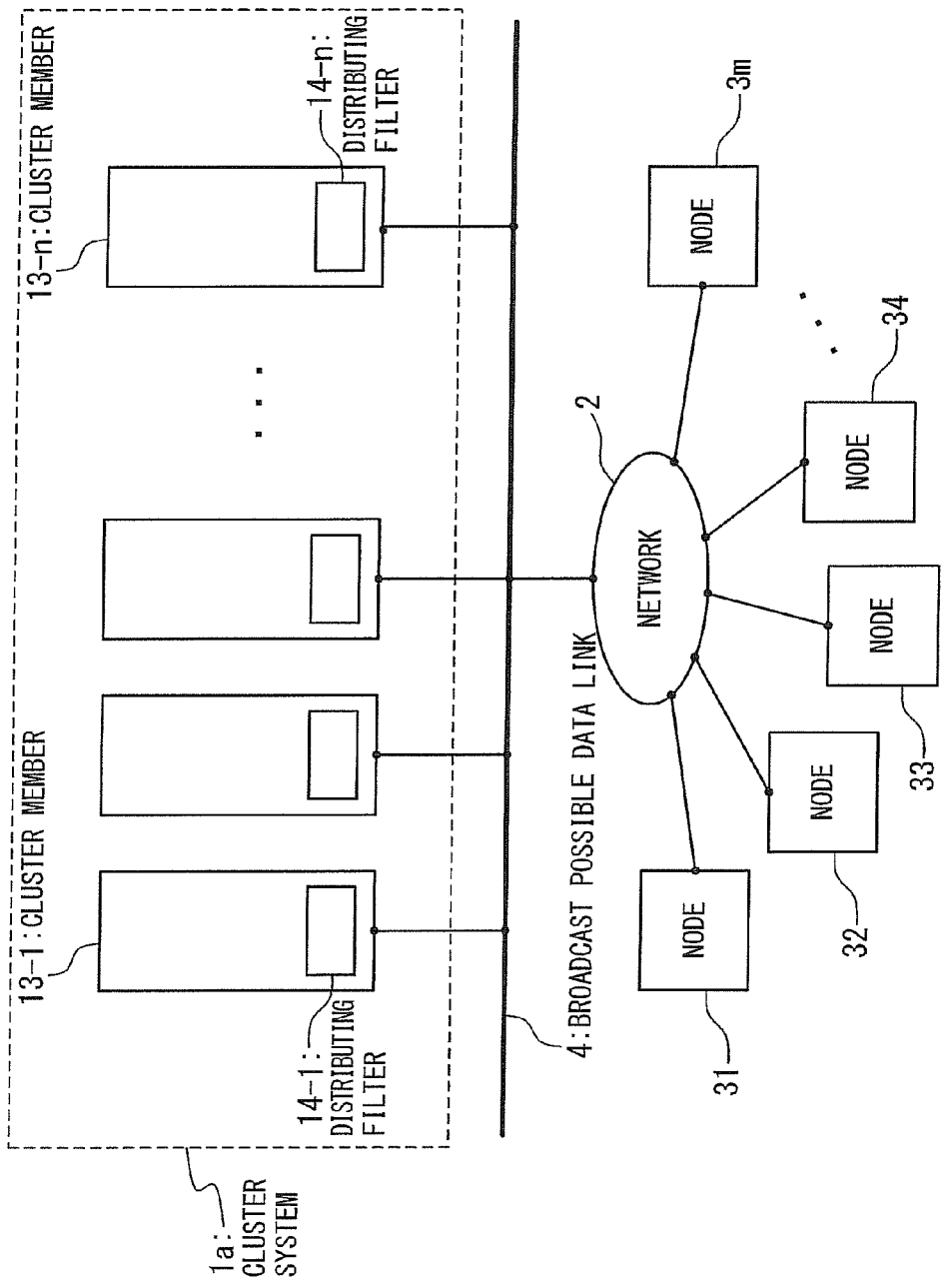
FIG. 31 is a block diagram showing the cluster system of a broadcast dispatch type.
Figure 32:
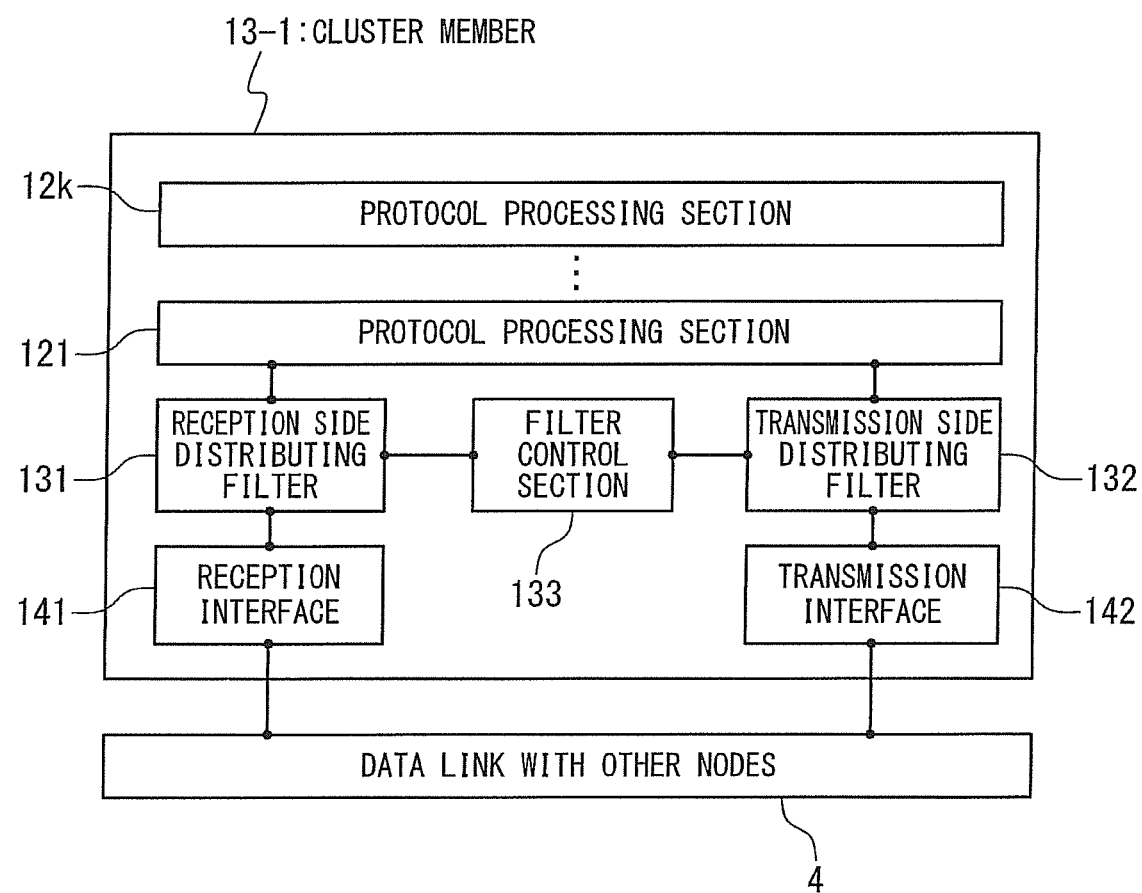
FIG. 32 is a block diagram showing a configuration of a cluster member 13-1 of the broadcast dispatch type.
Figure 33B:
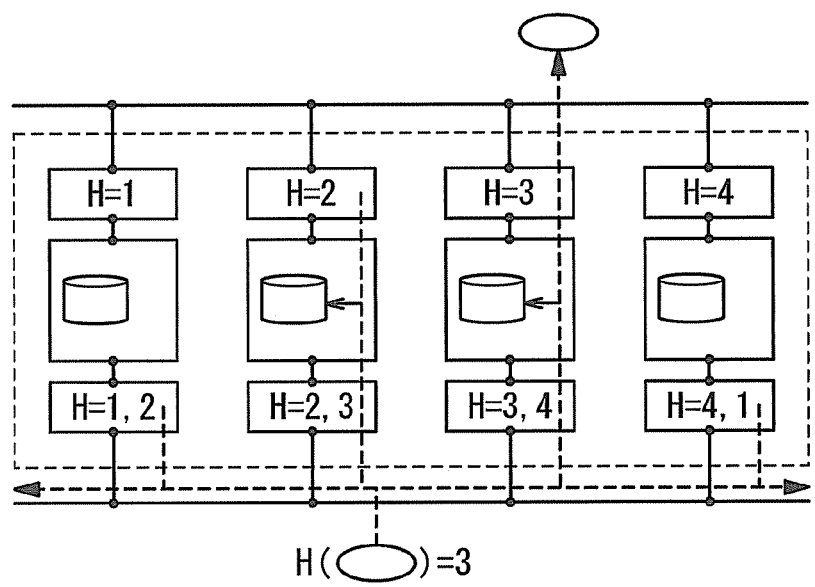
FIG. 33B shows an operation of the cluster system of the broadcast dispatch type.

In a cluster system of a broadcast dispatch system according to a first exemplary embodiment of the present invention, a cluster member onto which an application program is mounted is made redundant. The present exemplary embodiment is realized by using cluster members 100 as shown in FIG. 1, in place of the cluster members 13-1 to 13-n, in the cluster system of the broadcast dispatch system as shown in FIG. 31. The cluster system of the present exemplary embodiment functions as, for example, a server (i.e. a server cluster).

Referring to FIG. 1, the cluster member 100 according to the present exemplary embodiment is provided with an application program 110, protocol processing sections 121, 122, . . . , 12k, a reception side distributing filter 131, a transmission reception filter 132, a filter control section 133, a reception interface 141, a transmission interface 142, a read API section 151 serving as a communication API section, a write API section 152 serving as a communication API section, a read API call trapping section 161, a write API call trapping section 162, a copying and collating section 171, a copying and writing section 172, a control section 173 and a transferring section 174.

The cluster member 100 can be realized by a computer as will be exemplified below. A disk, a semiconductor memory or a recording medium in which a program for make a computer to function as the cluster member 100 is recorded is prepared. The above program is read in the computer. The computer controls an operation of itself in accordance with the read program so as to realize, on its own computer, the protocol processing sections 121, 122, . . . , and 12k, the reception side distributing filter 131, the transmission side distributing filter 132, the filter control section 133, the reception interface 141, the transmission interface 142, the read API section 151, the write API section 152, the read API call trapping section 161, the write API call trapping section 162, the copying and collating section 171, the copying and writing section 172, the control section 173 and the transferring section 174.

The cluster member 100 can function as both a current use cluster member and a backup cluster member. FIG. 2 shows a configuration of the cluster members 100 which are made to function as a current use cluster member and a backup cluster member, and a flow of transmission/reception data therein. FIG. 2 shows only primary elements of the present invention. The protocol processing sections 121, 122, . . . , and 12k, the reception side distributing filter 131, the transmission side distributing filter 132, the filter control section 133, the reception interface 141 and the transmission interface 142 are omitted from FIG. 2.

[Configuration of Current Use Cluster Member]

Referring to FIG. 2, the current use cluster member is provided with the copying section 171 (the copying and collating section 171 of FIG. 1 functions as the copying section 171 of FIG. 2 when the cluster member is made to function as an current use cluster member), the copying section 172 (the copying and writing section 172 of FIG. 1 functions as the copying section 172 when the cluster member is made to function as an current use cluster member), the control section 173, the transferring section 174, the read API call trapping section 161 and the write API call trapping section 162 between the read API section 151 or the write API section 152 and the application program 110.

When the application program 110 calls a reading process by a system call or the like, the read API call trapping section 161 is used to trap the call and dispose a clustering process before and after the reading process. This operation is also applied to the write API call trapping section 162.

The copying sections 171 and 172 carry out a process to copy transmission/reception data to be read and written to transfer to the transferring section 174.

The transferring section 174 receives the data from the copying sections 171 and 172 to transfer the data to a backup cluster member. The transferring section 174 also receives processing result of the data by the backup cluster member to transfer them to the copying sections 171 and 172.

Figure 34:
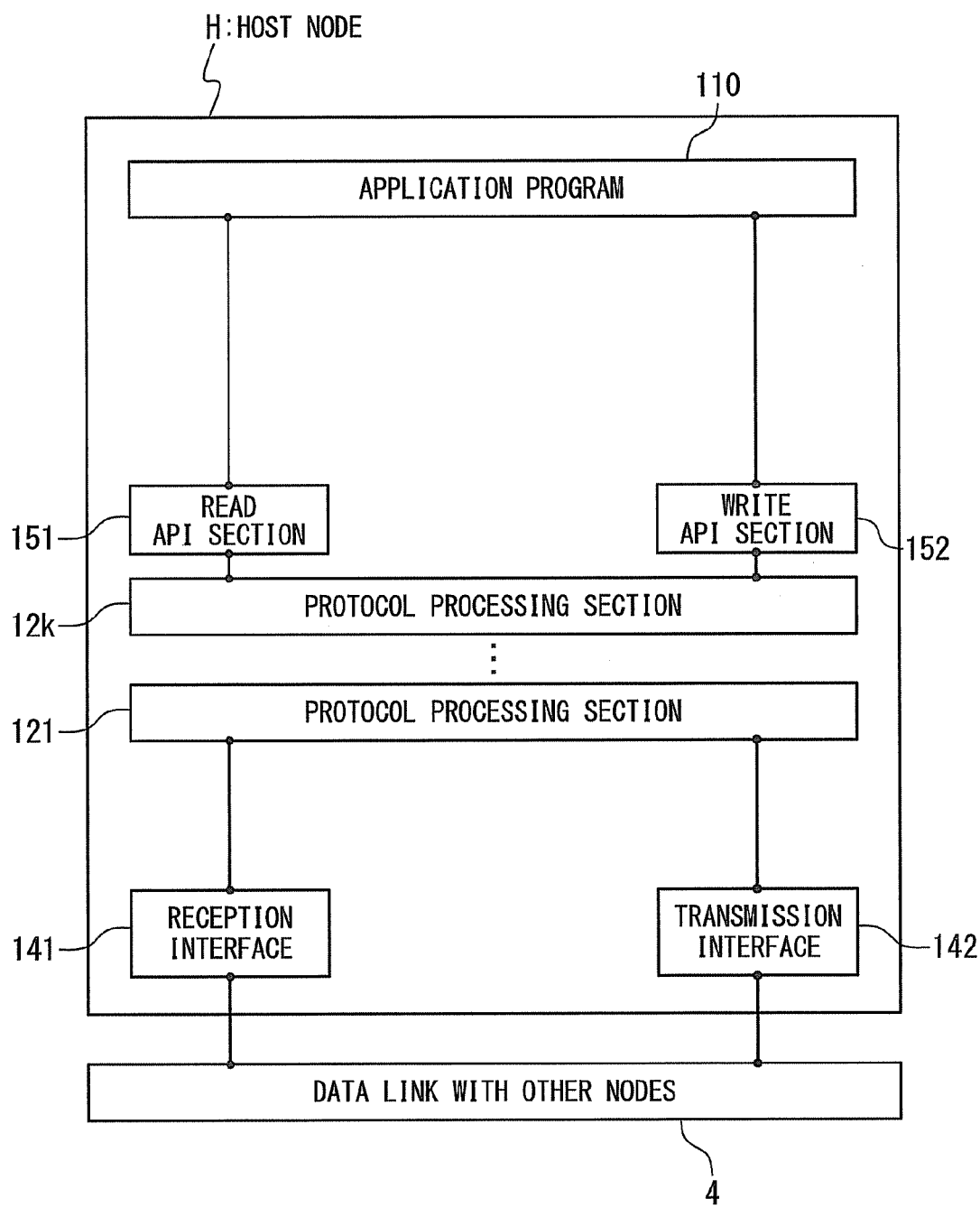
FIG. 34 is a block diagram showing a configuration of the host node H with an application program operating thereon.

Each of the read API section 151 and the write API section 152 provides an API for performing actual communication. These API sections are also provided in the host node H shown in FIG. 34. The protocol processing sections 121, 122, . . . , and 12k, the reception side distributing filter 131, the transmission side distributing filter 132, the filter control section 133, the reception interface 141 and the transmission interface 142 which are provided in the read API section 151 and the write API section 152, are omitted from FIG. 2.

The application program 110 calls the read API section 151 and the write API section 152 and executes a communication process.

The control section 173 is in charge of clustering a communication control process such as a session control.

[Configuration of Backup Cluster Member]

The backup cluster member is provided with the collating section 171 (the copying and collating section 171 of FIG. 1 functions as the collating section 171 of FIG. 2 when functioning as the backup cluster member), the writing section 172 (the copying and writing section 172 of FIG. 1 functions as the writing section 172 of FIG. 2 when functioning as the backup cluster member), the read API call trapping section 161, the write API call trapping section 162, the control section 173 and the transferring section 174 between the application program 110 the read API section 151 and the write API section 15. The control section 173 is internally provided with a switching notifying section 1731, a switching control section 1732 and a current use monitoring section 1733.

The read API call trapping section 161, the write API call trapping section 162 and the transferring section 174 function as described in the current use cluster member.

The copying and writing section 172 is used to transfer a write data transferred from the current use cluster member, to a transmission process in the backup cluster member via the write API section 152 in the backup cluster member.

The collating section 171 receives a reception data read in the current use cluster member, executes a reading process via the read API section 151 in the backup cluster member itself to execute a collating process of whether identical contents have been read.

The control section 173 is in charge of clustering a communication control process such as a session control process and system switching to/from the current use system.

The switching notifying section 1731 is used to receive information on a fault detection in the current use cluster member from a program (not shown) monitoring a dead/alive state of the current use cluster member and to transfer the information to the application program 110 and the switching control section 1732 as needed.

The switching control section 1732 has a function to switch operations of the collating section 171 and the write API section 152 when the current use cluster member is failed so that the backup cluster member performs failover and to allow the application program 110 in the backup system to carry out transmission and reception.

The current use monitoring section 1733 has a function to monitor the dead/alive state of the current use system (i.e. current use cluster member) in accordance with a procedure set separately. It should be noted that this function may be independently provided onto the application program or the like, and in such a case, the current use monitoring section 1733 may be omitted.

[Implementation by Library in Multi-Process Environment]

If the cluster member is realized by an operating system for multi-process here, it is generally realized based on the following manipulation. The read API section 151 and the write API section 152 are typically realized as a system call API. The protocol processing sections 121, 122, . . . , and 12k and other elements disposed therebelow are realized as a part of a kernel in an OS. The application program is realized as a user process.

In such a configuration, elements held in a region from the read API call trapping section 161 and the write API call trapping section 162 to the read API section 151 and the write API section 152 can be realized as a library. This configuration allows changes in a conventionally existing kernel portion in the OS and implementation of an application program to be made small when a cluster function according to the present invention is added. This is because many systems usually manage the kernel portion of the OS and the application program separately as independent files, and the library can be dynamically linked on execution of the application program.

[Configuration in which Application Programs Operate]

Although a case has been described in which only one application program operates in a cluster member for simplification, a plurality of application programs may operate therein. In this case, the components described above are prepared for each of the application programs.

A correspondence relation of a certain application program in the current use system and a certain application program in the backup system is set in advance in the transferring section 174 so that the transferring sections 174 in the current use system and the backup system communicate from each other for redundancy. More specifically, port numbers for a redundancy communication session or the like are set and known in advance.

Operation of First Exemplary Embodiment

Next, an operation of the present exemplary embodiment will be described in detail.

[Reading Process]

In order to describe one feature of the present exemplary embodiment, a receiving and reading process of the host node H (refer to FIG. 34) which is not provided with the read API call trapping section 161 and the write API call trapping section 162 and is not clustered will be described with reference to flowcharts of FIGS. 3A and 3B.

Figure 3A:
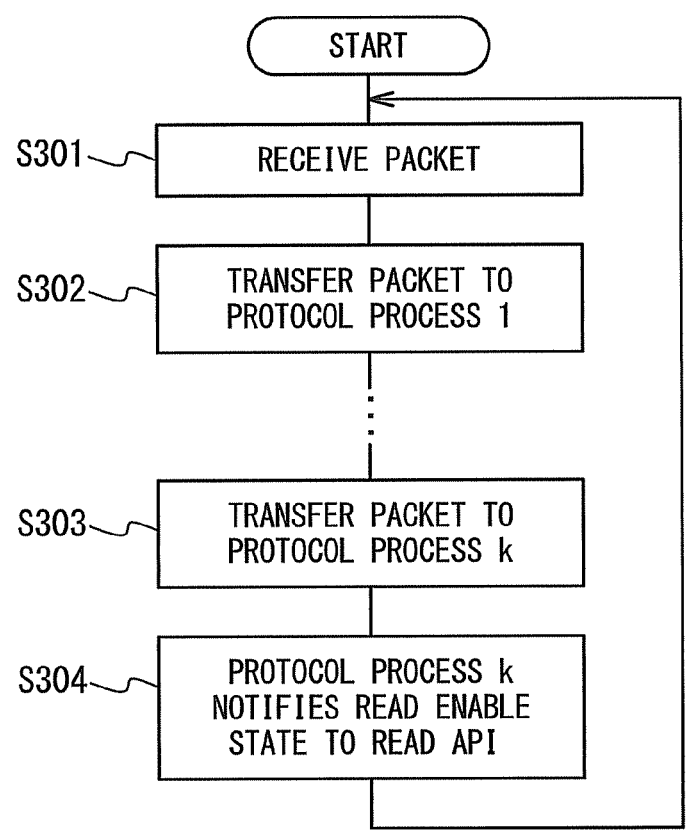
FIG. 3A is a flowchart showing a receiving and reading process of a data (i.e. a protocol process) by a host node H as a comparison example.
Figure 3B:
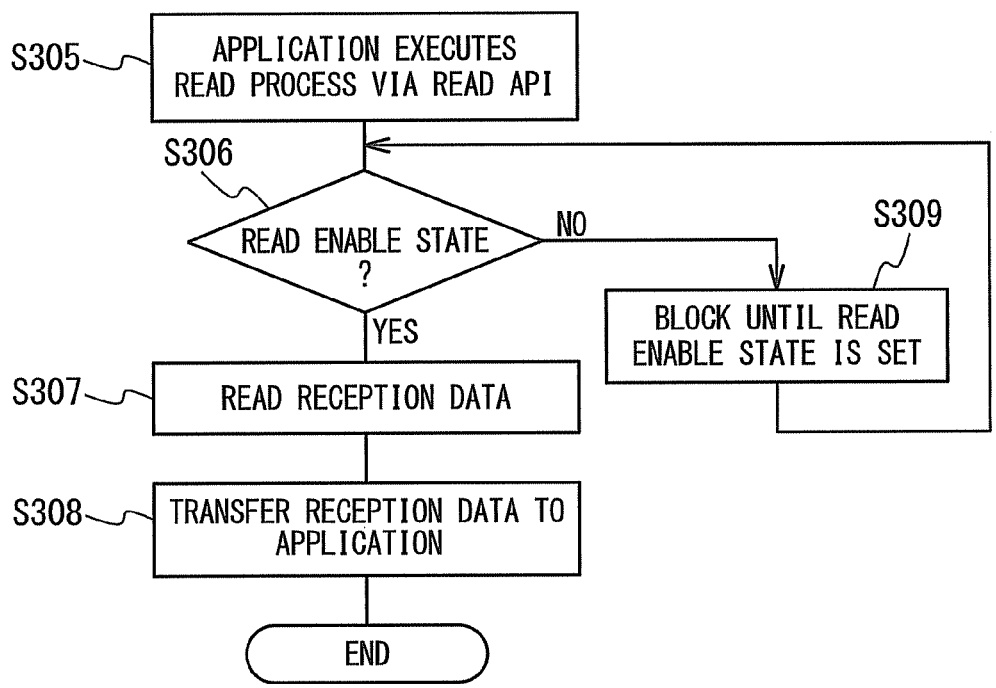
FIG. 3B is a flowchart showing the receiving and reading process of a data (i.e. an application process) by the host node H in the comparison example.

Referring to FIGS. 3A and 3B, a reading process includes two sequences of processes. One sequence of processes is started in response to packet reception, as shown in FIG. 3A (i.e. protocol process). The other sequence of processes is started in response to the reading process of the application program, as shown in FIG. 3B (i.e. application process).

The former and the latter processes deal with same reception data but they are separated as described above because the flows of processes are ended.

When an IP packet addressed to the host node H arrives from the data link 4, the reception interface 141 receives the packet (step S301). A reception data is transferred while being processed successively from the protocol processing section 121 in a lower layer to the protocol processing section 12k in a high layer (steps S302 and S303). For example, the TCP/IP network has layers which are typically provided in combination of Ethernet®, IP, TCP or the like.

The protocol processing section 12k in the uppermost layer notifies a read enable state to the read API section 151 when a protocol process has been completed in its own layer (step S304). This notice is carried out by preparing a state variable which is shared by the protocol processing section 12k and the read API section 151 and changing a value of the state variable to a value indicating data enable state.

When the application program 110 requests the read API section 151 to read the reception data (step S305), the read API section 151 reads the reception data to transfer to the application program 110 (steps S307 and S308) when the read enable state is notified from the protocol processing section 12k (YES in step S306). In contrast, when the read enable state is not notified (NO in step S306), the reading process is blocked until the read enable state is notified (step S309).

Figure 4A:
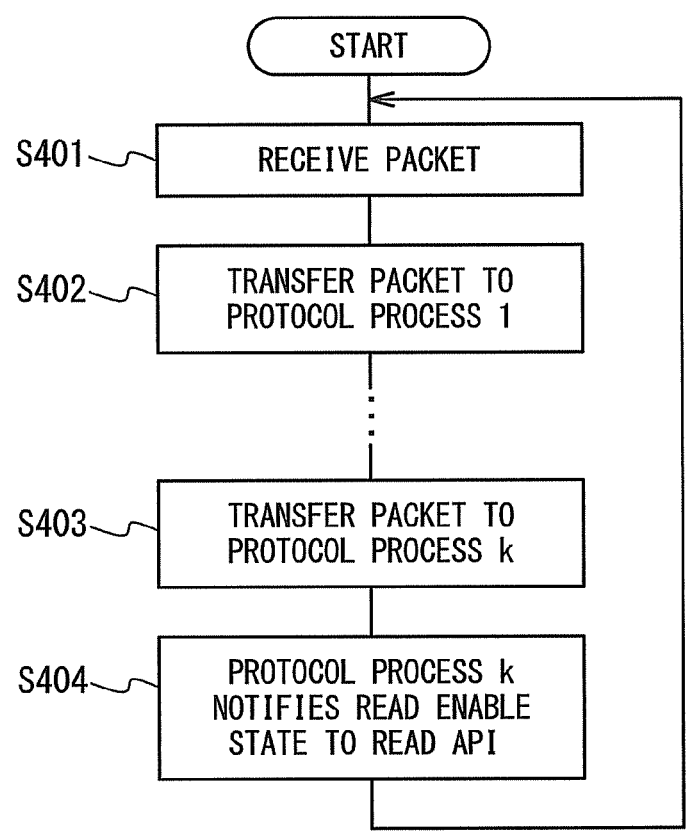
FIG. 4A is a flowchart showing an example of the receiving and reading process of a data (i.e. a protocol process) in a current use system of the first exemplary embodiment.
Figure 4B:
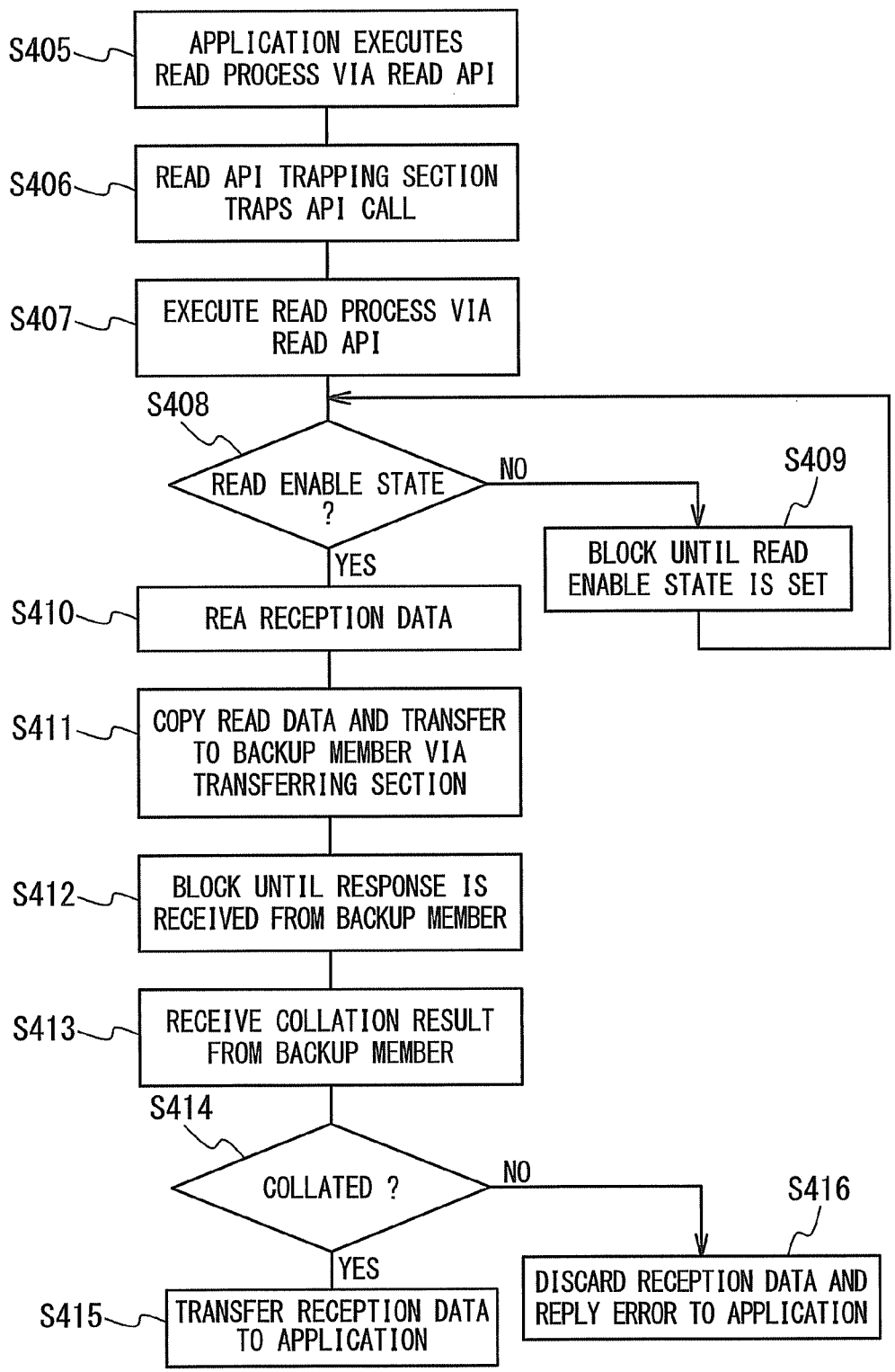
FIG. 4B is a flowchart showing an example of the receiving and reading process of a data (i.e. an application process) in the current use system of the first exemplary embodiment.

Next, a process of the present invention will be described. FIGS. 4A and 4B are flowcharts showing an operation on the current use system side in the receiving and reading process according to the present exemplary embodiment.

The receiving and reading process is separated into the protocol process (steps S401 to S404) as shown in FIG. 4A and the application process (steps S405 to S416) as shown in FIG. 4B in a same manner as the host node H explained for comparison. In these processes, the protocol process (steps S401 to S404) includes a process at the step S401 which is slightly different from the process at the step S301 of FIG. 3A, while processes in the steps S402 to S404 are the same as the processes in the steps S302 to S304 of FIG. 3A. The step S401 differs from the step S301 in that only a packet is received whose hash value is equal to a hash value calculated by the reception side distributing filter 131.

Next, the application process will be described. In the present exemplary embodiment, the read API call trapping section 161 traps a call to the read API section 151 by the application program 110 (steps S405 and S406). When the above call is trapped, the read API call trapping section 161 calls the read API section 151 in place of the application program 110 (step S407). Therefore, the read API section 151 reads the reception data if it is prepared in the protocol processing section 12k or blocks the reading process until the reception data is prepared in case of no reception data (steps S408 to S409).

Next, the reception data read by the read API section 151 is copied by the copying section 171 and transferred to the transferring section 174, and the transferring sections 174 sends the transferred data to the backup cluster member (step S411). This transfer of a replica data is carried out by a communication mechanism exclusively used among the cluster members, a shared memory or the read/write API section which is use for communication by the application program.

Furthermore, since the result of collating data are transmitted from the backup cluster member, the reading process is executed by the read API section 151 so as to wait for data reception (step S412). Upon reception of the collation result, the transferring section 174 reads the data from the read API section 151 to transfer to the copying section 171 (step S413). If the collation result indicates collation success (YES in step S414), the copying section 171 transfers the data read at the step 410, to the application program 110 via the read API call trapping section 161 (step S415). If the collation result indicates collation failure (NO in step S414), the data read at the step S410 is discarded to return an error to the application program 110 (step S416).

Figure 5A:
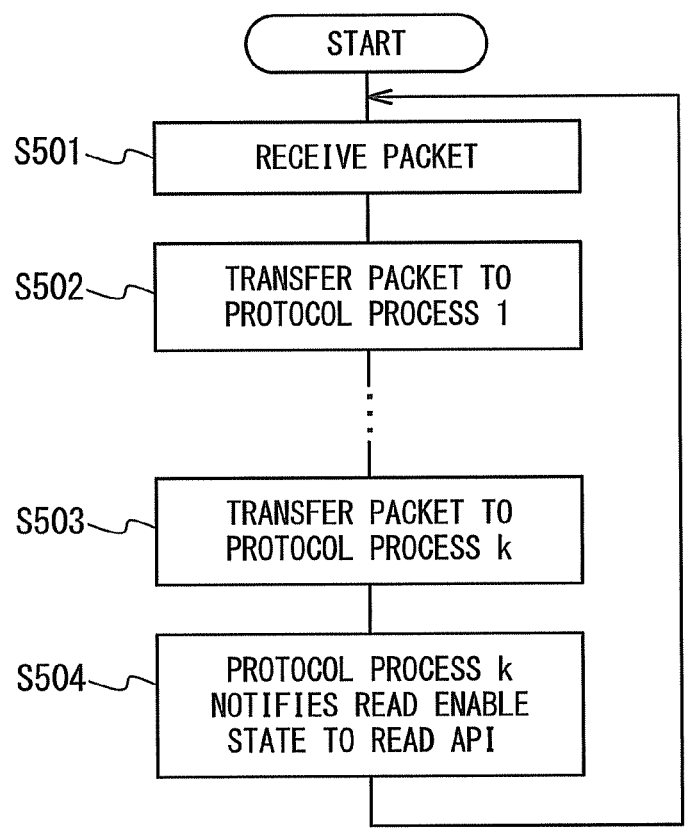
FIG. 5A is a flowchart showing an example of the receiving and reading process of a data in a backup system of the first exemplary embodiment.
Figure 5B:
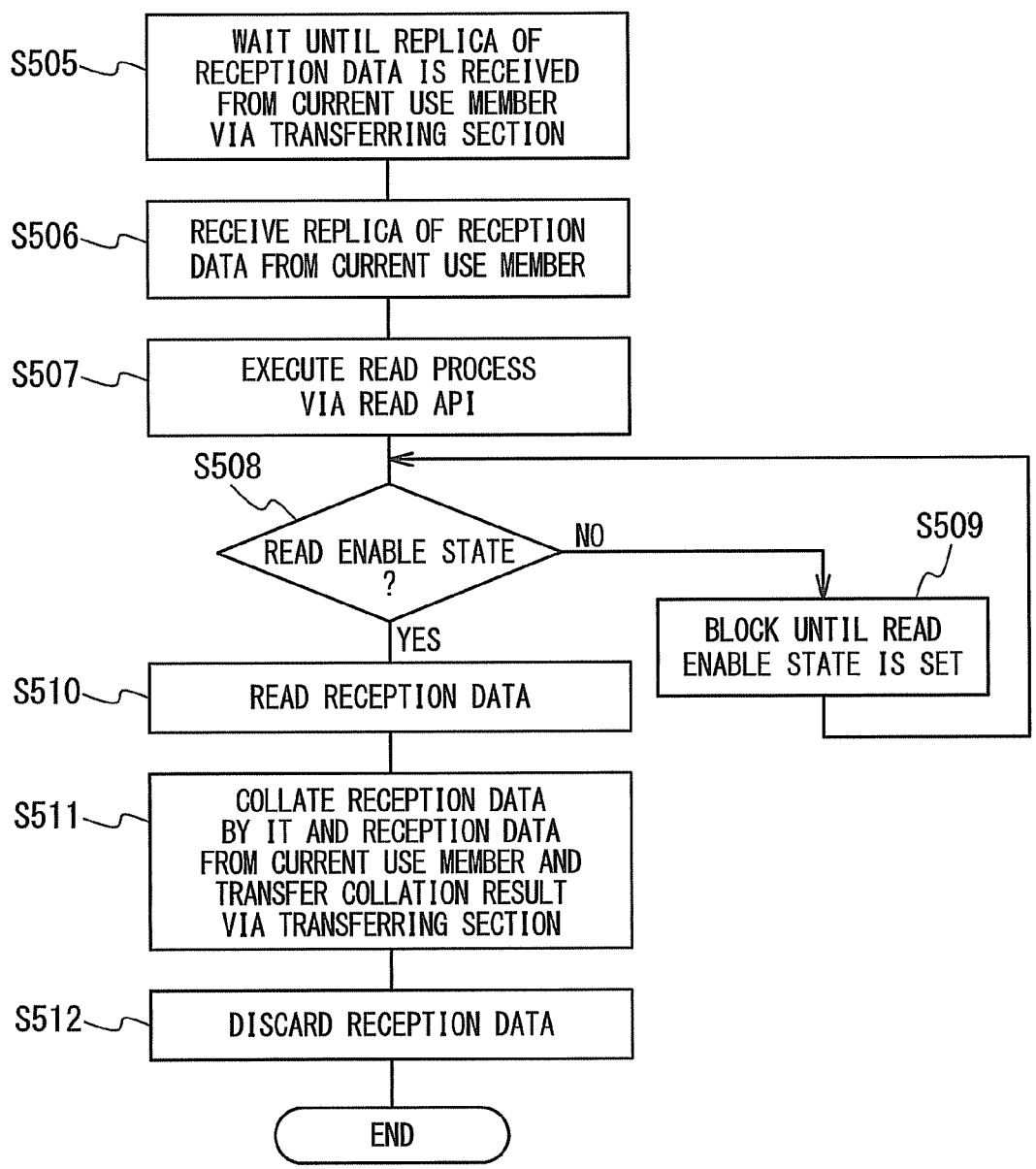
FIG. 5B is a flowchart showing an example of the receiving and reading process of a data in the backup system of the first exemplary embodiment.

Next, an operation of the backup system will be described. FIGS. 5A and 5B are flowcharts showing the operation on the backup system side in the receiving and reading process according to the present exemplary embodiment.

Referring to FIGS. 5A and 5B, the reading process in the backup system also includes two sequences of processes in a same manner as the current use system.

Since the reception data is broadcast to all the cluster members in the present exemplary embodiment, a same packet is delivered to the current use cluster members and the backup cluster members. It should be noted that a corresponding hash value of the backup cluster member is set to be the same as that of the current use cluster member.

The receiving process similar to the steps S401 to S404 as shown in FIG. 4A is carried out at steps S501 to S504.

Meanwhile, the reading process is not driven by the application program but driven by the clustering process itself in the backup system.

In the backup cluster member, the collating section 171 reads the reception data (or replica data) transmitted from the current use system via the transferring section 174. The transferring section 174 waits for arrival of replica data from the current use system, and transfers the replica data to the collating section 171 upon the arrival (steps S505 and S506). In response to this, the collating section 171 reads the reception data via the read API section 151 (steps S507 to S510). At this time, if it is possible to specify the length of reception data to be read, the data is read only for the same length as that of the replica of the reception data received from the current use system.

Thereafter, the collating section 171 collates the reception data read at the step S510 and the replica data of the reception data received from the current use system, and transmits the collation result indicating collation success to the current use system when both of these data are coincident with each other, or transmits the collation result indicating collation failure to the current use system when both of these data are not coincident with each other (step S511). Then, the collating section 171 discards the reception data (step S512). It should be noted that if an amount of data read by the backup system itself at the step S510 is smaller than an amount of replica data of the reception data received from the current use system, the data is continuously read until the same amount of data is provided. However, when the same amount of data is provided even if the data is continuously read for a period of time specified in advance, the data read may be canceled so as to determine the collation failure. The reception data by the backup system itself is discarded after ending the above process.

It should be noted that transmission of the collation result is carried out by using a communication mechanism exclusively used among the cluster members, a shared memory and a read/write API used for communication by the application program, like the transmission of replica data. However, if the application program uses the read/write API for communication, communication with the current use system cannot be carried out since an IP packet is discarded immediately before being transmitted from the backup system as a result of a writing process which will be described later. Therefore, an exceptional process is executed to a packet addressed to the current use system so as to be actually transmitted without being discarded.

FIG. 6 is a sequence diagram in which the operations of the current use system and the backup system are shown. A packet broadcasted to both the current use system and the backup system is processed redundantly by passing through the protocol processing sections in both systems. The reception data in the current use system and the backup system are collated in the backup system. Only when the identical data is received, the data is transferred to the application program in the current use system. It is therefore made possible to realize a protocol redundancy process.

In addition, the process to read data by the application program is not ended until it is completed to read data in both the current use system and the backup system. This makes it possible to prevent a process synchronization gap in which a process to read data is advanced in either the current use system or the backup system.

[Writing Process]

Figure 7:
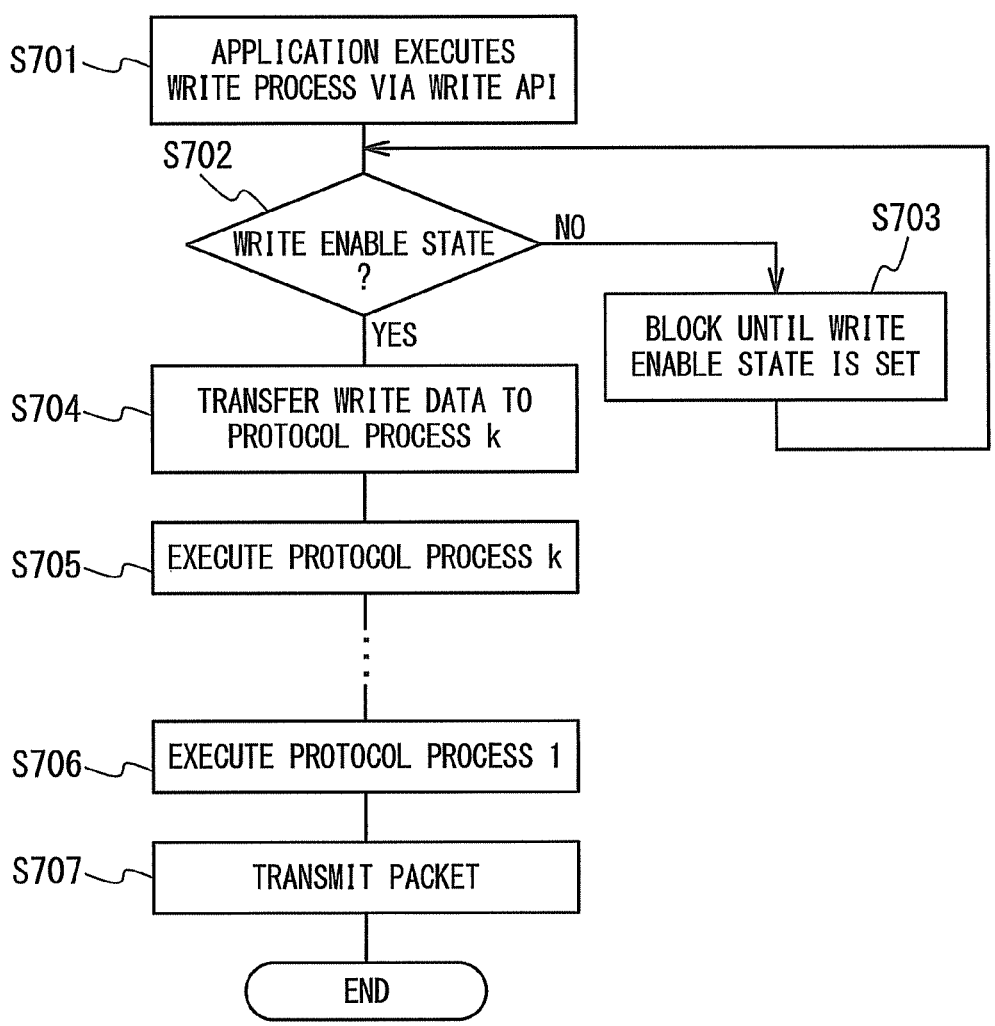
FIG. 7 shows a writing and transmitting process of a data in the host node H of a comparison example.

FIG. 7 shows the writing and transmitting process in a host node H (refer to FIG. 34) which does not include the read API call trapping section 161 and the write API call trapping section 162 or other elements and is not clustered as a comparison example to describe one feature of the present invention Referring to FIG. 7, the application program 110 in the unclustered host node H calls the write API section 152 to write transmission data in a buffer of the write API section 152 (step S701). When the transmission data is written in the internal buffer, the write API section 152 checks whether or not the above transmission data can be transferred to the protocol processing section 12k in the uppermost layer (step S702). Then, when it is possible to transfer the transmission data (YES at step S702), the transmission data is transferred to the protocol processing section 12k in the uppermost layer (step S704). When it is impossible to transfer the transmission data to the protocol processing section 12k because the buffer in the protocol processing section 12k is full or due to other reasons (NO at step S702), the writing process is blocked until it becomes possible to transfer the transmission data (step S703).

The transmission data outputted from the write API section 152 is transferred while being processed successively from the protocol processing section 12k in a high layer to the protocol processing section 121 in a low layer (steps S705 and S706). Then, the data is finally transmitted from the transmission interface 142 to the data link 4 (Step S707). The writing and transmitting process of the host node H is as described above.

Figure 8A:
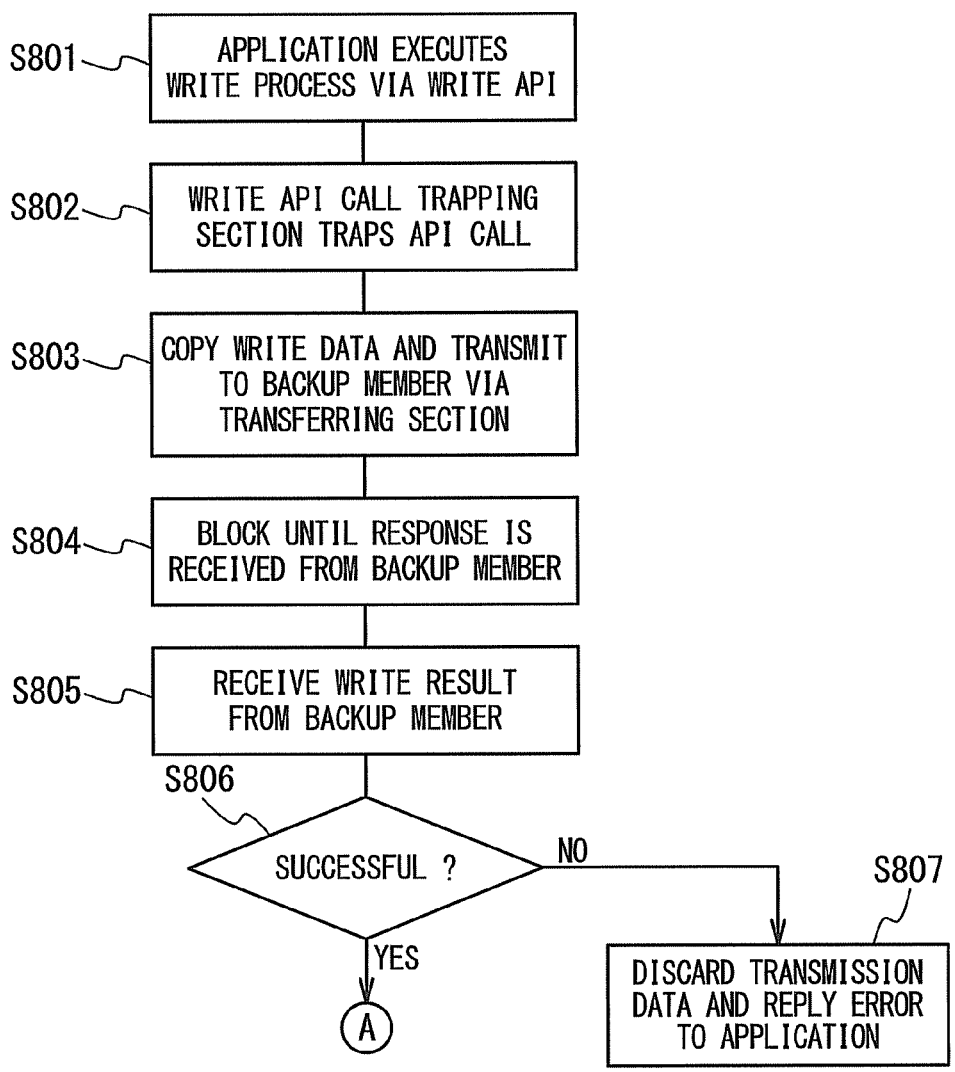
FIG. 8A shows an example of the writing and transmitting process of a data in the current use system of the first exemplary embodiment.
Figure 8B:
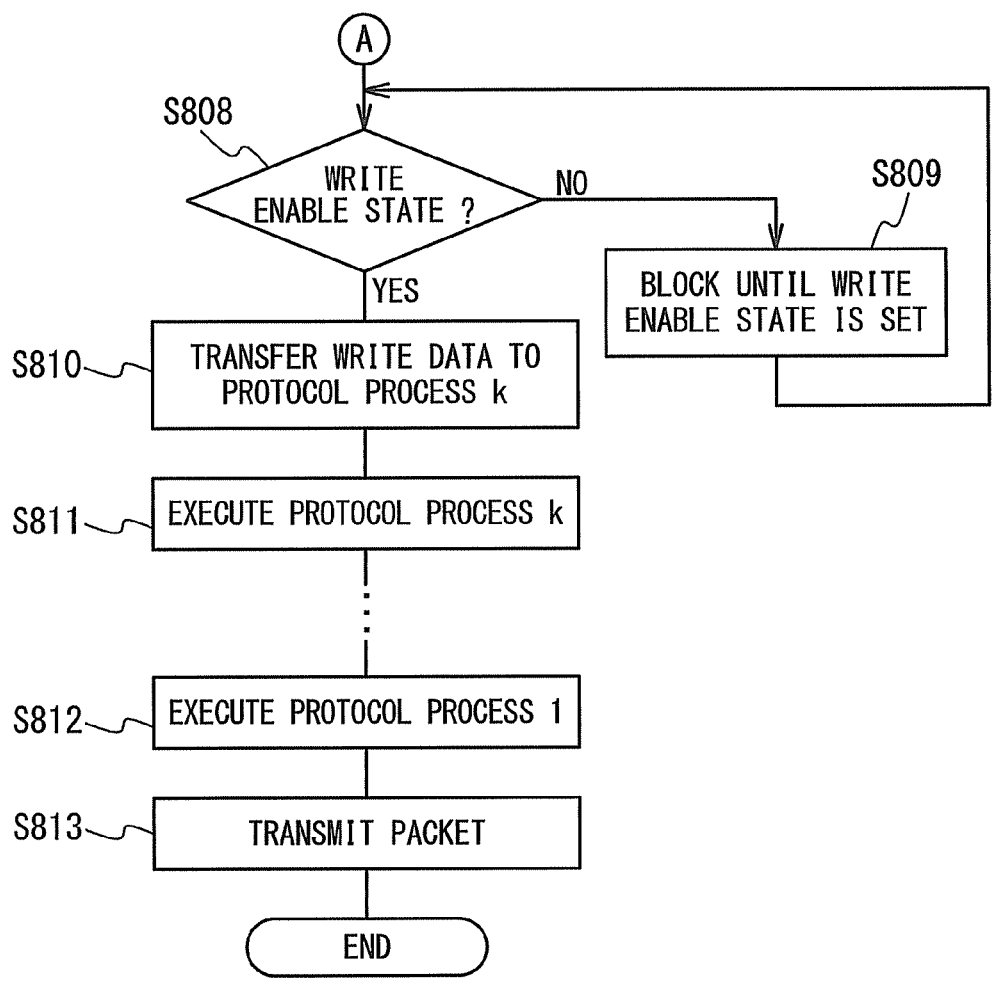
FIG. 8B shows an example of the writing and transmitting process of a data in the current use system of the first exemplary embodiment.

Next, the writing and transmitting process according to the present exemplary embodiment will be described. FIGS. 8A and 8B are flowcharts showing an operation on the current use system side in the writing and transmitting process according to the present exemplary embodiment.

Referring to FIGS. 8A and 8B, the writing and transmitting process is initiated by the application program 110 calling the write API section 152, like the host node H as a comparison example (step S801).

According to the configuration of the present exemplary embodiment, the call to the write API section 152 is trapped by the write API call trapping section 162 (step S802) and the following process is executed as the writing and transmitting process.

First, the copying section 172 copies the transmission data to produce a replica data and transfers the replica data to the transferring section 174. The transferring section 174 sends the transferred replica data to the backup cluster member (step S803). This transmission of the replica data is realized by using a communication mechanism exclusively used among cluster members, a shared memory or a read/write API used for communication by the application program 110. Furthermore, since a data writing result is supposed to be transmitted from the backup cluster member, the current use system waits for receiving the result (steps S804 and S805). The data writing result is transmitted by using the communication mechanism exclusively used among the cluster members, the shared memory or the read/write API (not shown) used for communication by the application program 110.

Upon reception of the data writing result, the transferring section 174 transfers it to the copying section 172. When the data writing result indicates write failure (NO at step S806), the copying section 172 discards the transmission data and notifies the write failure to the application program 110 (step S807). In contrast, when the data was successfully written (YES at step S806), the copying section 172 transfers the transmission data to the protocol processing section 12k immediately when the data can be written in the buffer of the protocol processing section 12k or after waiting for a state in which the data can be written therein when the data can not be written (steps S808 to S810). Thereafter, the same processes as those of the steps S705 and S706 are executed in the protocol processing sections 121, 122, . . . , and 12k (steps S811 and S812), and the transmission data is finally transmitted from the transmission interface 142 to the data link 4 (step S813).

Figure 9:
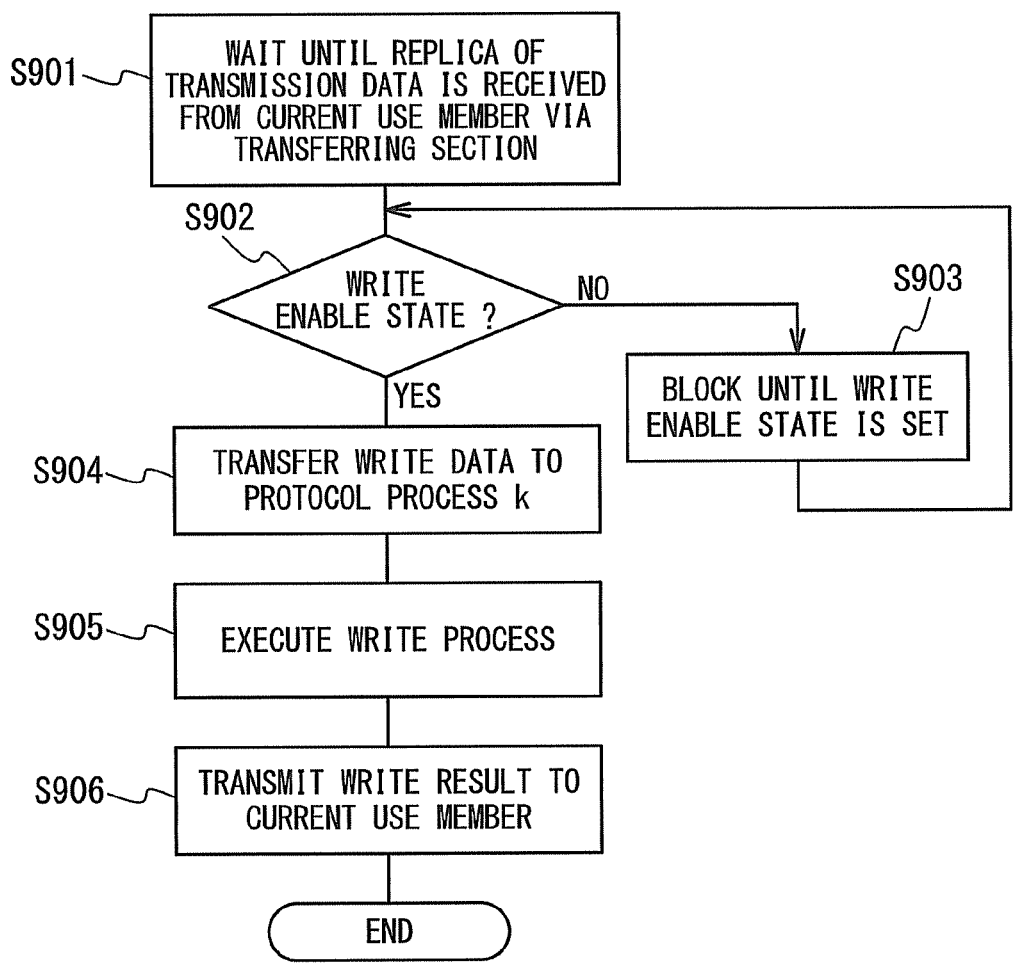
FIG. 9 shows an example of the writing and transmitting process of a data in the backup system of the first exemplary embodiment.

Next, an operation of the backup system will be described. FIG. 9 is a flowchart showing an operation on the backup system side in the writing and transmitting process according to the present exemplary embodiment. The writing and transmitting process in the backup system is not initiated by the application program but initiated by the clustering process itself, like the reading process.

The transferring section 174 waits for arrival of the transmission data (or replica data) from the current use system and transfers the transmission data to the writing section 172 upon its arrival (step S901).

The writing section 172 calls the write API section 152 and transfers the transmission data to it.

The write API section 152 therefore checks whether or not the data can be written in the buffer of the protocol processing section 12k, and transfers the transmission data to the protocol processing section 12k immediately when the data can be written or after waiting for a state in which the data can be written when the data cannot be written (steps S902 to S904).

Accordingly, the protocol processing sections 121, 122, . . . , and 12k execute the writing process of the transmission data (i.e. protocol process) (step S905). Thereafter, the writing section 172 generates the data writing result indicating whether or not the transmission data was successfully written on the basis of responses (such as a return from a function call and a call of a callback routine) from the protocol processing sections 121, 122, . . . , and 12k and transmits it to the current use cluster member (step S906). This transmission of the data writing result is realized by using a communication mechanism exclusively used among the cluster members, a shared memory or a read/write API used for communication by the application program 110.

It should be noted that when the above read/write API is used to notify the writing result to the current use system, a destination of the writing result is set to an IP/MAC address of the current use system in order to prevent the writing result from being discarded in the transmission interface 142. That is, the transmission side distributing filter 132 in the backup system is configured to send a packet which is addressed to the current use system to the data link 4 via the transmission interface 142 and to discard packets addressed to other destinations. If only a part of replica data of the transmission data received from the current use system is written at the step S905, the writing process is continued until the entire data is written. However, the writing process may be canceled to determine as a failure, if the writing process is not ended even if the writing process is continuously executing for a period of time specified in advance.

Figure 10:
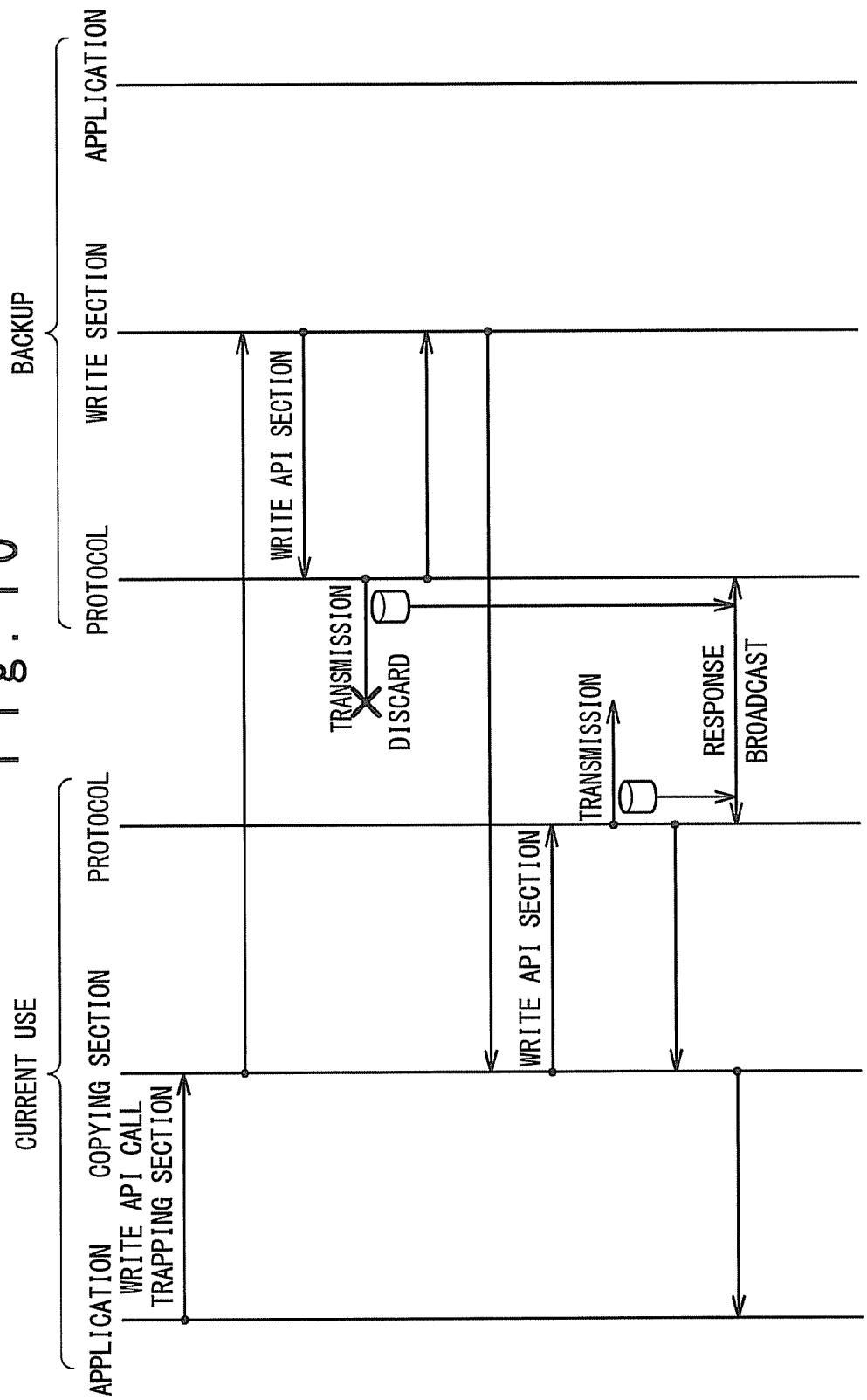
FIG. 10 shows a sequence of writing and transmitting a data of the first exemplary embodiment.

FIG. 10 is a sequence diagram showing the above operations of the current use system and the backup system. The transmission data written by the application program in the current use system is copied directly under the write API section 152 and redundantly processed by passing through the protocol processing sections in both the systems. Only when the transmitting process is properly executed to the identical data, success is notified to the application program in the current use system. Thus, the redundancy process is realized.

Also, the reason why the writing process in the backup system is executed prior to the writing process in the current use system is in the features of the redundancy process in the present exemplary embodiment and a protocol operation such as TCP.

In the redundancy system according to the present invention, the transmission data for the transmitting process in the current use system is actually transmitted but the transmission data for the transmitting process in the backup system is discarded immediately before the transmission. Thus, it is made possible to prevent the transmission data from being transmitted in duplex.

Meanwhile, a transmission confirmation response to the data transmission is transmitted from a counter node in a protocol such as TCP and SCTP to assure data transmission. Since the arrival of transmission data can be confirmed through the reception of this response, the data held in a transmission buffer can be deleted in the protocol. In contrast, if the response is not received, it is necessary to continue to re-transmit the transmission data.

When the transmitting process is executed in the backup system according to the present exemplary embodiment, a packet is not actually transmitted although being for the protocol process in the backup system, and the confirmation response is never received from the counter node.

In contrast, since the transmission data is actually transmitted to the counter node when the transmitting process is executed in the current use system causes, the response is returned.

Here, a response message here is transmitted to the cluster system, which means the message is received by both the current use system and the backup system.

If the transmitting process is first executed in the current use system, there is a possibility that the response arrives in the backup system before the transmitting process is executed in the backup system. Since a response to the data which has not been transmitted is discarded, the backup system discards the response in this case.

Even if the backup system executes the transmitting process thereafter, the transmission data is not actually transmitted and the response to the transmission data does not arrive. Therefore, the transmission confirmation cannot be carried out forever. As described above, the writing process is executed in the backup system prior to the current use system in order to increase an opportunity to execute the transmitting process in the backup system prior to the current use system.

[Other Processes]

Communication control APIs to generate an endpoint and to establish a session are prepared for the group of communication APIs in addition to the read API and the write API.

Here, a redundancy method of the above control API in a Barkley socket API as one of primary communication APIs will be described. Primary system calls used for generation of the endpoint and establishment of the session among the socket APIs are shown below:

connect;
bind;
listen; and
accept.

Among these system calls, "bind", "listen" and "accept" are used by a server which waits for a session are, whereas "connect" is used by a client side which independently establishes a session. A method of generating a communication program by using these APIs is described in detail in "UNIX® Network Programming <Vol. 1> Network API: Socket and XTI" (Pearson Education 2000), written by W. Richard Stevens and translated by Yoichi Shinoda".

A procedure to establish a session on the client side and the server side will be described below with reference to a sequence diagram while paying attention to the purposes of these calls.

With APIs other than APIs to be described below, success of the API call is notified to the application program only when the API on the current use system side is called, a call content is copied, the same API on the backup side is also called, and consequently the API call is successful in both of the current use and backup systems.

[Session Establishment on Server Side]

A procedure of steps to establish a session on the server side is typically as follows:

(1) fix an endpoint of its own node by "bind";
(2) issue a system call of "listen" to allow reception waiting at the endpoint; and
(3) wait for session establishment with a client in a system call of "accept". When the session is established with the client, a socket descriptor is newly generated for each session and returned to the calling side.

Thereafter, communication is carried out by using the socket descriptor obtained at the step (3).

Her, the application program typically issues a system call for each of the above three steps. According to the system of the present invention, an additional process for redundancy is carried out by trapping each of the system calls in the same manner as the case of the reading and writing processes without any change in the calling procedure.

Figure 11:
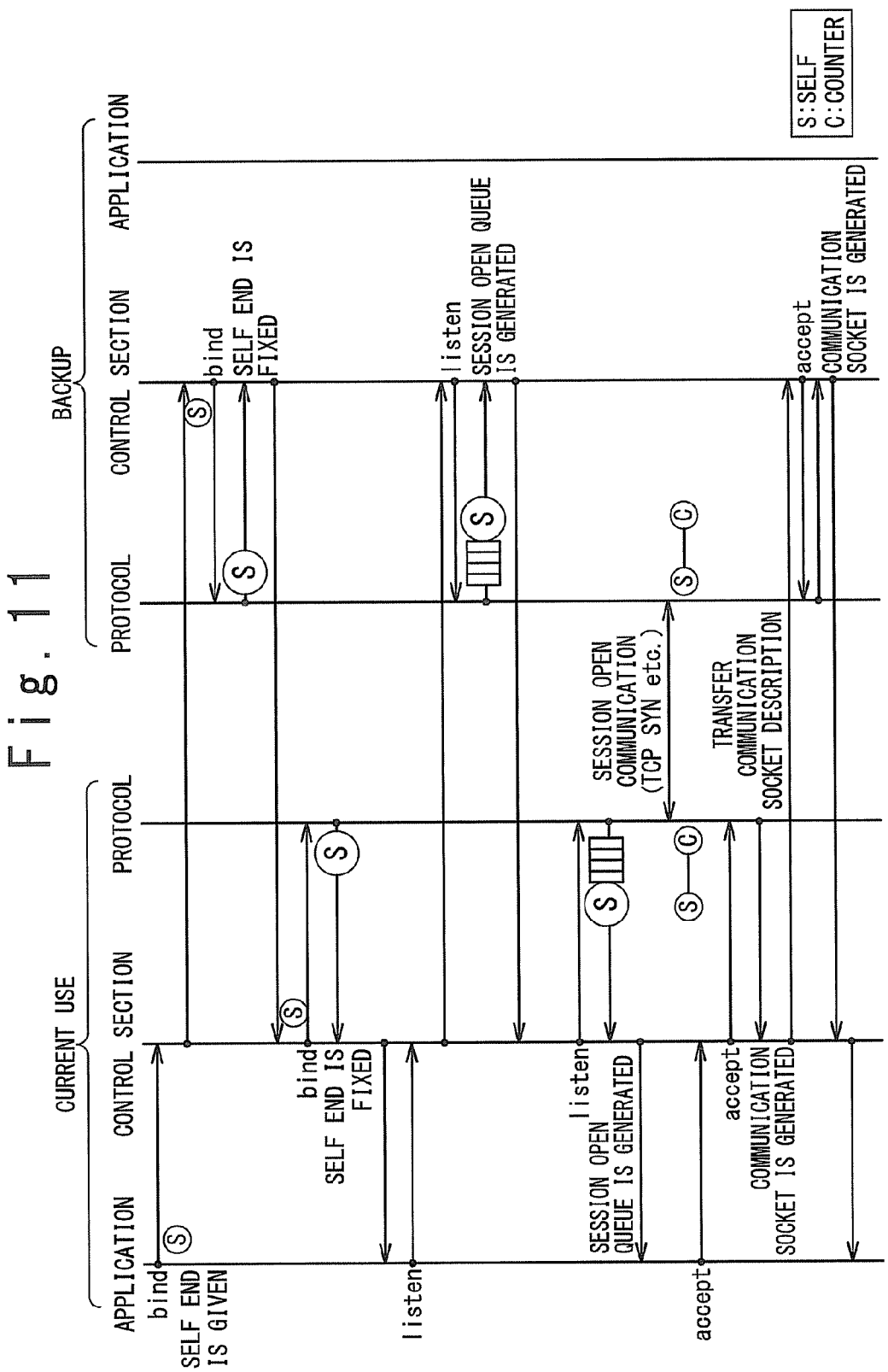
FIG. 11 shows a sequence of establishing a session on a server side in the first exemplary embodiment.

FIG. 11 is a sequence diagram showing a sequence of establishing a session on the server side. Referring to FIG. 11, when the application program in the current use system first makes a call, the control section traps the call and request the backup system to carry out the same processes in case of the system calls of "bind" and "listen". Thus, the backup system issues a similar system call to receive the result. If the process is normally ended in the backup system, the current use system also issues the same system call. If the system call is abnormally ended shed in either the current use system or the backup system, the application program in the current use system notifies failure to the system call. Both the current use and backup systems can receive a session establishment request from a client node through the above process.

Next, with the system call of "accept", when the application program in the current use system makes a call, the control section traps the call and first the current use system issues the system call. Then, soon after a session is established in the current use system, a socket descriptor for communication is generated separately from the socket descriptor for waiting and returned to a calling source (i.e. control section in this case).

Only when the above process is successfully completed, the control section requests the backup system to carry out the process. The system call is also issued in the backup system and similarly receives a socket descriptor for communication to transmit the result to the current use system. As described above, the socket for communication with a client can be generated in both of the current use and backup systems. Lastly, the socket descriptor for communication on the current use system side is notified to the application program as the result of the system call and the process to establish the session is ended.

Here, the reason why only the system call of "accept" is first issued in the current use system is in that the backup system records correspondence between the socket descriptor for communication in the current use system and the socket descriptor for communication in the backup system itself.

The session establishment by the protocol can be carried out prior to issuing the system call of "accept". If the session has been established between the system call of "accept" is called, information on the session is held in a waiting queue generated by the system call of "listen". In this case, the socket descriptor for communication can be obtained immediately after issuing the system call of "accept". If the session is not established yet at the point of time at which the system call of "accept" is issued, the system call of "accept" is blocked until the session is established.

Through the above process, a redundancy process can be carried out without confusion by transferring a socket API to be processed at the time of communication between the current use system and the backup system, even if the application program uses a plurality of socket descriptors. Furthermore, even if the call of the "accept" is delayed in the backup system, the session can be established in both the current use and backup systems.

In addition, with the above procedure, a reading process is started immediately after carrying out the above step (1) in case of establishing a session by a connection-oriented protocol such as TCP (refer to "Transmission Control Protocol" (RFC 793, September 1981) by J. Postel), and SCTP (refer to "Stream Control Transmission Protocol" (RFC 2960, October 2000) by R. Stewart, Q. Xie, K. Morneault, C. Sharp, H. Schwarzbauer, T. Taylor, I. Rytina, M. Kalla, L. Zhang and V. Paxson), and in case of a connectionless protocol such as UDP ("User Datagram Protocol" (RFC 768, August 1980) by J. Postel). In this case, only the "bind" process is made redundant by the above procedure.

[Session Establishment on Client Side]

The session establishment is typically carried out on the client side by issuing the system call of "connect". When the system call is issued, the protocol is requested to establish the session with a counter endpoint by fixing an endpoint on its own node side, and the call is returned by the result of the session establishment.

A session establishment on the client side is made redundant by processing the system call of "connect" redundantly.

Figure 12:
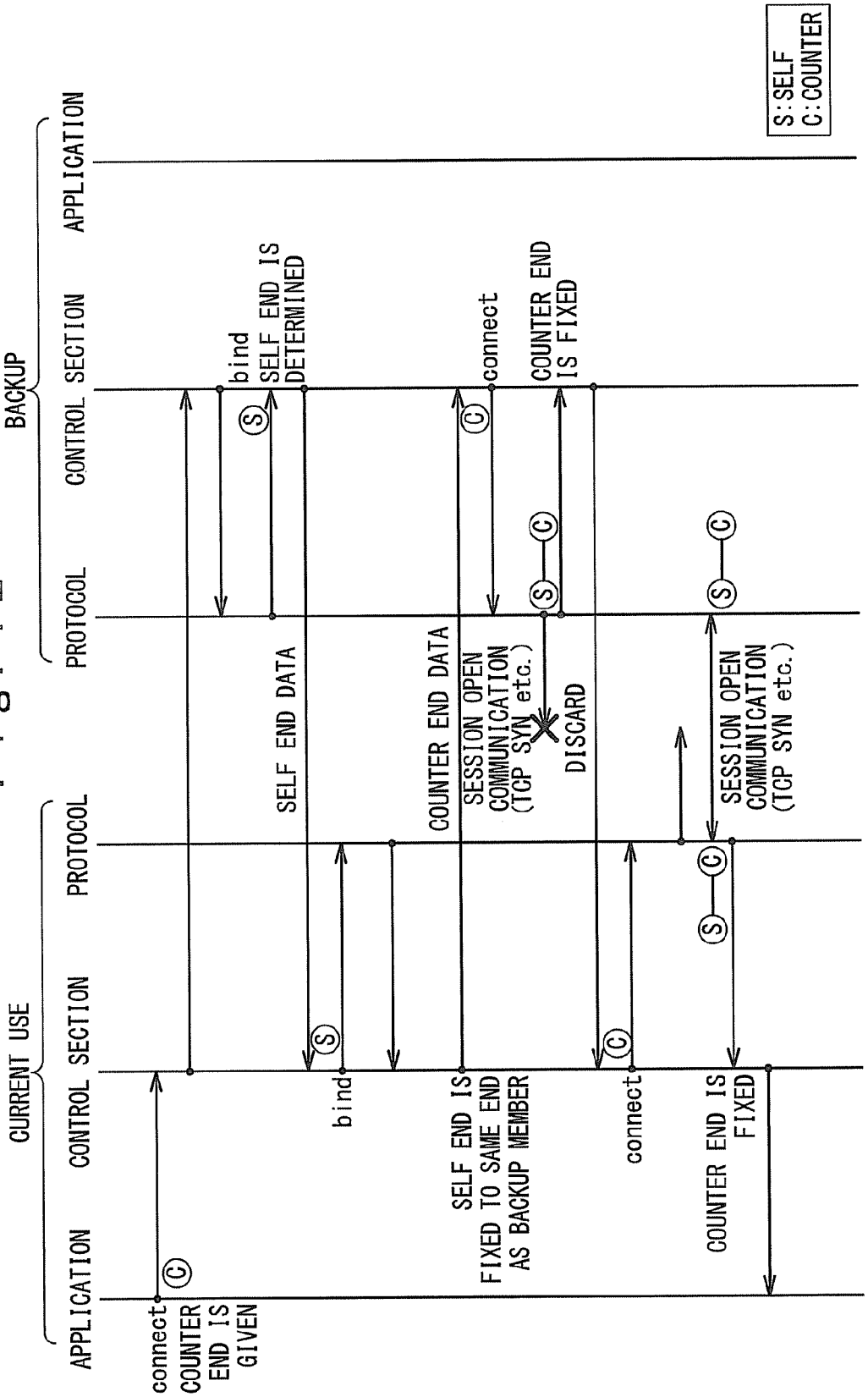
FIG. 12 shows a sequence to establishing a session on a client side of the first exemplary embodiment.

FIG. 12 is a sequence diagram showing a sequence of establishing the session on the client side. Referring to FIG. 12, when the application program in the current use system first calls the system call of "connect", the call is trapped by the control section.

Here, the endpoint on its own node side is first fixed. The endpoint on its own node side is not specified in the usual system call of "connect" and the protocol side selects a port number of the endpoint appropriately. However, in case of the redundancy configuration according to the present exemplary embodiment, an identical port number is allocated to the end points in the current use system and the backup system to generate the corresponding endpoints.

The system call of "bind" is used for fixation of the endpoint on its own node side as explained on the server side. Therefore, a process similar to a process of making the system call of "bind" redundant is first carried out to set the endpoints on their own nodes in the current use system and the backup system to a same state.

When the above process is successfully completed, a session with the counter endpoint is established. The backup system first issues the system call of "connect" in an asynchronization mode. A process of the system call of "connection" is ended once in the asynchronization mode even if establishment of a connection is not ended. Thus, the protocol in the backup system is set to a state in which the session is being established, and if the protocol is TCP, a process of transmitting a segment in which an SYN flag is set is carried out (though a packet is discarded before the transmission). The asynchronization mode is selected because since a packet is not actually transmitted in the backup system so that the session establishing process does not progress, and the system call of "connect" is not ended.

Next, the system call of "connect" is issued in the current use system side to actually execute the session establishing process. When the session establishing process is executed in the current use system, the packet is actually transmitted to establish the session. At this time, the backup system is waiting for a response from the counter endpoint, and the session establishing process will progress in the backup system upon reception of the response from the counter endpoint. As described above, the session is redundantly established in both of the current use and backup systems.

[System Switching Process]

Next, a failover process in which the system is switched to the backup system when the current use system is failed will be described below.

The dead/alive state of the current use system is monitored in accordance with a procedure defined separately. For example, a following method can be considered as a specific example of the monitoring procedure. It should be noted that the following method is one example to realize monitoring procedure and any other methods to monitor an operation of the current use system may be employed.

First, a current use monitoring section is internally provided in the current use system as to monitor whether each section properly operates in the current use system. Next, the monitoring section transmits operation information to the current use monitoring section in the backup cluster member in constant intervals.

The current use monitoring section determines a fault of the current use system when the operation information indicates abnormality detection or when subsequent operation information is not delivered after passing a predetermined period of time from reception of the last operation information.

Next, if the current use monitoring section detects the fault, the switching notifying section notifies occurrence of the fault occurred to the application program and the switching control section in the backup system. The application program in the backup system in a waiting state starts the operation in place of the application program in the current use system.

Also, the switching control section changes the operations of the writing section and the collating section. The writing section operates to transmit a write API call issued by the application program to the write API via the write API call trapping section without any change. The collating section also carries out a similar process to reading process. Through the above process, the backup system operates in a same manner as a host node of a stand alone type.

The functions of the current use monitoring section may be independently implemented by the application program. In this case, the current use monitoring section is omitted and the application program is operated to notify a fault of the current use system to the switching notifying section.

Effects of First Exemplary Embodiment

According to the present exemplary embodiment, the cluster member of the broadcast dispatch type with the application program operating thereon can be made redundant without any significant change to the OS, so that the reliability can be improved. It is because the configuration is employed which includes the read API call trapping section 161, the write API call trapping section 162, the copying and collating section 171, the copying and writing section 172, the control section 173 and the transferring section 174 between the application program 110 and the read and write API sections 151 and 152. That is, each of the above sections can be arranged outside of the OS, so that the cluster member with the application program operating thereon can be made redundant without changing the OS.

Second Exemplary Embodiment

In a second exemplary embodiment of the present invention, a load balance to the protocol process and a load balance to the application process are carried out under different policies in the cluster system of the broadcast dispatch type including a plurality of cluster members, each of which includes an application program operating thereon.

Figure 13B:
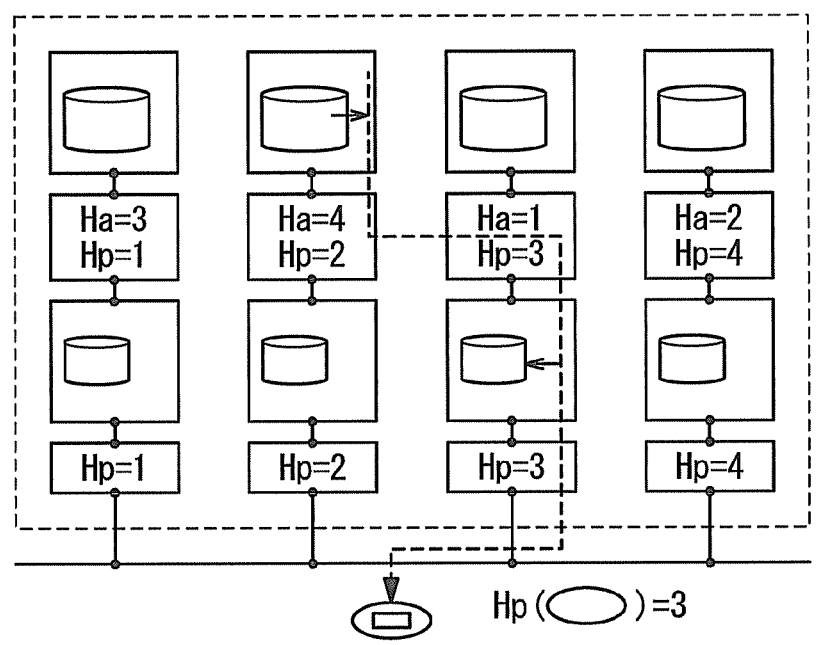
FIG. 13B shows an outline of a configuration of the cluster system according to the second exemplary embodiment of the present invention.

FIGS. 13A and 13B show a general configuration of the present exemplary embodiment and an operation example thereof. Referring to FIGS. 13A and 13B, the cluster system includes four cluster members, each of which is provided with a filter using a hash value in the same manner as the conventional cluster members of the broadcast dispatch type. Each of the cluster members is further provided with an application program, in which a distributing section using the hash value is provided between the protocol process and the application program.

The distributing section carries out an operation to recalculate the cluster members to process traffics in a transmission direction and a reception direction by using two hash functions for the protocol process and the application process, and retransmit the traffics to other cluster members as needed. Thus, it is made possible for the protocol process and the application program to process traffics distributed by different distribution methods.

On the reception side, the same process as those of the conventional cluster system of the broadcast dispatch type is executed up to the protocol process. Prior to transfer of reception data to the application program, the distributing section determines one cluster member in charge of an application process. This is carried out by applying a hash function for the application process, which differs from a hash function for the protocol process, to application data included in the packet (generally included as a payload) to calculate a hash value and determining the cluster member to which the hash value is allocated.

In the example of FIG. 13A, the cluster member for receiving the packet differs from the cluster member for the application process, and the distributing section transfers the reception data to the application program. Thus, the application program is possible to receive the packet without being conscious of the cluster member which executes the protocol process.

On the transmission side, the data transmitted from the application program is processed to pass through the proper cluster member in charge of a proper protocol process. The distributing section calculates and determines the cluster member in the charge of the protocol process by using the same hash function as that of a reception side filter used immediately after receiving the packet. In an example of FIG. 13B, the distributing section transfers the reception data before the application program writes transmission data and it is transferred to the protocol process. Therefore, the protocol processing section can execute the transmitting process without being conscious of communication with the application programs of the other cluster members.

Configuration of Second Exemplary Embodiment

Figure 14:
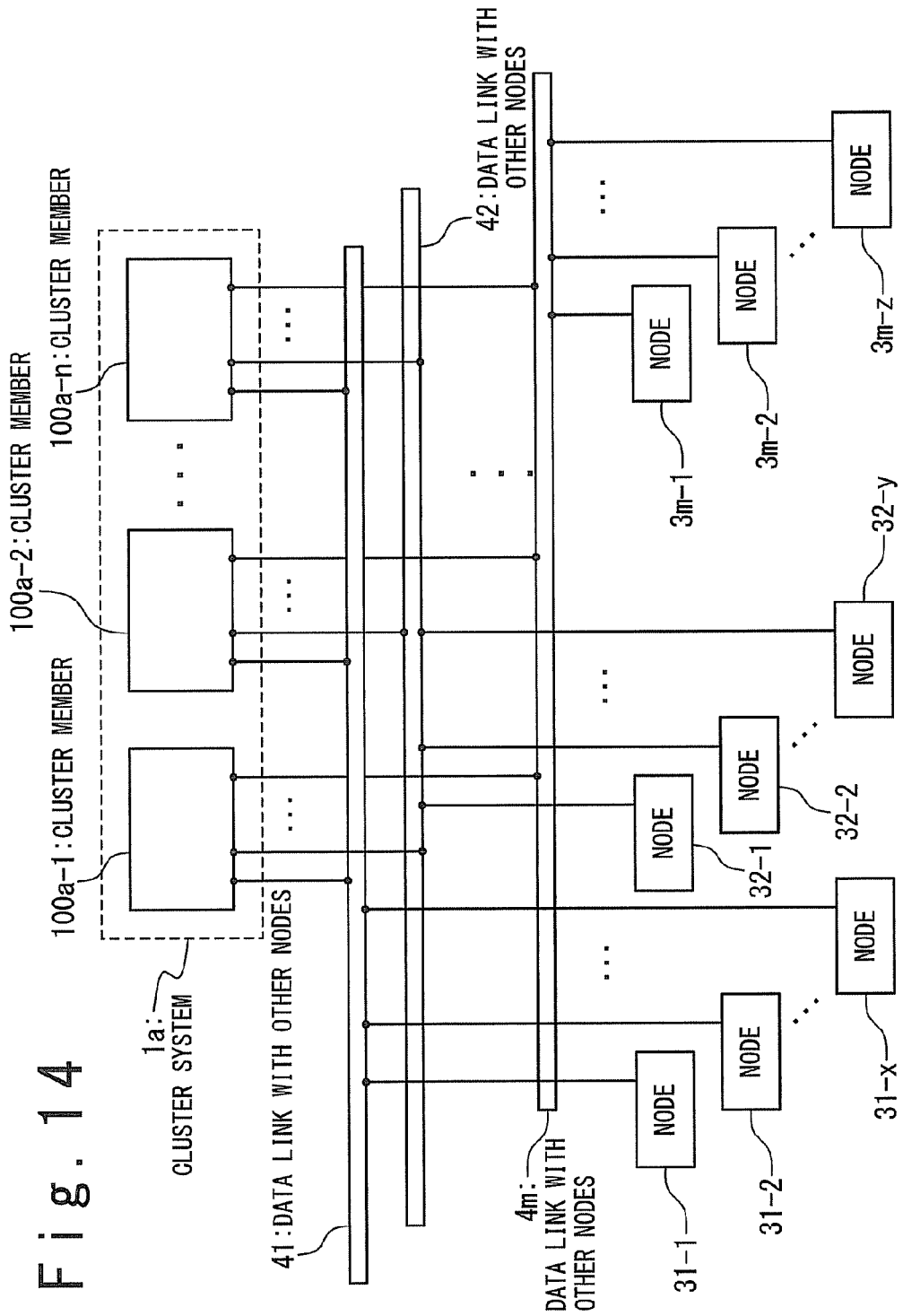
FIG. 14 is a block diagram showing a configuration example of the cluster system according to the second exemplary embodiment of the present invention.

FIG. 14 is a block diagram showing the cluster system according to the second exemplary embodiment of the present invention. Referring to FIG. 14, the cluster system 1*a* according to the present exemplary embodiment includes a plurality of cluster members 100*a*-1 to 100*a*-*n* connected to a plurality of data links 41, 42, . . . , and 4*m*. Each of the data links 41, 42, and 4*m* are connected to all the cluster members 100*a*-1 to 100*a*-*n* of the cluster system 1*a* and the data links are connected a plurality of nodes 31-1 to 3*m*-*z*, respectively.

Here, an identical representative MAC address is allocated to all the cluster members connected to the same data link. The reception interface of each of the cluster members is set so that when an adjacent node transmits a packet to this MAC address, the packet reaches all the cluster members. Meanwhile, a unique MAC address is also allocated to each of the cluster members for communication among the cluster members. This address is used to carry out one-to-one communication by specifying one cluster member of the cluster system 1*a*.

Figure 15:
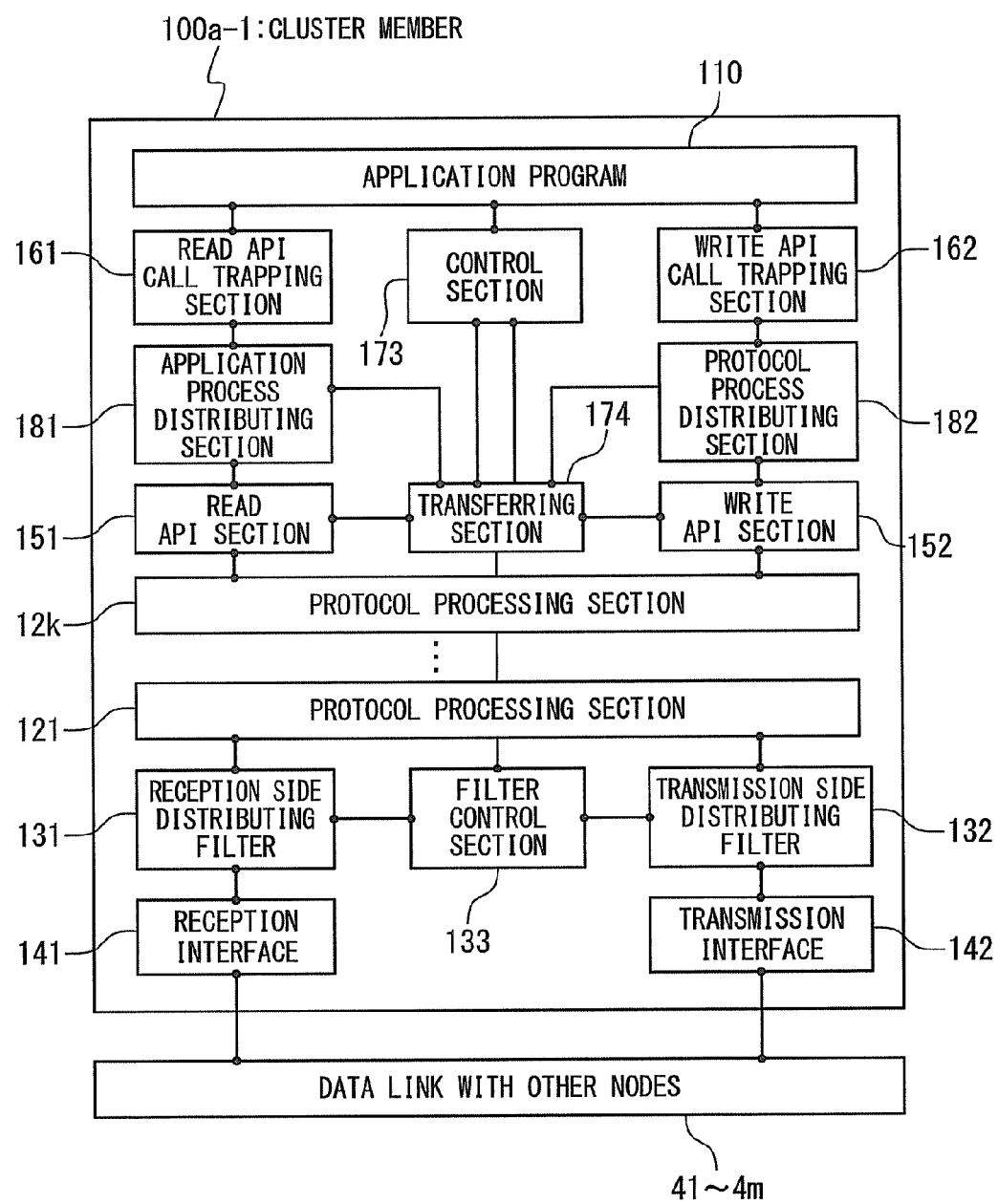
FIG. 15 is a block diagram showing a configuration example of the cluster member 100a-1 in the second exemplary embodiment.

FIG. 15 shows a configuration example of the cluster member 100*a*-1. The cluster member 100*a*-1 according to the present exemplary embodiment differs from the cluster member 100 according to the first exemplary embodiment shown in FIG. 1 in that the application process distributing section 181 is provided in place of the copying and collating section 171 and the protocol process distributing section 182 is provided in place of the copying and writing section 172. It should be noted that the remaining cluster members 100*a*-2 to 100*a*-*n* have the same configuration as the cluster member 100*a*-1.

The protocol process distributing section 182 executes a process to determine the cluster member to process transmission data on the basis of contents of protocol data. The protocol process distributing section 182 is internally provided with a section (not shown) to calculate a hash value of the transmission data in accordance with the same distribution rule as that of the reception side distributing filter. It is additionally provided with an allocation table (not shown) of hash values to the respective cluster members. That is, it is possible to determine not only the hash value allocated to the cluster member itself but also the hash values allocated to the other cluster members.

The application process distributing section 181 executes a process to determine the cluster member to process the reception data on the basis of contents of application data (which is data processed by the protocol processing section 12$k$ in the uppermost layer and transferred to the application program 110). The application process distributing section 181 is also internally provided with a section to determine the cluster member to process the reception data on the basis of the same application distribution rule as the protocol process distributing section 182.

The cluster member 100*a*-1 having such functions can be realized by a computer, and in such a case, the computer is set as follows for example. There is prepared a disc, a semiconductor memory or another recording medium in which a program is recorded for causing a computer to function as the cluster member 100*a*-1, and the program is read and loaded on the computer. The computer controls an operation of itself in accordance with the read program, thereby realizing on the computer itself, the protocol processing sections 121, 122, ..., and 12$k$, the reception side distributing filter 131, the transmission side distributing filter 132, the filter control section 133, the reception interface 141, the transmission interface 142, the read API section 151, the write API section 152, the read API call trapping section 161, the write API call trapping section 162, the control section 173, the transferring section 174, the application process distributing section 181 and the protocol process distributing section 182.

Operation of Second Exemplary Embodiment

Next, an operation of the present exemplary embodiment will be described in detail.
[Receiving and Reading Process]

First, a packet receiving process in the protocol and a reception data reading process by the application program will be described with reference to FIGS. 16A and 16B. A cluster reading process will be described later.

In the present exemplary embodiment, the reception data is broadcasted to all the cluster members 100*a*-1 to 100*a*-*n*, and thereby the packet to be processed in the cluster system 1*a* reaches all the cluster members 100*a*-1 to 100*a*-*n* regardless of whether or not it is a data to be processed.

Figure 16A:
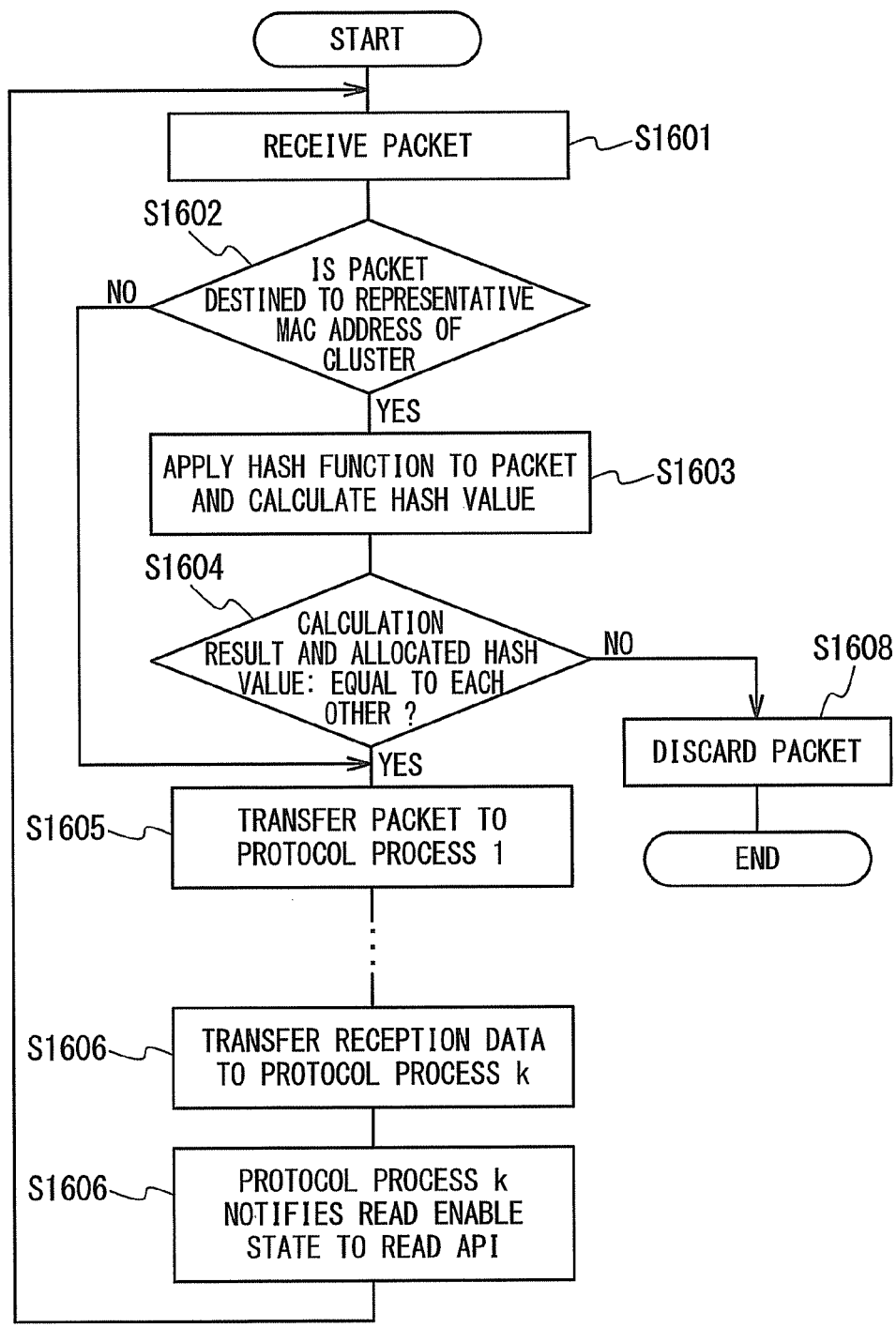
FIG. 16A shows an example of the receiving and reading process of a data in the second exemplary embodiment.

Referring to FIG. 16A, when receiving the packet via the reception interface 141, the reception side distributing filter 131 first distributes the packet by checking whether or not the packet is addressed to the representative MAC address of the cluster system 1*a* (steps S1601 and S1602). Here, the packet which may be possibly received is classified into the following three kinds:

The packet which is received directly from a communication node and addressed to the representative MAC address of the cluster system 1*a*;

The packet which is transmitted from another cluster member, addressed to a MAC address of the its own cluster member, and includes the reception data; and The packet which is transmitted from another cluster member, addressed to the MAC address of the cluster member itself, and includes the transmission data.

The packet which is not addressed to the representative MAC address of the cluster system 1*a* does not require a clustering process and is therefore transferred to the protocol process by skipping a distributing process at steps S1603 and S1604 (steps S1605 to S1607).

With a packet addressed to the representative MAC address of the cluster system 1*a*, a hash value is calculated by applying a predetermined hash function to a header of the packet in the reception side distributing filter 131 (step S1603).

The hash function is typically a process in which a transmission source address and a destination address of the IP header are regarded as integer values of four bytes, a sum of the values is calculated and further a remainder of a predetermined positive number is calculated. However, any hash functions may be employed as long as using a calculation method by which traffic can be entirely distributed to each of the cluster members without any gap.

Next, the reception side distributing filter 131 determines whether a hash value calculated as described above is equal to an integer value allocated to the cluster member in advance (step S1604). This allocation of the integer value is made in a same manner as the conventional broadcast rooter cluster. The packet having the calculation result which differ from an allocated hash value is discarded (step S1608), whereas only the packet whose calculation result is coincident with the allocated hash value is passed through the reception side distributing filter 131 (step S1605).

The packet passing through the reception side distributing filter 131 is transferred while being processed from the protocol processing section 121 in a low layer to the protocol processing section 12$k$ in a high layer (steps S1605 and S1606).

When ending the protocol process, the protocol processing section 12$k$ in the uppermost layer notifies that data can be read to the read API section 151 so that the application program 110 receives the reception data via the read API section 151 (step S1607).

Figure 16B:
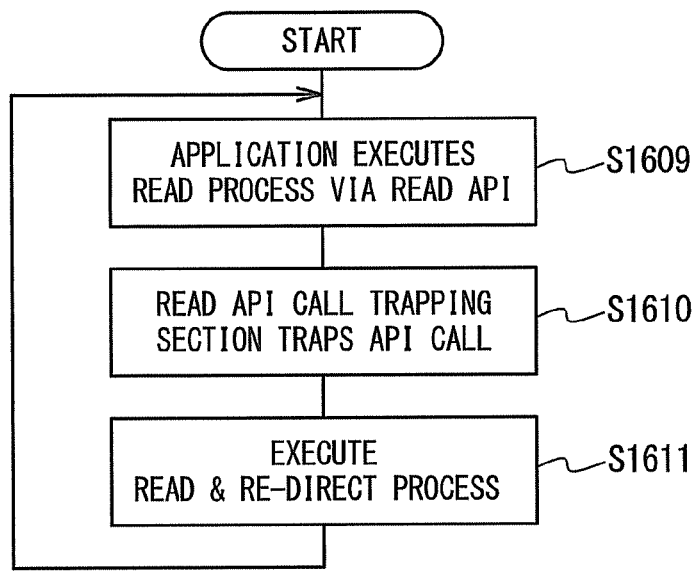
FIG. 16B shows an example of the receiving and reading process of a data in the second exemplary embodiment.

Meanwhile, the application program 110 calls the read API section 151 to read the reception data via the read API section 151 as shown in FIG. 16B. In the present exemplary embodiment, this call is trapped by the read API call trapping section 161 (steps S1609 and S1610) so as to execute the reading/redirecting process (step S1611).

Figure 17A:
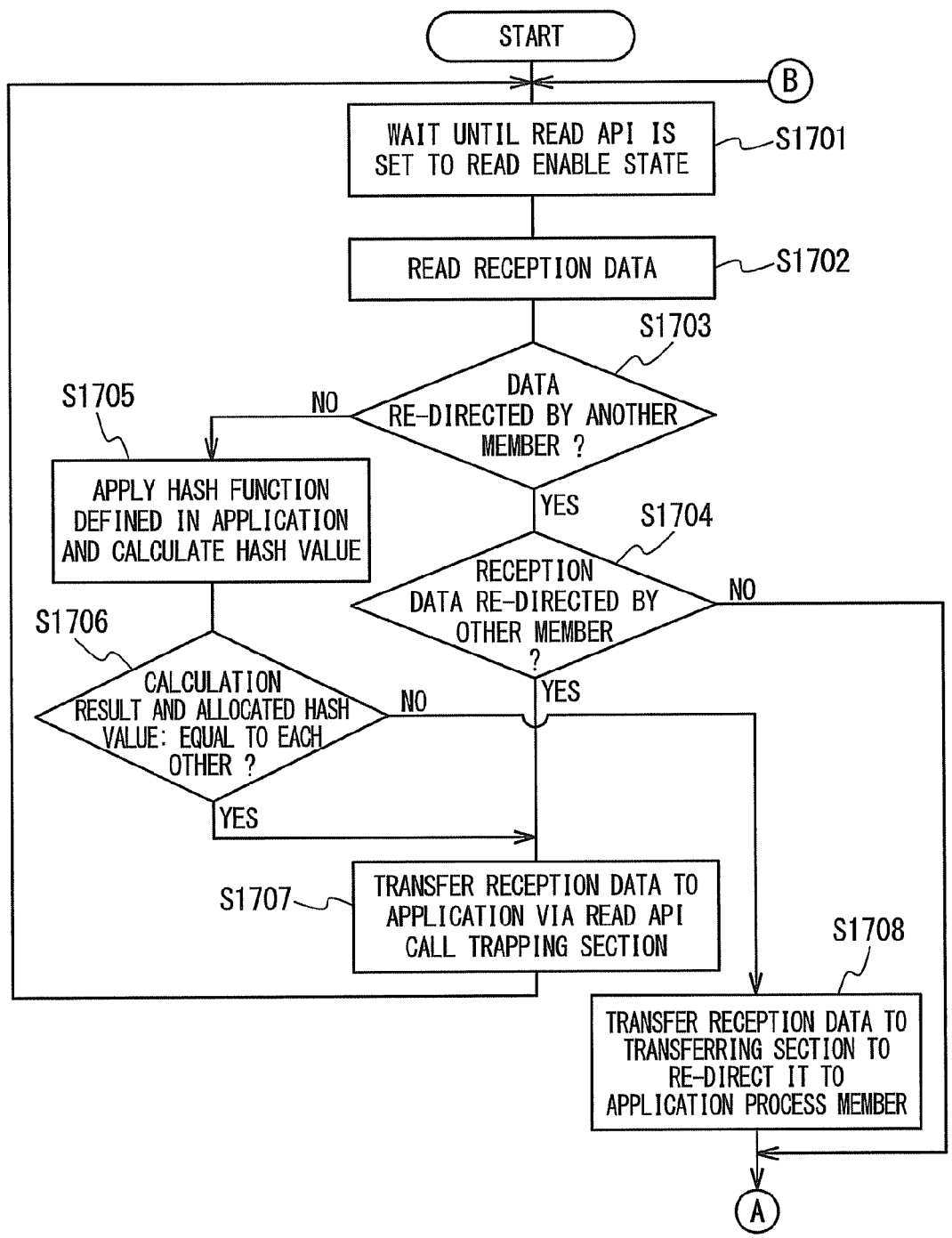
FIG. 17A shows an example of a reading and redirecting process of a data in the second exemplary embodiment.
Figure 17B:
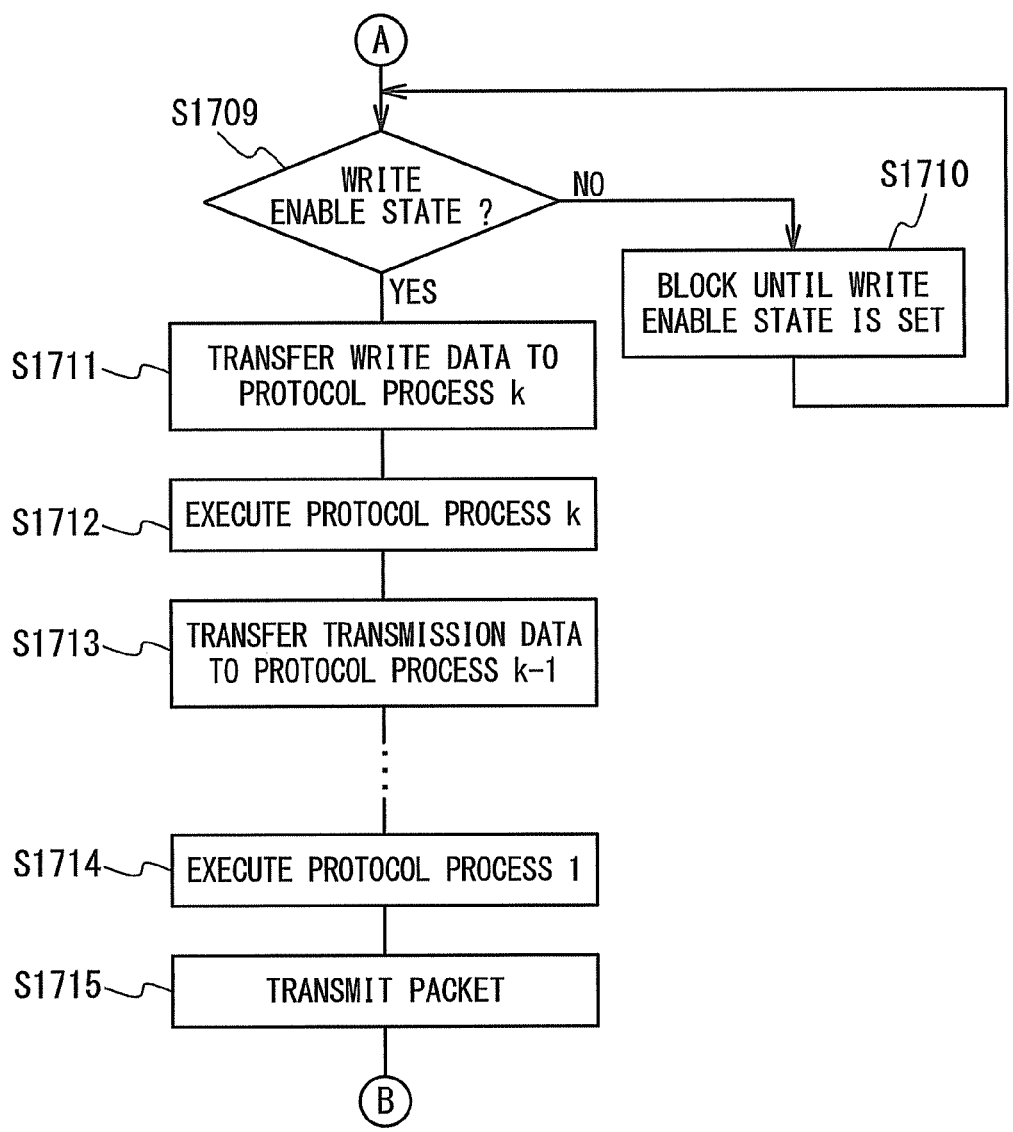
FIG. 17B shows an example of the reading and redirecting process of a data in the second exemplary embodiment.

Here, the reading/redirecting process executed at the step S1611 will be described in detail with reference to the flowcharts of FIGS. 17A and 17B. First, the read API call trapping section 161 reads the reception data transmitted from the read API section 151. However, if there is no reception data, the reading process is blocked until the reception data is prepared in the same manner as the conventional method (steps S1701 and S1702).

When the reception data is read, it is transferred to the application process distributing section 181. The application process distributing section 181 determines whether the data is a data redirected from another cluster member, based on a transmission source or the like of the data (step S1703).

If the data is not the redirected data, it is determined to be the reception data directly received from a communication node of the application program 110. This data is uploaded through the read API section 151 after being manipulated in the protocol process without any change, and the application process distributing section 181 recalculates the hash value of the reception data by using a hash function supplied from the application program 110, to apply a distribution method for an application program, which differs from the distribution method for the protocol process (step S1705).

If the calculation result is equal to the hash value allocated to its own cluster member (YES at step S1706), it is assumed that the process target application program operates in its own cluster member, so that the packet is transferred to the application program 110 via the read API call trapping section 161 (step S1707).

If the calculation result differs from the allocated hash value (NO at step S1706), it is assumed that the target application program operates in another cluster member. Which of the cluster members a hash value is allocated to is given in advance, and the allocation is referred to retransmit the reception data to the cluster member in charge (step S1708).

Therefore, the reception data is transferred to the transferring section 174, the transferring section 174 encapsulates the reception data into a UDP datagram or the like addressed to one cluster member on which the target application program operates, and further information is added to indicate that the data is reception data, so that the writing process is executed (steps S1709 to S1714). Then, a packet including the reception data is finally transmitted to the data link from the transmission interface 142 (step S1715). The reception data directly received from the communication node of the application program 110 can be processed as described above.

If the reception data is redirected from another cluster member, the data is further grouped into data which was originally reception data and data which was originally transmission data. Whether or not the data is the reception data can be determined based on the information which is attached at the time of redirecting the data and indicates that the data is reception data.

If the data is the reception data (YES at step S1704), the cluster member is determined to be in charge of the application process when the other cluster member calculates a hash value to the data. Therefore, the received reception data is transferred to the application program 110 via the read API call trapping section 161 (step S1707).

If the data is the transmission data (NO at step S1704), the afore-mentioned process at the steps S1709 to S1715 is executed. It should be noted that whether or not the data is the transmission data can be determined on the basis of the information which is attached at the time of redirecting the data and indicates that the data is the transmission data.

[Writing and Transmitting Process]

Figure 18A:
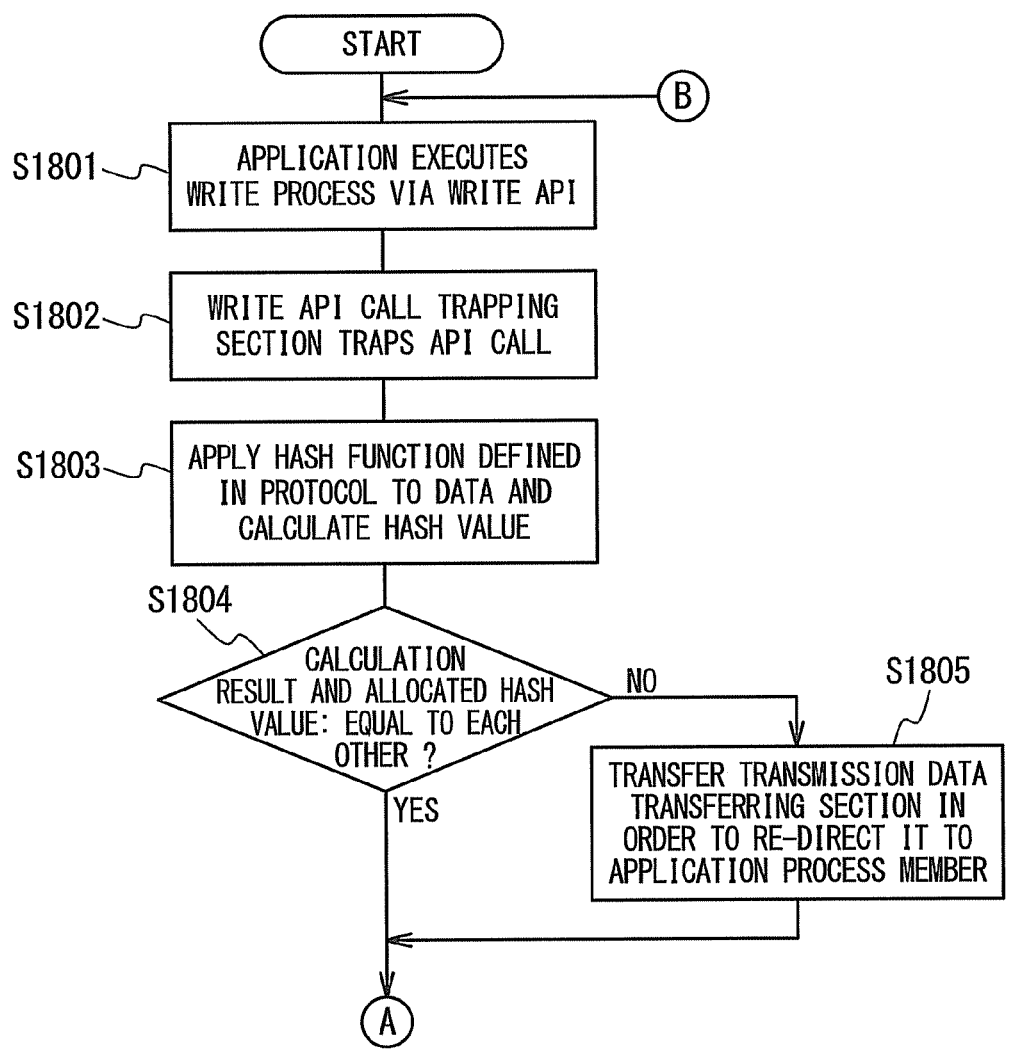
FIG. 18A is a flowchart showing an example of a writing and transmitting process of a data in the second exemplary embodiment.
Figure 18B:
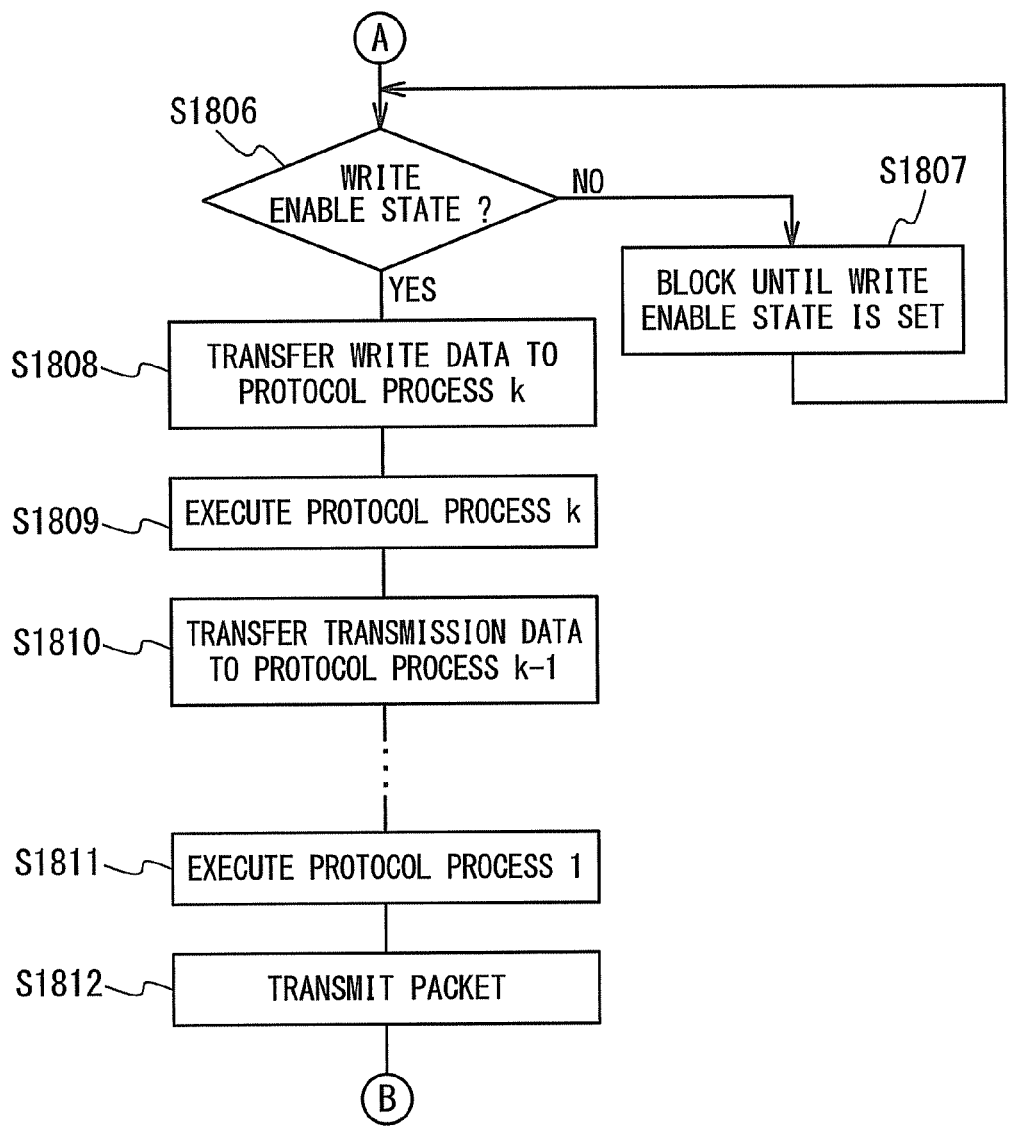
FIG. 18B is a flowchart showing an example of the writing and transmitting process of a data in the second exemplary embodiment.

Next, the writing and transmitting process will be described with reference to the flowcharts of FIGS. 18A and 18B. When the application program 110 calls the write API section 152, this call is trapped by the write API call trapping section 162 to transfer the transmission data from the application program 110 to the protocol process distributing section 182 (steps S1801 and S1802).

The protocol process distributing section 182 therefore applies a hash function for the protocol process to the transmission data which is transferred from the write API call trapping section 162, in order to calculate a hash value (step S1803).

If the calculation result is equal to the hash value allocated to its own cluster member (YES at step S1804), the cluster member in charge of applying the protocol process to the transmission data is determined to be its own cluster member, and the transmission data is transferred to the protocol processing section 12k via the write API section 152 (steps S1806 to S1808). It should be noted that the transmission data is transferred after waiting for a state in which data can be written if the protocol processing section 12k is not ready to write data. Thereafter, the protocol process is executed successively from the protocol processing section 12k in the uppermost layer and a packet is finally transmitted to the data link via the transmission interface 142 (steps S1809 to S1812).

In contrast, if the calculation result differs from the allocated hash value (No at step S1804), it is determined that a cluster member in charge of the protocol transmission process is not the cluster member itself. Since which cluster member the hash value is allocated to is given in advance, in the same manner as the case of the reception data, the allocation is referred to transmit the transmission data to the cluster member in charge.

The protocol process distributing section 182 therefore transfers the transmission data to the transferring section 174, where the transferring section 174 encapsulates the transmission data into a UDP datagram or the like addressed to the cluster member in charge and further attaches information indicating that the data is the transmission data. Then, the transferring section 174 executes the writing process (steps S1805 to S1811). Thereafter, a packet is finally transmitted to the data link via the transmission interface 142 (step S1812).

[Other Processes]

Next, in the same manner as the first exemplary embodiment, an operation of the APIs other than the reading/writing processes will be described. Here, a cluster method according to the present exemplary embodiment applied to the above control API using a Barkley socket API which is one of primary communication APIS will be described. Like the first exemplary embodiment, a typical method of using the Barkley socket API on the server side and the client side will be described with reference to a sequence diagram for the session establishing process.

[Session Establishment on Server Side]

Three system calls including "bind", "listen" and "accept" are mainly used to establish the session on the server side. A clustering process in each of these system calls will be described sequentially.

Figure 19:
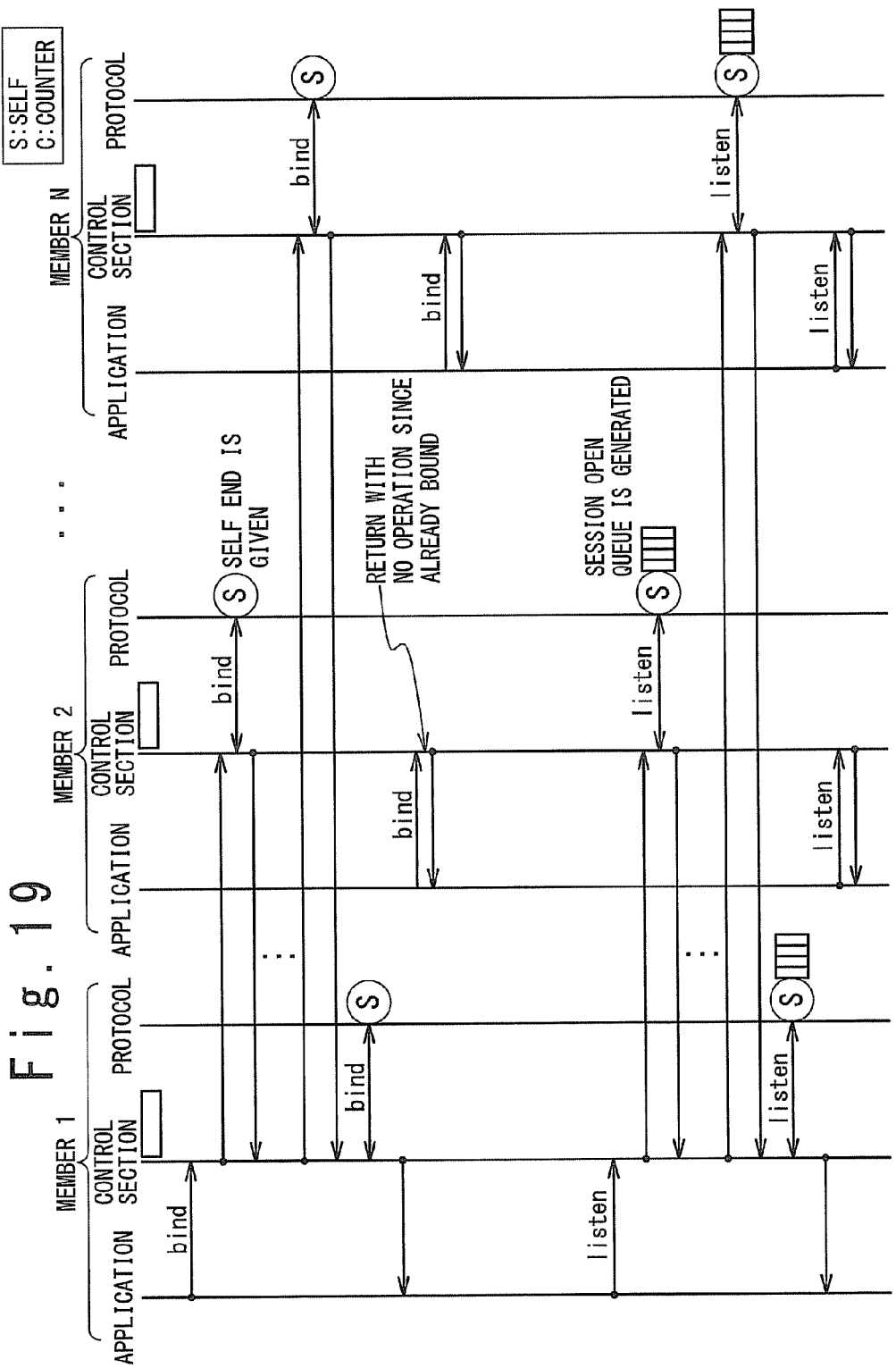
FIG. 19 shows a sequence of establishing a session on a server side in the second exemplary embodiment.

FIG. 19 is a sequence diagram showing a process flow up to "bind" and "listen" in the session establishing process on the server side. Referring to FIG. 19, when the application program of any one of the cluster members first makes a call, the call is transmitted to all the cluster members and the system call is issued in both cases of "blind" and "listen" (the cluster member 1 first issues "bind" and "listen" in FIG. 19). Thus, an endpoint is generated in each of the cluster members so as to allow to receive a session establishing request from a client. A notice simply indicating success of the call is notified to each of the application programs making a second API call or the subsequent. This is because the process has been already executed by an instruction from another application program.

Figure 20:
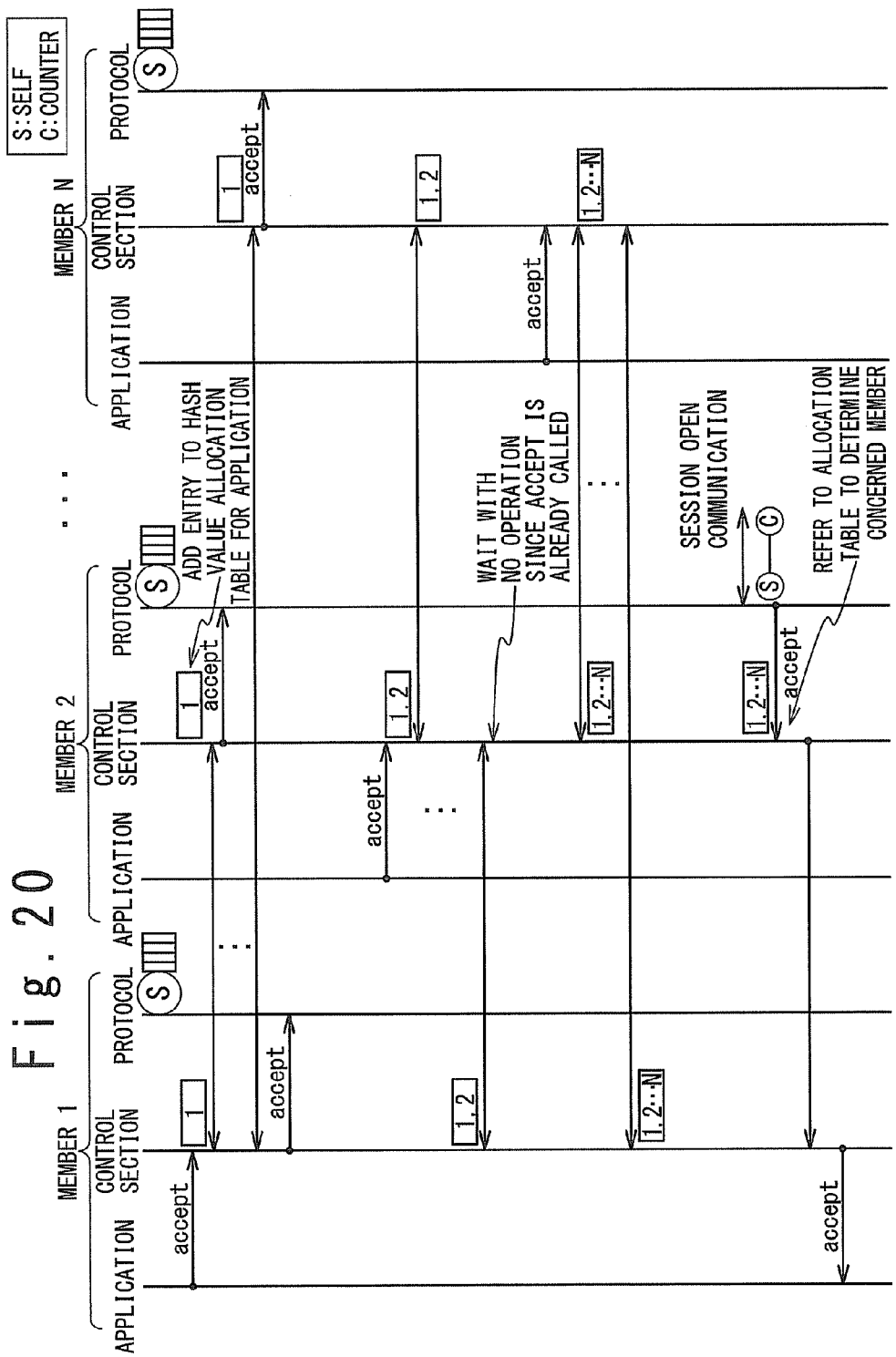
FIG. 20 shows a sequence of establishing a session on the server side in the second exemplary embodiment.

FIG. 20 is a sequence diagram showing a process flow of "accept" in the session establishing process on the server side. Referring to FIG. 20, when the application program of any one of the cluster members first makes a call, the call is transmitted to all the cluster members and the system call of "accept" is issued (the cluster member 1 first calls "accept" in FIG. 20). Thus, the communication socket descriptor is generated when a session is established by the protocol processing section in any one of the cluster members, and a communicable state is set by the protocol processing section in the cluster member.

Reception data actually arrives when the communicable state is set, and the reading process is executed to distribute arrived traffics to the application programs in the cluster members.

However, the application program may not call "accept" yet at this point of time in some of the cluster members. It is because the application programs operate on different machines from each other so that the process progress is not matched. Since the application program which does not yet call "accept" is not ready to wait for session establishment, it cannot execute the reading process even if the data receiving process is allocated to the cluster member having the application program.

In order to avoid the above problem, an entry of a cluster member with an application program operating thereon is added to a hash value allocation table for the cluster members when "accept" call is carried out by the application program.

When the application program of another cluster member calls second or later "accept", the call is notified to other cluster members for simply adding the entry thereof to the hash value allocation table (corresponding to the case where "accept" is called by a cluster member 2 and a cluster member N in FIG. 20). As described above, when the session is established, the cluster member in charge of process is selected based on the application programs in a waiting state and traffic is transmitted to the cluster member in charge.

Also, the above procedure is applied to the case of establishing a session in a connection-oriented protocol, whereas only the "bind" process is made redundant in the above procedure in case of a connectionless protocol. In the application program using a connectionless protocol, since the application program can receive data immediately after completion of the "bind" process, an entry of a cluster member with the application program operating thereon is added to the hash value allocation table.

[Session Establishment on Client Side]

On the client side, a session is typically established by issuing the system call of "connect". When the system call is issued, an endpoint on its own node side is fixed to request a protocol to establish the session with a counter endpoint, and a call is returned in response to the session establishment.

Figure 21:
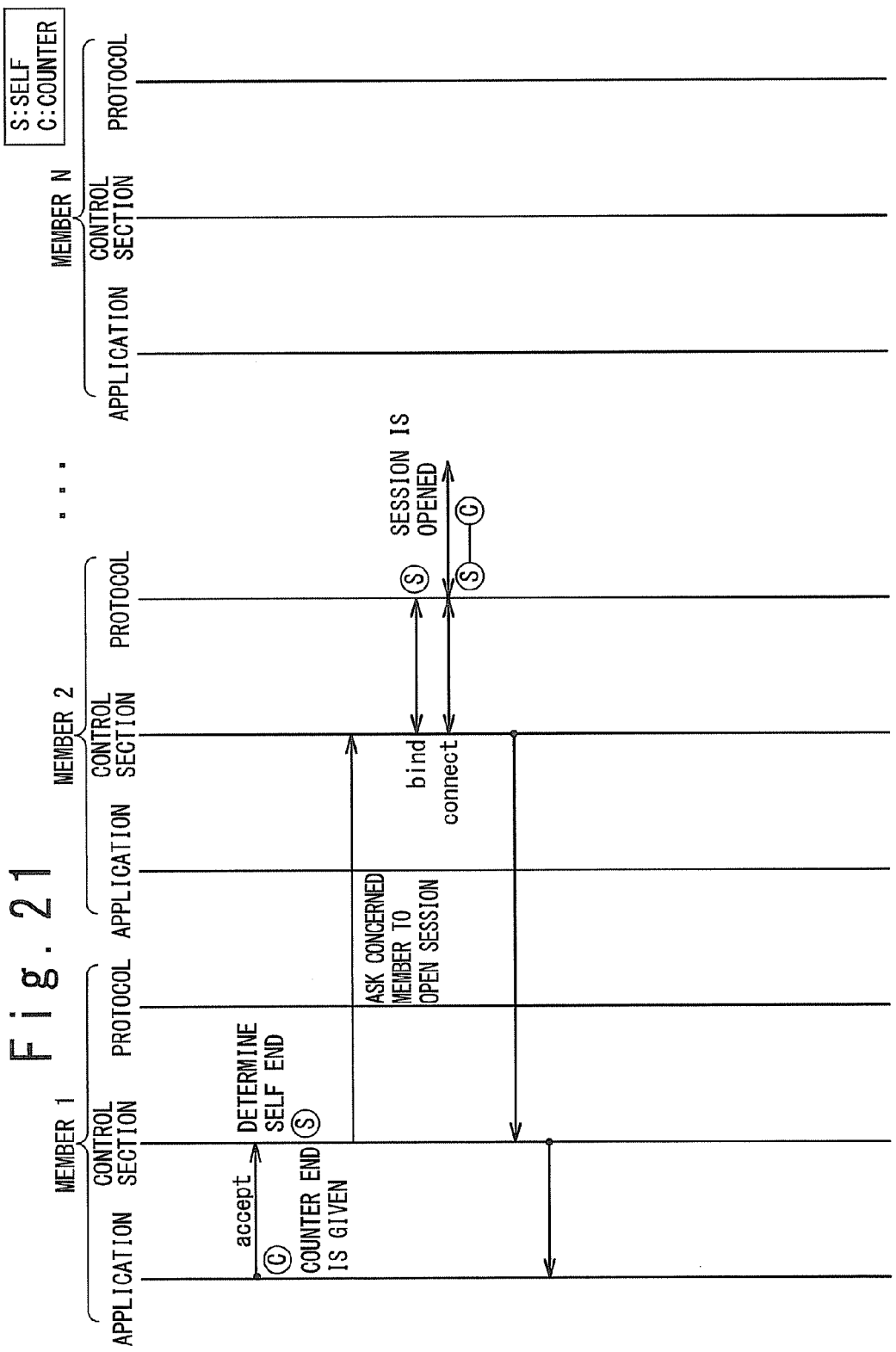
FIG. 21 shows a sequence of establishing a session on a client side in the second exemplary embodiment.

FIG. 21 is a sequence diagram showing a sequence of establishing the session on the client side. Referring to FIG. 21, the application program which establishes the session first carries out the system call of "connect", and then the call is trapped by the control section.

Here, a process to fix an endpoint on its own node side is first executed. In a normal "connect" call, a port number at an appropriate endpoint is selected by the protocol side. In the present exemplary embodiment, there is a possibility that arguments of a hash function required to calculate the cluster member in charge of the protocol process are lack, if the endpoint is not specified.

The hash function for distributing the protocol process typically uses an address and a port number included in a protocol header or the like. The counter endpoint is given from the application program as an argument of the "connect" call. However, if the endpoint is not fixed, it is impossible to obtain the above information and therefore the control section first determines the endpoint on its own node side.

Next, the cluster member in charge of the protocol process is determined and a session establishing request is transmitted to the cluster member in charge. In the example of FIG. 21, the application program of the cluster member 1 calls "connect" and the cluster member 2 is determined to be the cluster member in charge of the protocol process. The cluster member in charge of the protocol process fixes an endpoint on its own node side by the system call of "bind", and subsequently issues the system call of "connect" to actually establish a session. The result of the above process is notified to the cluster member which is a calling source of "connect", and thus, the process to establish the session is ended.

Effects of Second Exemplary Embodiment

According to the present exemplary embodiment, in the cluster system of the broadcast dispatch type with the application program operating thereon, it is possible to use different cluster members to execute the application process and the protocol process with respect to an identical traffic in load balancing. This is because the configuration is employed which includes the read API call trapping section 161, the write API call trapping section 162, the control section 173, the transferring section 174, the application process distributing section 181 and the protocol process distributing section 182 between the application program 110 and the read/write API sections 151 and 152.

Third Exemplary Embodiment

The present exemplary embodiment has one feature in that performance in the entire system is improved by distributing a traffic process load to a plurality of cluster members and reliability is further enhanced by processing the traffic redundantly.

Figure 22:
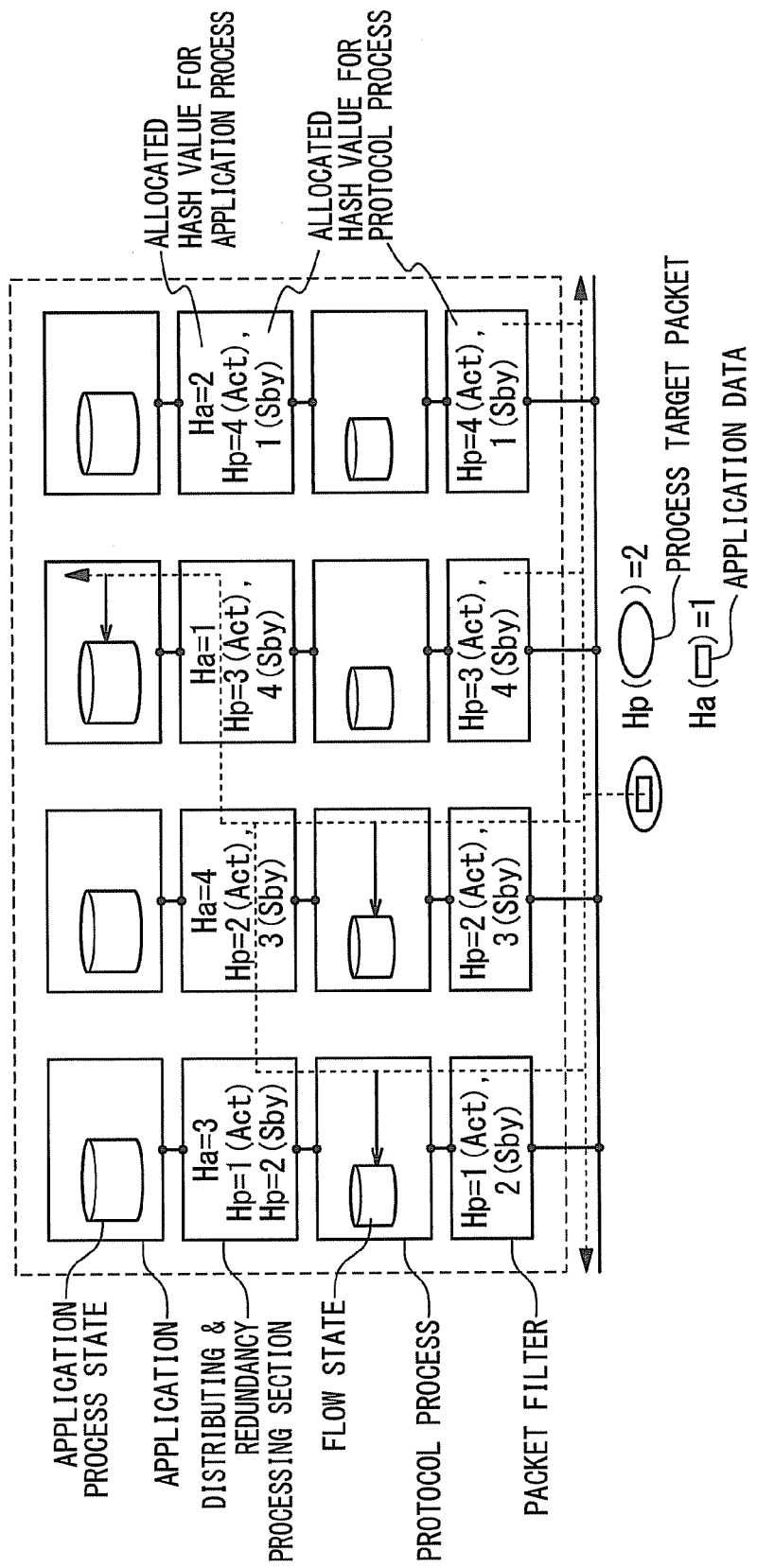
FIG. 22 shows an outline of the cluster system according to a third exemplary embodiment of the present invention.
Figure 23:
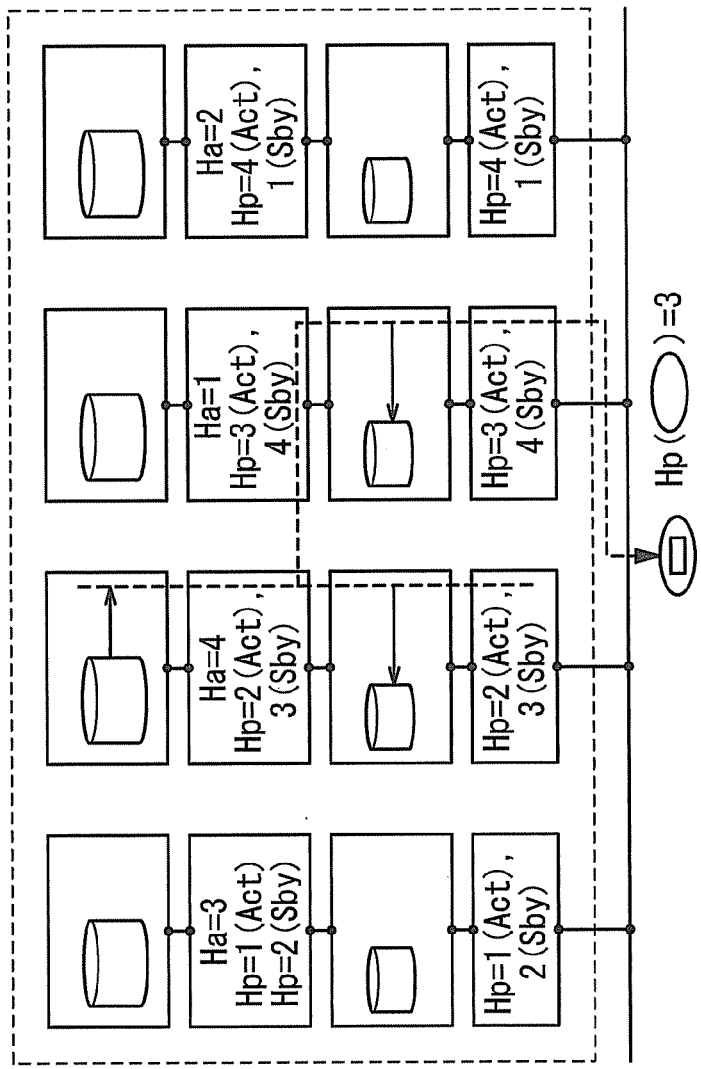
FIG. 23 shows an outline of the cluster system according to the third exemplary embodiment of the present invention.
Figure 24:
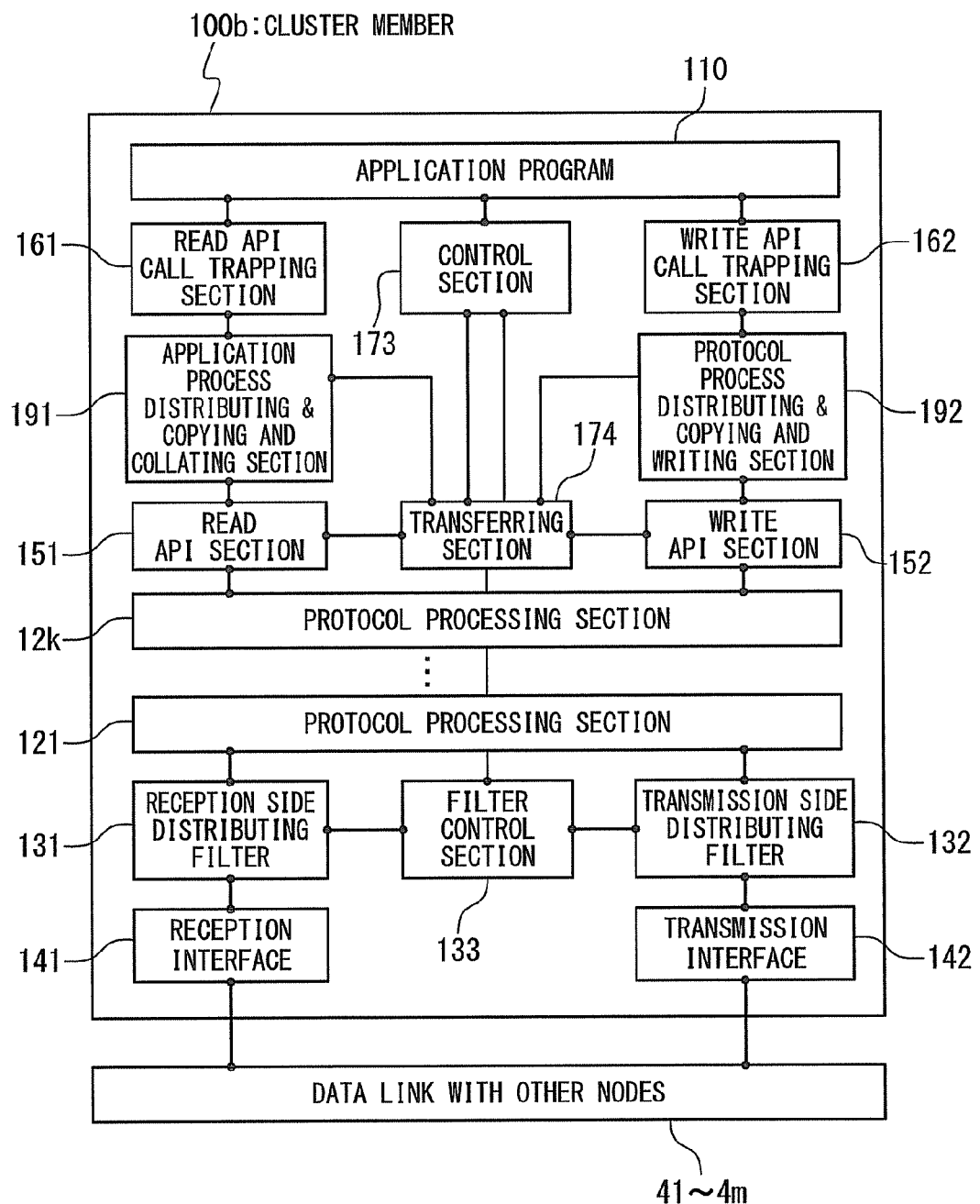
FIG. 24 is a block diagram showing a configuration example of a cluster member 100b in the third exemplary embodiment.

FIGS. 22 and 23 show a general configuration of the present exemplary embodiment and an operation example thereof. FIG. 22 shows an example of a receiving operation and FIG. 23 shows an example of a transmitting operation.

Referring to FIG. 22, the cluster member is provided with a packet filter and a distributing/redundancy processing section like the second exemplary embodiment. However, the distributing/redundancy processing section also carries out execution of a redundancy process in addition to simple determination of the cluster member in charge of the application process by using a hash value.

Two hash values are allocated to each of the cluster members in order to determine the cluster member in charge of the protocol process. One of the hash values is used for a current use process and the other one is used for a backup process. A hash value is allocated to one cluster member in charge of the current use process and one cluster member in charge of the backup process.

The broadcasted traffic is received by all the cluster members, and is processed by two cluster members in the current use system and the backup system in accordance with hash values calculated from a header or the like. After the protocol process is redundantly executed, data collation is carried out prior to transfer of the reception data to the application program. Thereafter, the cluster member in charge of the application process is determined in accordance with a hash function defined by the application program and, if necessary, the reception data is redirected to the cluster member in charge. Accordingly, the application program can receive data without being conscious of which of the cluster members carries out the protocol process and whether or not the protocol process is made redundant.

FIG. 23 shows a configuration which is the same as that of FIG. 22 except for the traffic direction. When the application program writes the transmission data through the API, and a hash value is first calculated in the distributing process to determine one cluster member in charge of the protocol process. Here, since one hash value belongs to two cluster members (in charge of the current use system and the backup system), a packet is copied and redirected to each of the cluster members as needed. Therefore, the application program can transmit data without being conscious of which of the cluster members executes the protocol process for the transmission data and whether or not the protocol process is made redundant.

Configuration of Third Exemplary Embodiment

The present exemplary embodiment is realized by using cluster members 100b having a configuration shown in FIG.

24, in place of the cluster members 100a-1 to 100-n each having the configuration shown in FIG. 15, in the cluster system shown in FIG. 14.

The difference between the cluster member 100b used in the present exemplary embodiment and the cluster member 100a-1 as shown in FIG. 15 is in that the application process distributing/copying and collating section 191 is provided in place of the application process distributing section 181 and the protocol process distributing/copying and writing section 192 is provided in place of the protocol process distributing section 182.

The application process distributing/copying and collating section 191 executes a process corresponding to the redundancy process on the reception side in the first exemplary embodiment and the distributing process on the reception side in the second exemplary embodiment.

The protocol process distributing/copying and writing section 192 also executes a process corresponding to the redundancy process on the transmission side in the first exemplary embodiment and the distributing process on the transmission side in the second exemplary embodiment.

A backup process of the application process includes the following allocating methods:

(1) All the cluster members operate to be current use in the application process and each of the cluster members is in charge of backup for any one of the other cluster members. If any one of the cluster members is failed, the cluster member in charge of the backup for the failed cluster member takes over the application process thereof; and (2) The cluster member in charge of the backup is prepared separately from the current use cluster member. This cluster member performs as the backup cluster member for all the application processes. This cluster member usually does not execute processes except for saving a state required in the backup process or the like.

The functions of components other than the above component are similar to those of the first and second exemplary embodiments and the description thereof will be omitted.

It should be noted that the cluster member 100b can be realized by a computer. In such a case, a disk, a semiconductor memory or another recording medium in which a program is recorded to cause the computer to function as the cluster member 100b is prepared, and the program is loaded in the computer. The computer controls the operation of itself in accordance with the loaded program, to realize on the computer itself, the protocol processing sections 121, 122, . . . , and 12k, the reception side distributing filter 131, the transmission side distributing filter 132, the filter control section 133, the reception interface 141, the transmission interface 142, the read API section 151, the write API section 152, the read API call trapping section 161, the write API call trapping section 162, the application process distributing/copying and collating section 191, the protocol process distributing/copying and writing section 192, the control section 173 and the transferring section 174.

Operation of Third Exemplary Embodiment

Next, the operation in the present exemplary embodiment will be described in detail.

[Receiving and Reading Process]

Figure 25A:
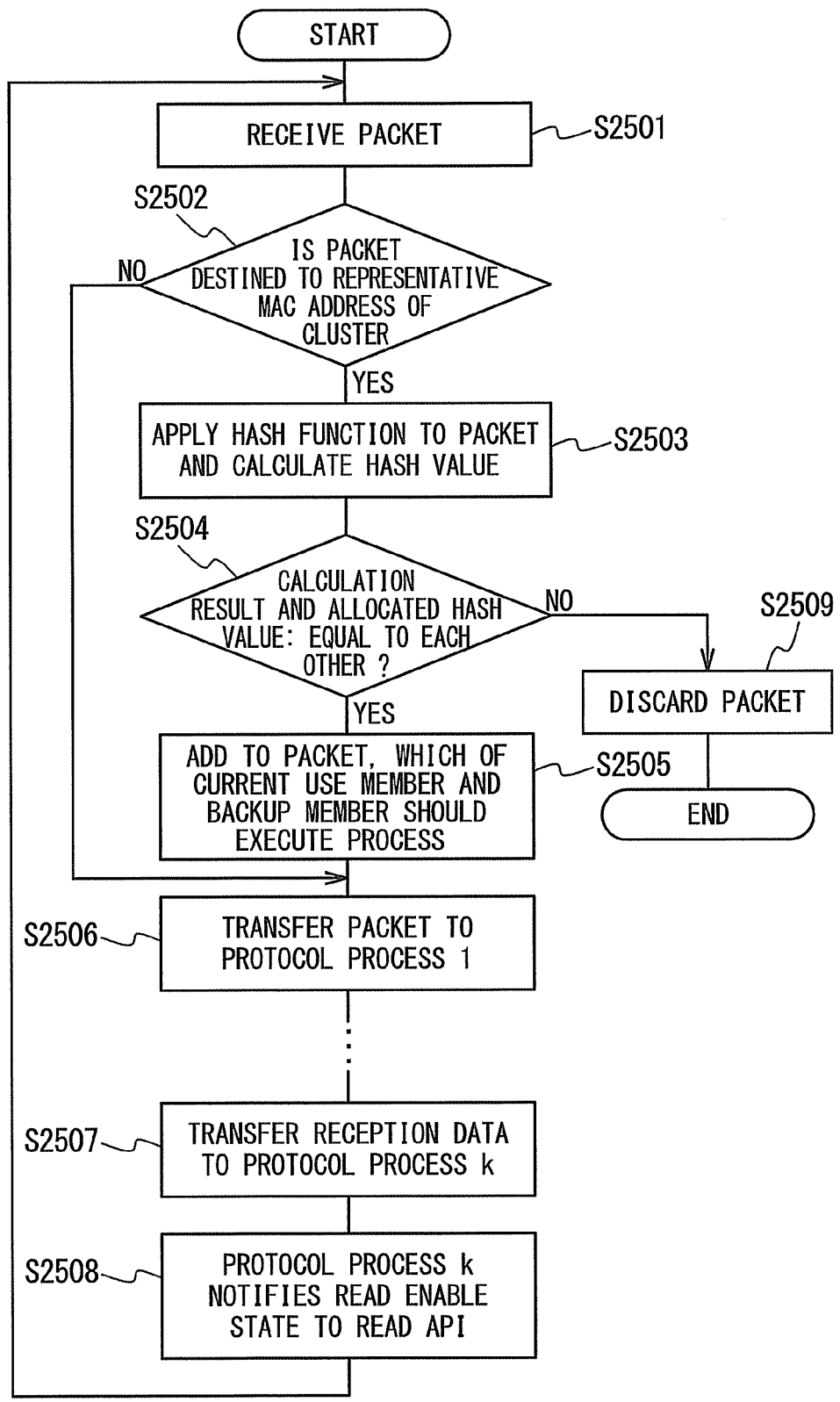
FIG. 25A is a flowchart showing an example of a receiving and reading process of a data in the third exemplary embodiment.
Figure 25B:
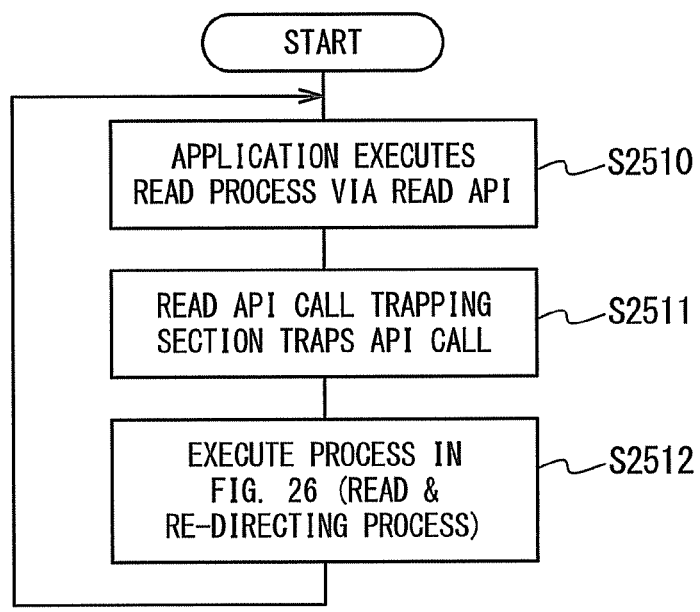
FIG. 25B is a flowchart showing an example of the receiving and reading process of a data in the third exemplary embodiment.
Figure 26A:
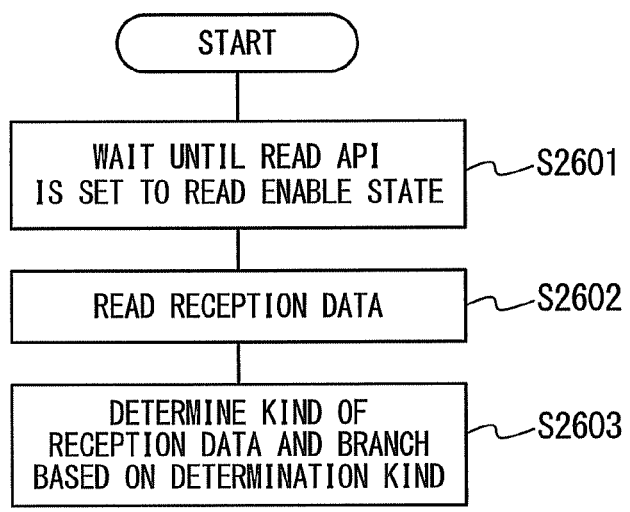
FIG. 26A is a flowchart showing an example of a reading process of a data in the third exemplary embodiment.
Figure 26C:
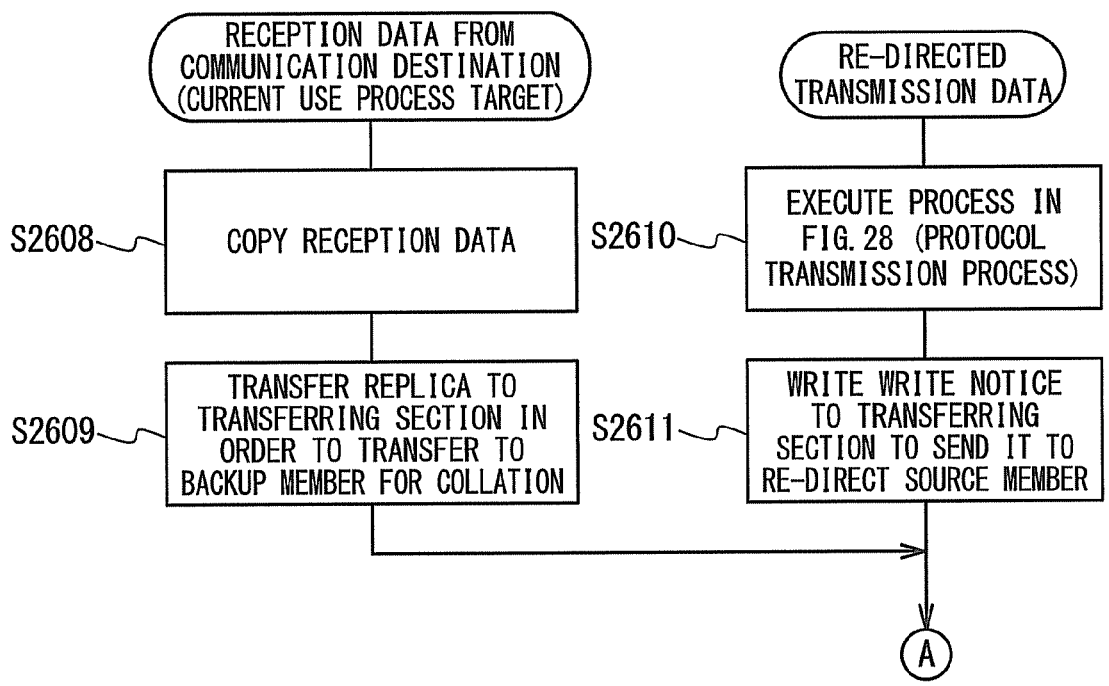
FIG. 26C is a flowchart showing an example of the reading process of a data in the third exemplary embodiment.
Figure 26D:
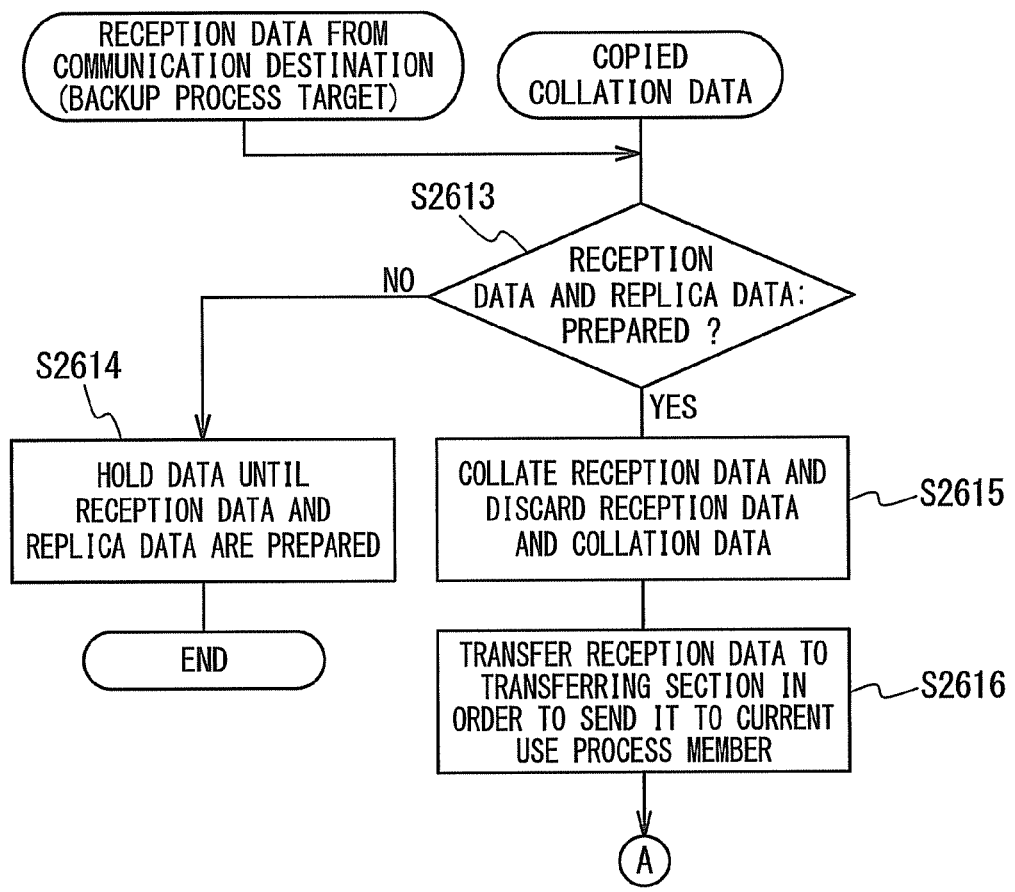
FIG. 26D is a flowchart showing an example of the reading process of data in the third exemplary embodiment.

FIGS. 25A and 25B are flowcharts showing the operation in a packet receiving process in the protocol and a reception data reading process in the application program according to the present exemplary embodiment. The clustering process for read will be described later.

First, a process steps S2501 to S2509 in FIG. 25A will be described. In the process of the steps S2501 to S2504 in FIG. 25A, the same process as a process of the steps S1601 to S1604 in the second exemplary embodiment as shown in FIG. 16A is executed, while in the process of the steps S2506 to S2509, the same process as a process of the steps S1605 to S1608 as shown in FIG. 16A is executed. The difference from FIG. 16A is in that the process of the step S2505 is executed when a received packet is addressed to the representative MAC address of the cluster system and a hash value obtained by the reception side distributing filter 131 is equal to a corresponding hash value of its own cluster member (YES at steps S2502 and S2504). Since one hash value is allocated to the cluster member in chare of the current use process and the cluster member in charge of the backup process, a process is executed at the step S2505 where which of the above two cluster members the received packet corresponds to is determined by using the hash value allocating table and the information indicating the allocation is attached to the packet.

Meanwhile, the application program 110 calls the read API section 151 in order to read the reception data via the read API section 151, as shown in FIG. 25B. In the present exemplary embodiment, this call is trapped by the read API call trapping section 161 (steps S2510 and S2511) so as to execute the reading and redirecting process (step S2512).

FIGS. 26A to 26D are flowcharts showing an operation of a cluster adding process at the time of reading data. First, a read reception reading process from the read API section 151 is executed like the conventional reading process. However, if there is no reception data, the reading process is blocked until the reception data is prepared like the conventional process (steps S2601 and S2602).

When the reception data is read, it is first determined which of processes the read data corresponds to (step S2603). In the present exemplary embodiment, the reception data corresponds to one of following seven kinds:

1. Reception data directly received from a communication node:
   1.1 Reception data for the current use process; and
   1.2 Reception data for the backup process,
2. Data for a collating process:
   2.1 Collation data transmitted from the current use cluster member in charge to the backup cluster member in charge; and
   2.2 Collation result transmitted from the backup cluster member in charge to the current use cluster member in charge,
3. Redirected data:
   3.1 Reception data transmitted from the cluster member in charge of the protocol process to the cluster member in charge of the application process;
   3.2 Transmission data transmitted from the cluster member in charge of the application process to the cluster member in charge of the protocol process; and
   3.3 Write notice transmitted from the cluster member in charge of the protocol process to the cluster member in charge of the application process.

If a packet is encapsulated by UDP or the like, and a flag is attached to the packet to indicate the collation data or the redirect data, these data can be determined. Other data are data which is directly received from the communication node and information is attached to indicate that the data is for the backup process. As described above, the above seven kinds of data can be determined.

The process in each case will be described below.

Of data received directly from the communication node, if the data is for the current use process, a process is executed to collate the reception data with the cluster member in charge of the backup process. More specifically, the reception data is first copied (step S2608) and a replica data is transmitted as collation data to the cluster member in charge of the backup process via the transferring section 174 (step S2609). Here, the reception data is held by the cluster member in charge of the current use process until a collation result is received.

Of data received directly from the communication node, if the data is for the backup process, the reception data is collated with the collation data transmitted from the current use cluster member. More specifically, if the reception data is first received (NO at step S2613), arrival of collation data is waited for while holding the reception data (step S2614). Since the reception data and the collation data can be associated with each other by using information on the connection endpoint (such as a transmission source address, destination address and port number) to which the data is transmitted, the information is also held along with the data. When the data is prepared, the content of the data is collated (step S2615) so as to transmit the collation result back to the current use system by using the transferring section 174 (step S2616).

If the collation data of data used for the collating process is received, it is assumed that a corresponding data for the backup process is received. The process at the steps S2615 and S2616 is executed if these data has been already received (YES at step S2613), or the process is executed after waiting for receiving these data if not yet received.

If the collation result of data used for the collating process is received, it is confirmed whether or not the collation has been successfully made. In case of collation failure, the reception data is discarded to end the process (not shown but carried out prior to the step S2604). In case of the collation success, a hash function supplied from the application program is used to recalculate the hash value of the reception data and to determine the cluster member on which the application program operates to process the stored reception data (step S2604).

If the calculation result is equal to the value allocated to the cluster member (YES at step S2605), the application program to process the reception data is assumed to be operating on this cluster member, and therefore, a packet is transferred to the application program 110 via the read API call trapping section 161 (step S2606).

If the calculation result is different from the allocated value (NO at step S2605), the application program to process the reception data is assumed to be operating on another cluster member. Since it is informed in advance which cluster member a hash value is allocated to, the reception data is retransmitted to the cluster member to process the reception data by referring to the allocating table (step S2607). Therefore, the reception data is transferred to the transferring section 174, and the transferring section 174 encapsulates the reception data into a UDP datagram or the like addressed to the cluster member on which the application program to process the data is operating, attaches information indicating that the data is the reception data, and further executes the writing process.

If the data redirected from another cluster members is the reception data, this indicates that the other cluster member a hash value to the data and determines that this cluster member is in charge of the application process. Therefore, the reception data is transferred to the application program via the read API call trapping section 161 (step S2606).

The processes in the case of the transmission data and the write notice will be described together with the writing process.

[Writing and Transmitting Process]

Figure 27A:
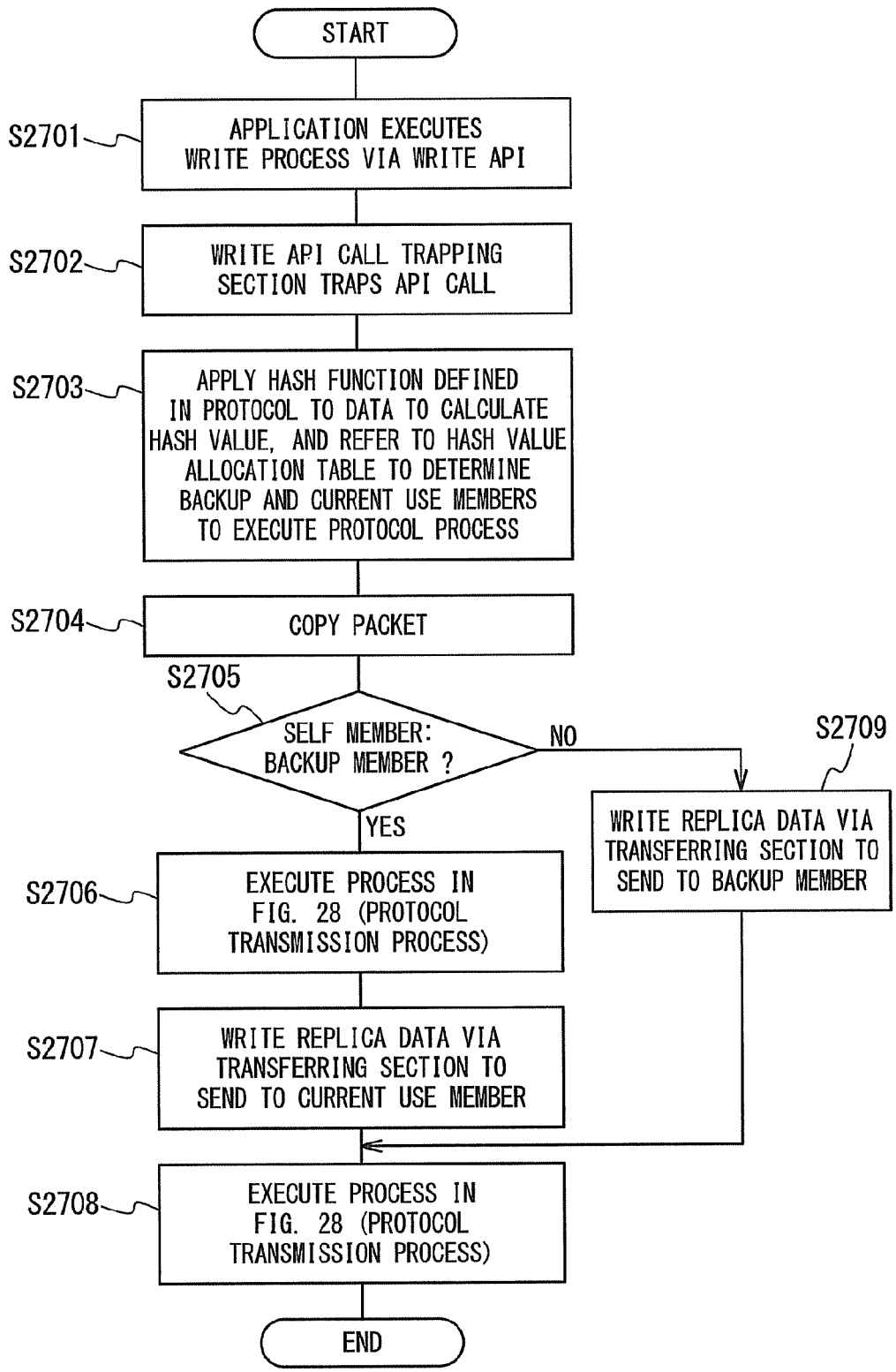
FIG. 27A is a flowchart showing an example of a writing and transmitting process of a data on an API side in the third exemplary embodiment.
Figure 27B:
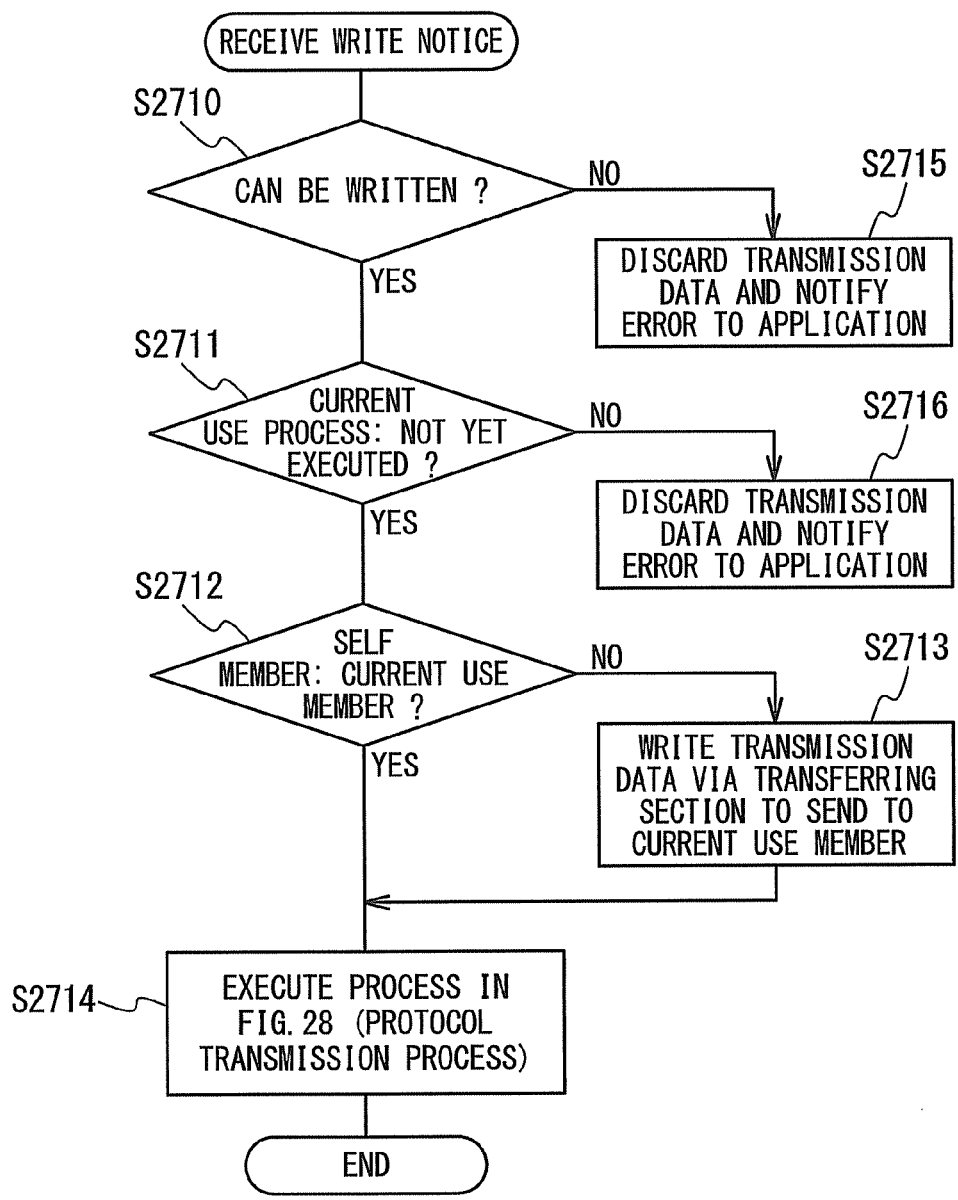
FIG. 27B is a flowchart showing an example of a writing and transmitting process of a data on the API side in the third exemplary embodiment.

FIGS. 27A and 27B are flowcharts showing an operation of the writing process according to the present exemplary embodiment. Referring to FIGS. 27A and 27B, the writing process is started by the application program 110 calling the write API section 152 (step S2701).

According to the configuration of the present invention, the call of the write API section 152 is trapped by the write API call trapping section 162 so as to execute the following process as the writing process (step S2702).

First, the hash value of the reception data is recalculated by applying a hash function for the protocol process to the transmission data which has been written by the application program 110. The cluster member in charge of the hash value is determined by searching the hash value allocating table for the hash value (step S2703).

Since one hash value is allocated to two current use and backup cluster members in the protocol process, the packet is first copied to transfer the packet to these cluster members (step S2704).

Next, in order to make the protocol process redundant, the transmitting process is executed by each of the current use cluster member and the backup cluster member. The cluster member in charge of the backup process first executes the transmitting process like the first exemplary embodiment. If the cluster member itself is in charge of the backup process (YES at step S2705), the transmission data is written directly via the write API section 152 (step S2706). Details of the writing and transmitting process will be described later with reference to FIG. 28. When the data is successfully written, the copied transmission data is transmitted to the cluster member in charge of the current use process (which is always allocated to a cluster member other than its own cluster member) (steps S2707 and S2708).

If its own cluster member is not in charge of the backup process (YES at step S2705), the replica data is redirected to the cluster member in charge of the backup process in order to cause the cluster member to execute the transmitting process (step S2709).

When the replica data is redirected to another cluster member, the other cluster member which received the replica data executes the transmitting process in the extension of the redirected data receiving process (in case that the redirected transmission data is received, as shown in FIGS. 26A to 26D). In this case, since it has been already determined that the cluster member executes the protocol process for transmission data, the transmission data is simply written via the write API section 152 (step S2610). When the writing process is ended, the result is transmitted back to a redirect source (i.e. a cluster member whose application program calling the write API section 152) as a write notice (step S2611).

Next, a process responding to reception of the write notice will be described. First, if the write notice indicates a result of failure (NO at step S2710 of FIG. 27B), an error is returned to the writing process of the application program due to determination of the failure in data write (step S2715).

Next, if the data is successfully written (YES at step S2710), necessity of the current use process is determined (step S2711). If the redirect source is not the cluster member in charge of the backup process, the transmitting process on the current use system side is further required after executing the backup process. Accordingly, whether or not the transmitting process on the current use system side has been already executed is determined and the process is executed if it is not yet executed (YES at step S2711). If the transmitting process is already executed on the current use system side (NO at step S2711), the transmission data is discarded to notify an error to the application program 110 (step S2716).

If its own cluster member is in charge of the current use process (YES at step S2712), the data is written directly by calling the write API (step S2714). If the data is successfully written, a process of the write API section 152 called by the application program 110 is properly ended.

If another cluster member is in charge of the current use process (NO at step S2712), the transmission data is redirected to the cluster member (step S2713). Furthermore, when the write notice is received, it is confirmed whether or not the data is successfully written and the data writing result is notified to the application program 110 to end the writing process.

Figure 28:
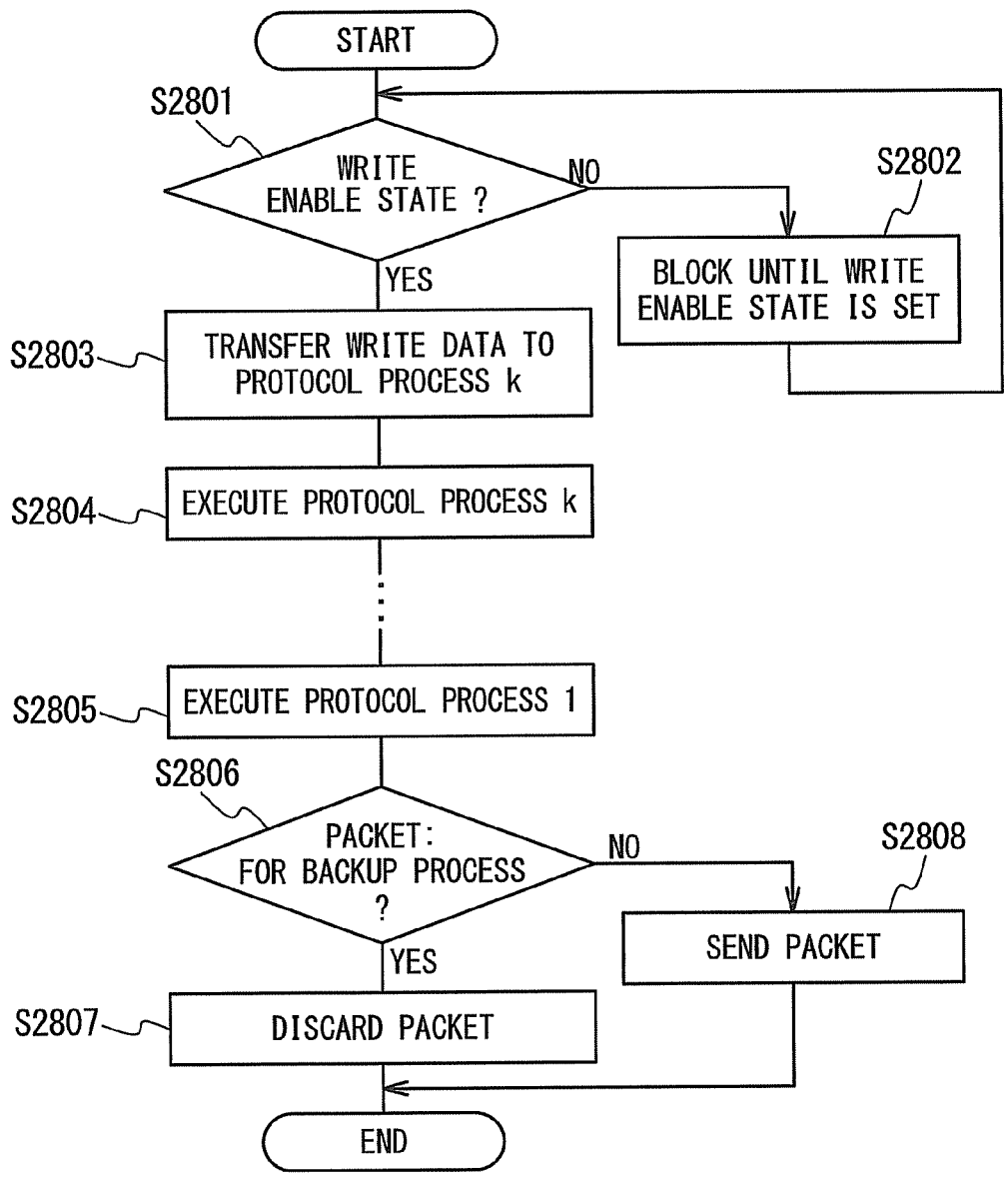
FIG. 28 is a flowchart showing an example of the writing and transmitting process of a data on a protocol process side in the third exemplary embodiment.
Figure 29A:
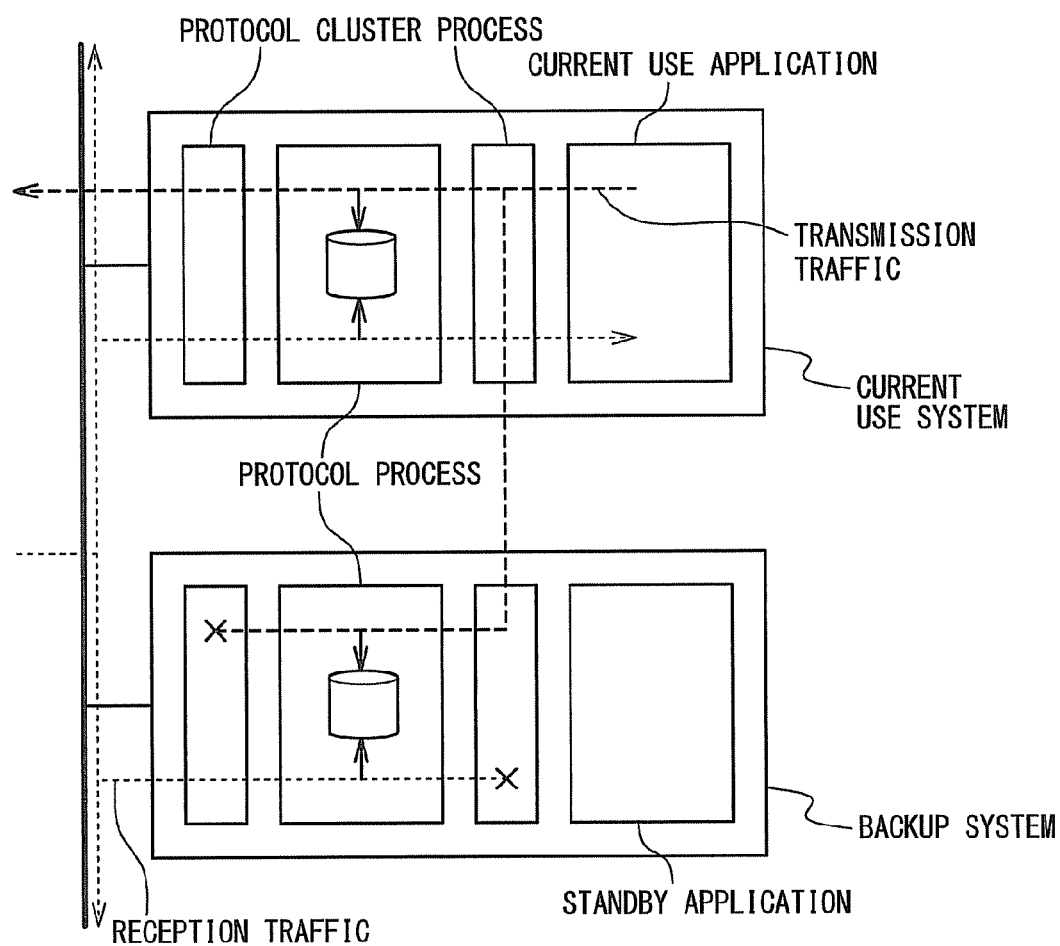
FIG. 29A shows an effect of the present invention.
Figure 30:
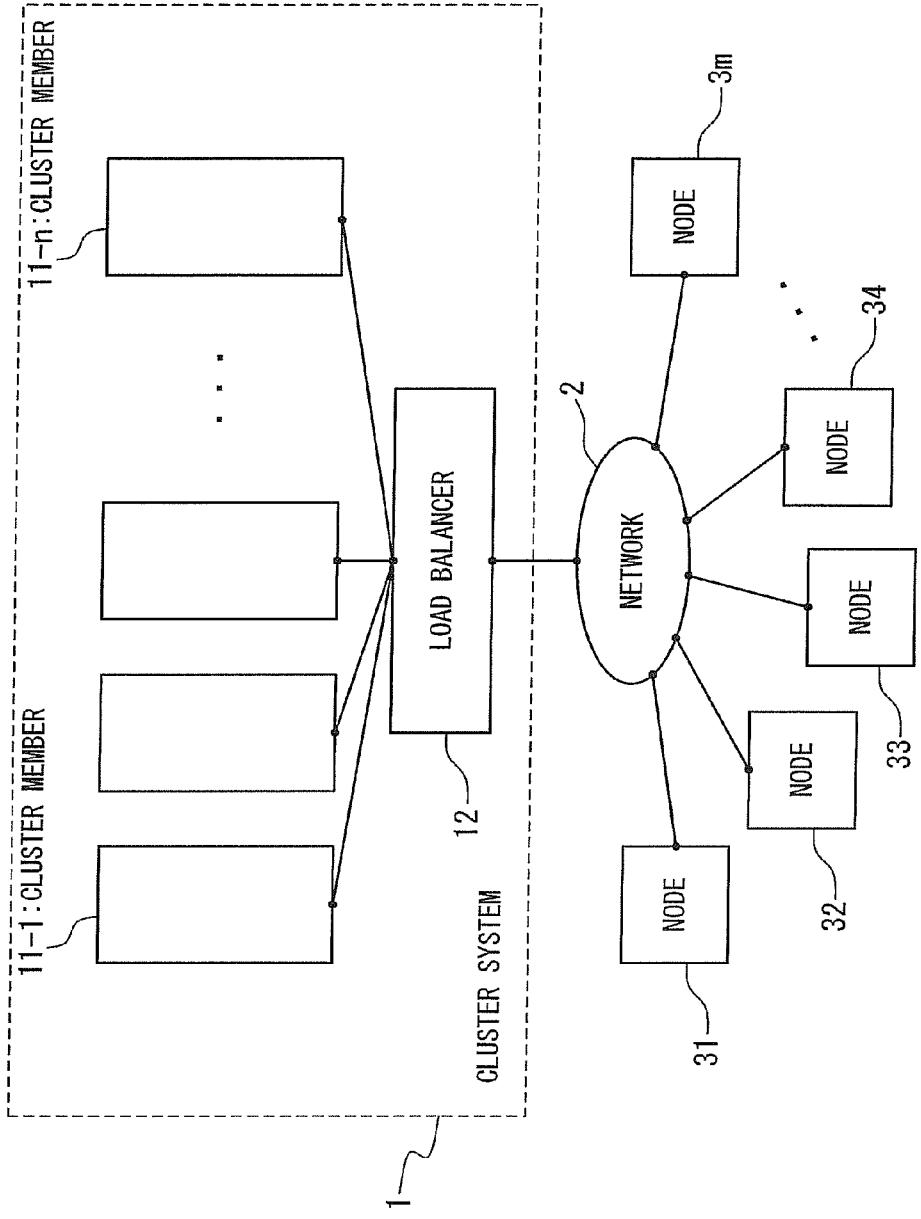
FIG. 30 shows a technique using a load balancing apparatus.

The protocol transmission process is executed by the procedure of FIG. 28. A process similar to the writing process described in the first exemplary embodiment (e.g. steps S702 to S706 in FIG. 7) is executed at steps S2801 to S2805. In step S2806, it is determined whether or not the packet is for the backup process. Then, the packet is discarded if it is determined to be for the backup process (YES at step S2806), or the packet is transmitted via the transmission interface 142 if it is not (NO at step S2806).

Here, the process at the steps S2806 to S2808 can be realized as follows. Additional information indicating that a copied packet is for the backup process is attached to the transmission data at the step S2704 of FIG. 27A, and the transmission side distributing filter 132 discards the packet only when the packet is for the backup process.

Alternatively, the following process may also be employed. The transmission side distributing filter 132 holds the hash value corresponding to its own cluster member in charge of the current use protocol process and the hash value corresponding to its own cluster member in charge of the backup process. With the packet transferred from the protocol processing section 121 to the transmission side distributing filter 132, whether or not a transmission source address is identical to the representative address is determined. The packet not having the representative address of the cluster system as the transmission source address is not a packet for the redundancy process such as communication among cluster members, and the packet is transmitted without making any changes. With the packet having a representative address of the cluster as the transmission source address, the hash value is calculated from a header of the packet or the like in the same manner as the process in the reception side distributing filter 131 (i.e. steps S2503 to S2505) and a flag for the current use or backup process is attached to the packet. If the flag for the backup process is attached to the packet, the packet is discarded.

[Other Processes]

Other processes are roughly divided into a session control and dead/alive state monitor. The session establishment basically involves only two of current use/backup cluster members which execute "accept" and "connect" in the sequence of the second exemplary embodiment, and therefore the detailed description will be omitted.

The dead/alive state monitor will be carried out as follows. The cluster members share the hash value allocating table for the protocol process and the application process. One cluster member in charge is allocated for every hash value in the allocating table. The dead/alive state of each of the cluster members is controlled by operation confirmation communication and the operation state is reflected on the allocating table. Thus, the dead/alive state can be reflected in the cluster process.

First, an example of an operation confirming procedure will be described. Each of the cluster members broadcasts an operation notice message on the data link in a predetermined interval (set as t1). Each of the cluster members manages the operation notice from each of the other cluster members by using the cluster member of the transmission source as a key, and determines that the cluster member from which a new operation notice cannot be received for a predetermined period of time (set as t2 and t2>t1) is in a failure state.

Next, a method of updating the hash value allocating table will be described. The hash value allocating table includes one of the hash values as a key and an operating cluster member for each hash value. If the cluster member is determined to be in the failure state, the cluster member is deleted from the allocating table.

Through the above procedure, the allocating table is updated as follows. Since two of current use and backup cluster members are allocated to one hash value of the hash value allocating table for the protocol process, no cluster member in charge lacks on the table if only one of the cluster members is in the failure state. In contrast, only the current use cluster member is usually registered on the allocating table for the application process. Therefore, if the cluster member is in the failure state, the backup cluster member allocated in advance is registered to the entry of the applicable hash value.

Modified Examples of Third Exemplary Embodiment

The reading process according to the present exemplary embodiment may also be executed in the following procedure. According to the description in the present exemplary embodiment, when the cluster member in charge of the backup protocol process receives data, the data is discarded at the time of completion of the collation. However, if the cluster member is in charge of the application process, efficiency is high when the data is not discarded but is directly transferred to the application program. Therefore, the cluster member in charge of the backup process may calculate a hash value by using the hash function supplied form the application program without discarding the reception data when the reception data is successfully collated, and transfers the reception data to the application program without any changes if its own cluster member is in charge of the application process. In this case, the current use cluster member calculates the hash value, and discards the reception data without redirecting if the cluster member in charge of the application process is equal to the backup cluster member in charge of the protocol process. Thus, the process is ended.

The following procedure may also be employed. The above procedure is efficient in terms of no meaningless data transfer, but wasted in terms of calculating a hash value twice to all the data in successful collation. Therefore, when the current use cluster member calculates the hash value and the cluster member in charge of the application process is equal to the backup cluster member in charge of the protocol process, this may be notified to the backup cluster member. The backup cluster member in charge of the protocol process simply holds successfully collated reception data without calculating the hash value and transfers the data to the application program in response to a notice from the current use cluster member if its own cluster member is in charge of the application process, and discard the data if the cluster member in charge is different. Accordingly, the hash value is calculated only once without wasted transfer of the reception data.

Effects of Third Exemplary Embodiment

According to the present exemplary embodiment, performance in the entire system can be increased by distributing a process load of a traffic into the plurality of cluster members and the reliability is improved by processing traffic redundantly. This is because the configuration is employed which includes the read API call trapping section 161, the write API call trapping section 162, the control section 173, the transferring section 174, the application process distributing/copying and collating section 191 and the protocol process distributing/copying and writing section 192 between the application program 110 and the read/write API sections 151 and 152.

Fourth Exemplary Embodiment

Next, a fourth exemplary embodiment of the present invention will be described in detail. The present exemplary embodiment has one feature in that an identical protocol process can be executed by both of the cluster members in the current use system and the backup system, even if a large delay is caused in the transmitting process in one of the cluster members of the current use system and the backup system and even if a packet transmitted from a counter apparatus cannot be received by one of the cluster members of the current use system and the backup system.

According to the afore-mentioned first exemplary embodiment, the protocol process is made redundant by using two of the cluster members in the current use system and the backup system so as to realize the reliability enhancement. At this time, the identical protocol process needs to be executed by the cluster members in the current use system and the backup system. However, the state in which the identical protocol process is not executed is continued due to the following phenomena in practice, resulting in the loss of redundancy in a protocol state.

That is, when the protocol process (such as TCP) to confirm transmission is made redundant, the protocol process cannot be maintained in one of the systems in following cases:

(1) a packet arrives only in one of the current use system and the backup system while the same packet does not arrive in the remaining system, or the packet is dropped due to a defect in one of the systems; and (2) a significant delay is caused in one of the current use system and the backup system to carry out a transmission confirmation packet before transmission of the packet.

Of them, (1) is divided into the following two cases:

(1-a) a packet arrives only in the current use system; and (1-b) a packet arrives only in the backup system.

(1-a) If the packet arrives only in the current use system, the protocol processing section in the current use system receives the packet and transmits the confirmation response packet. The backup system generates, but does not externally transmit, the confirmation response packet indicating that the reception packet is dropped. Therefore, only the confirmation response packet issued from the current use system arrives in the counter apparatus, and the counter apparatus transmits a subsequent packet. If this process is repeated, the backup system cannot receive the dropped packet and cannot recover a same state as the current use system forever.

(1-b) If the packet arrives only in the backup system, the protocol processing section in the backup system receives the packet and generates the confirmation response packet. However, this confirmation response packet is not externally transmitted. Since the current use system transmits a confirmation response indicating that the reception packet is dropped, the counter apparatus determines that the transmission packet is lost and retransmits the packet. The retransmitted packet is received only in the current use system while the retransmitted packet is simply discarded in the backup system, even if it arrives therein. Accordingly, a packet loss is not problem in case of (1-b).

Next, (2) is divided into following two cases: (2-a) a transmitting process is delayed in the current use system; and (2-b) a transmitting process is delayed in the backup system.

(2-a) No defect will occur when the transmitting process is delayed in the current use system. Even if the backup system first executes a transmitting process, the packet is not externally transmitted in practice, which means that no confirmation response packet transmitted from the counter apparatus will arrive in a non-transmitted packet of the current use system.

(2-b) If the transmitting process is delayed in the backup system, the current use system is supposed to execute the transmitting process prior to starting the transmitting process in the backup system. Furthermore, when a packet transmitted from the current use system arrives in the counter apparatus, the counter apparatus immediately transmits the confirmation response packet. When the confirmation response packet is actually delivered from the counter apparatus, it reaches not only the current use system but also the backup system. The confirmation response packet arrives to a non-transmitted packet in the backup system, but such a confirmation response packet is usually discarded. Even if the backup system executes the transmitting process of the packet thereafter, the packet is not externally transmitted. Therefore, there is no chance to receive the confirmation response packet from the counter apparatus and the backup system is forced to continuously retransmit the above packet, after which a retransmission timer reaches a timeout to cut off the connection.

In the present exemplary embodiment, a redundancy function including an additional function to solve a defect caused by a dropped packet in the backup system and a deviation in the transmission time will be described.

Configuration of Fourth Exemplary Embodiment

Figure 35:
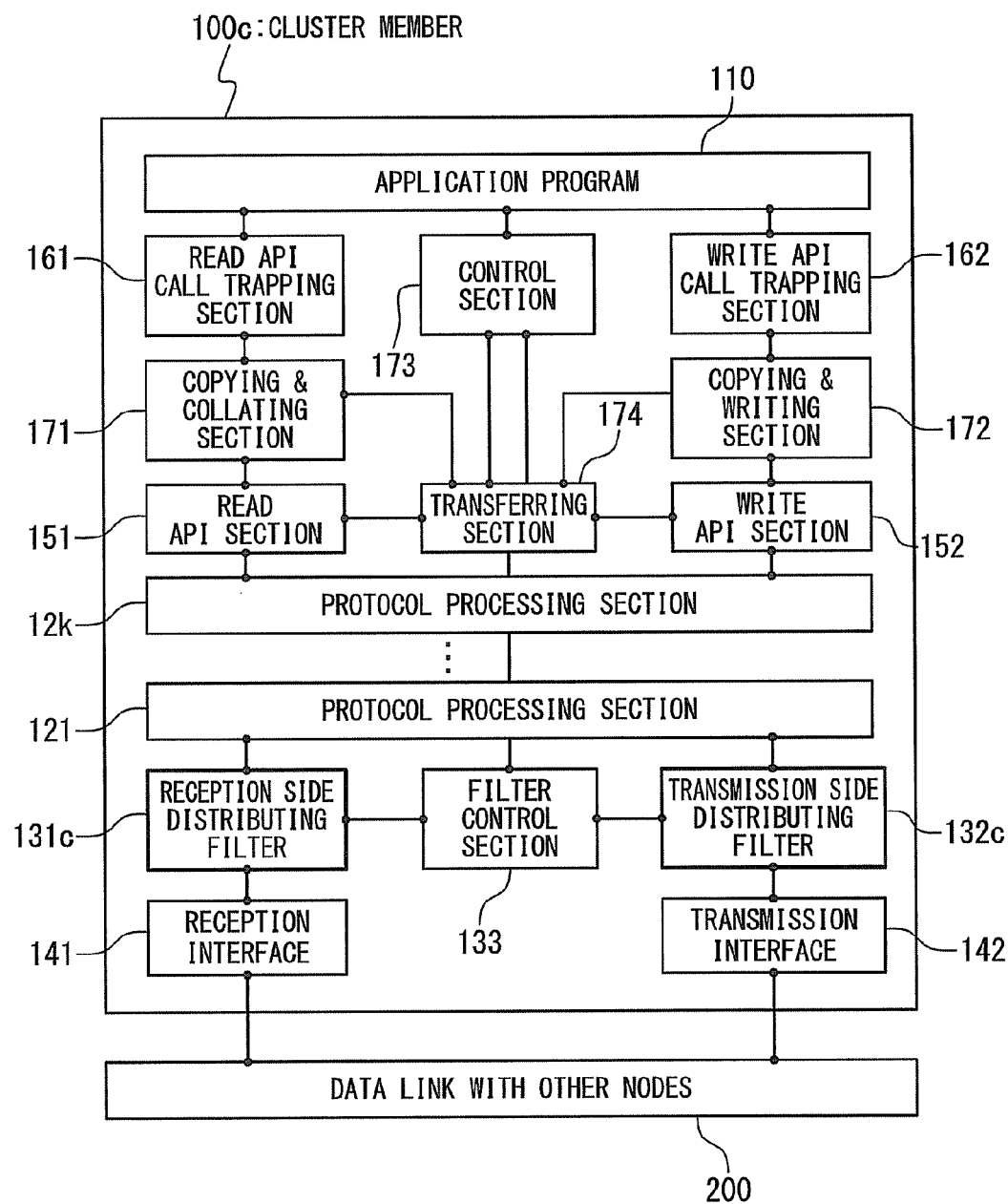
FIG. 35 is a block diagram showing a configuration example of a cluster member 100c used in the cluster system according to a fourth exemplary embodiment of the present invention.

The present exemplary embodiment is realized by using cluster members 100c shown in FIG. 35, in place of the cluster members 13-1 to 13-n, in the cluster system of the broadcast dispatch type as shown in FIG. 31. The cluster system according to the present exemplary embodiment will function as a server (i.e. server cluster).

The difference between the cluster member 100c according to the present exemplary embodiment as shown in FIG. 35 and the cluster member 100 according to the first exemplary embodiment as shown in FIG. 1 is in that a reception side distributing filter 131c and a transmission side distributing filter 132c are provided in place of the reception side distributing filter 131 and the transmission side distributing filter 132. The reception side distributing filter 131c and the transmission side distributing filter 132c have different configurations in case of the cluster member 100c operating in the current use system and in case of the cluster member 100c operating in the backup system. It should be noted that the cluster member 100c according to the present exemplary embodiment can also be realized by a computer in the same manner as the cluster member according to the first exemplary embodiment.

[Filter Configuration in Backup System]

Figure 36:
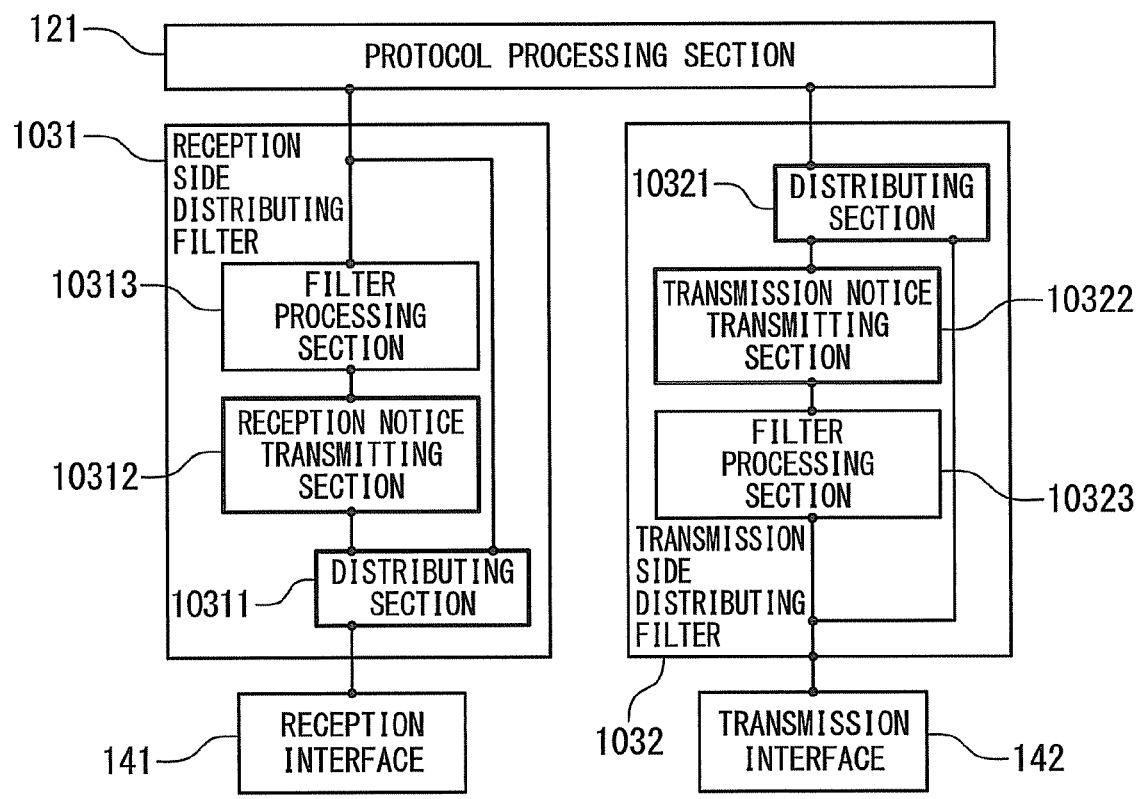
FIG. 36 is a block diagram showing a configuration example of a reception side distributing filter 1031 and a transmission side distributing filter 1032 in the backup system in the fourth exemplary embodiment.

When the cluster member 100c operates in the backup system, the reception side distributing filter 131c and the transmission side distributing filter 132c have same configurations as a reception side distributing filter 1031 and a transmission side distributing filter 1032 as shown in FIG. 36, respectively.

Referring to FIG. 36, the reception side distributing filter 1031 is provided with a distributing section 10311, a reception notice transmitting section 10312 and a filter processing section 10313.

The distributing section 10311 has a function to distribute a packet received via the reception interface 141 to the reception notice transmitting section 10312 if the packet is addressed to the representative address of the cluster system (or if the packet is broadcasted) or to distribute the packet to the protocol processing section 121 if the packet is not addressed thereto.

The reception notice transmitting section 10312 has a function to generate an identifier to identify the packet whenever the packet is transferred from the distributing section 10311 and further to transmit a reception notice packet including the generated identifier to the cluster member in the current use system.

The filter processing section 10313 executes the filter process.

The transmission side distributing filter 1032 is provided with a distributing processing section 10321, a transmission notice transmitting section 10322, and a filter processing section 10323.

The distributing section 10321 has a function to distribute the packet transferred from the protocol processing section 121 to the transmission notice transmitting section 10322 if the packet is to be made redundant and to distribute the packet to the transmission interface 142 in other cases.

The transmission notice transmitting section 10322 has a function to acquire a sequence number of transmission data included in the packet whenever the packet is transferred from the distributing section 10321 and to transmit a transmission notice packet including the sequence number to the cluster member in the current use system.

The filter processing section 10323 executes the filter process.

[Filter Configuration in Current Use System]

Figure 37:
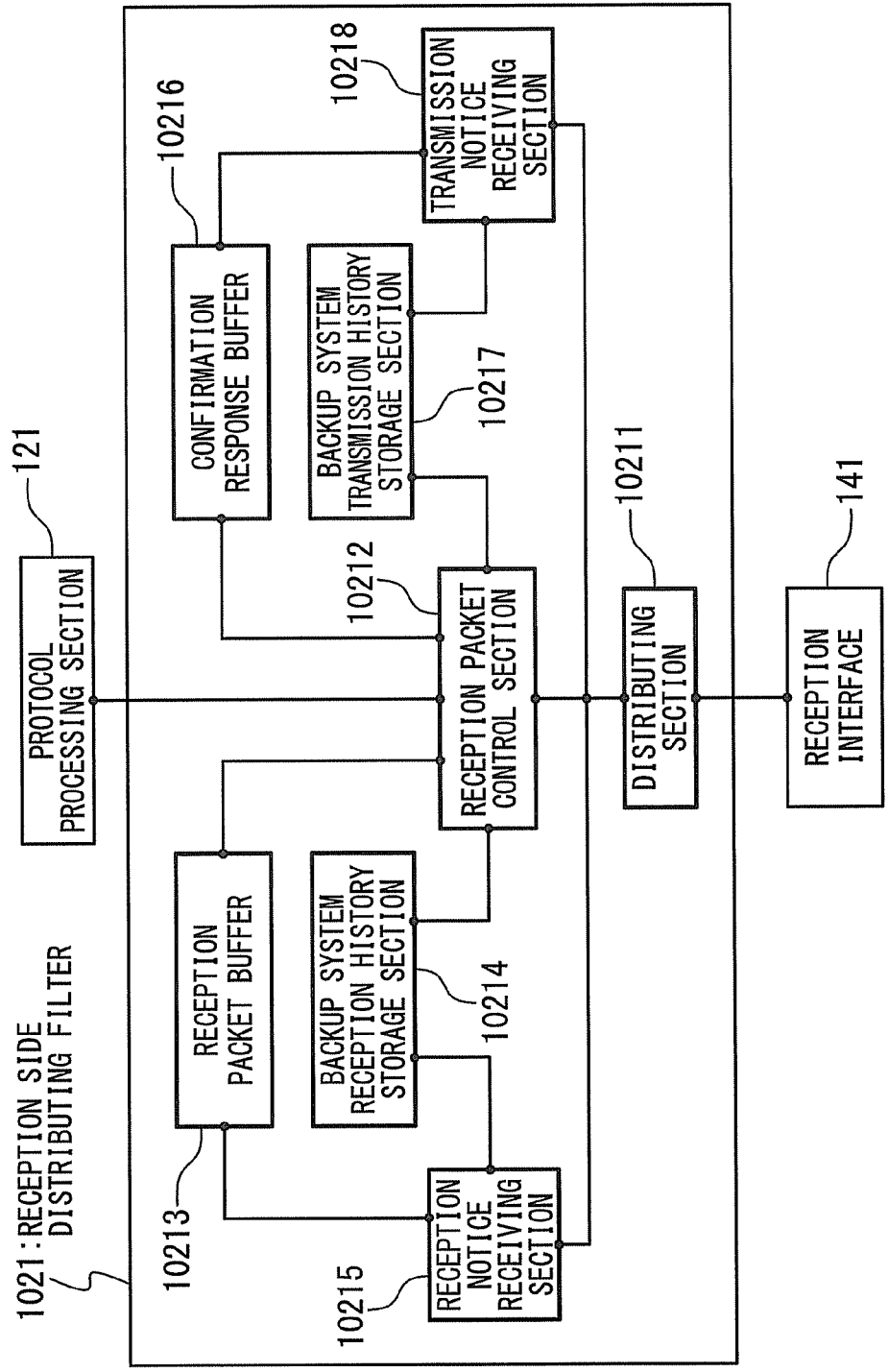
FIG. 37 is a block diagram showing a configuration example of a reception side distributing filter 1021 in the current use system in the fourth exemplary embodiment.

When the cluster member 100*c* operates in the current use system, the transmission side distributing filter 132*c* has the same configuration as the transmission side distributing filter 132 used in the first exemplary embodiment, while the reception side distributing filter 131*c* has the same configuration as a reception side distributing filter 1021 shown in FIG. 37.

Referring to FIG. 37, the reception side distributing filter 1021 used by the cluster member in the current use system is provided with a distributing section 10211, a reception packet control section 10212, a reception packet buffer 10213, a backup-system reception history storage section 10214, a reception notice receiving section 10215, a confirmation response buffer 10216, a backup-system transmission history storage section 10217 and a transmission notice receiving section 10218.

The distributing section 10211 has a function to distribute a packet transmitted from the counter apparatus and received via the reception interface 141 as well as a reception notice packet and a transmission notice packet transmitted from the backup system, to the reception control section 10212, the reception notice receiving section 10215 and the transmission notice receiving section 10218.

The reception notice receiving section 10215 has a function to store an identifier included in a reception notice packet transmitted from the backup system in the backup-system reception history storage section 10214.

The transmission notice receiving section 10218 has a function to store a sequence number included in a transmission notice packet transmitted from the backup system in the backup-system transmission history storage section 10217.

The reception packet control section 10212 has a function to store a normal packet including data in the reception packet buffer 10213, a function to store a confirmation response packet including confirmation response data in the confirmation response buffer 10216, a function to transfer a received packet to the protocol processing section 121, a function to transmit a packet stored in the reception packet buffer 10213 to the cluster member in the backup system, and a function to transmit the confirmation response packet stored in the confirmation response buffer 10216 to the cluster member in the backup system.

Operation of Fourth Exemplary Embodiment

Next, the operation according to the present exemplary embodiment will be described, dividing into the operation in the current use system and the operation in the backup system. It should be noted that redundancy operation itself is the same as that of the first exemplary embodiment, and the description of the redundancy process will be omitted here.

[Operation of Backup System]

Figure 38:
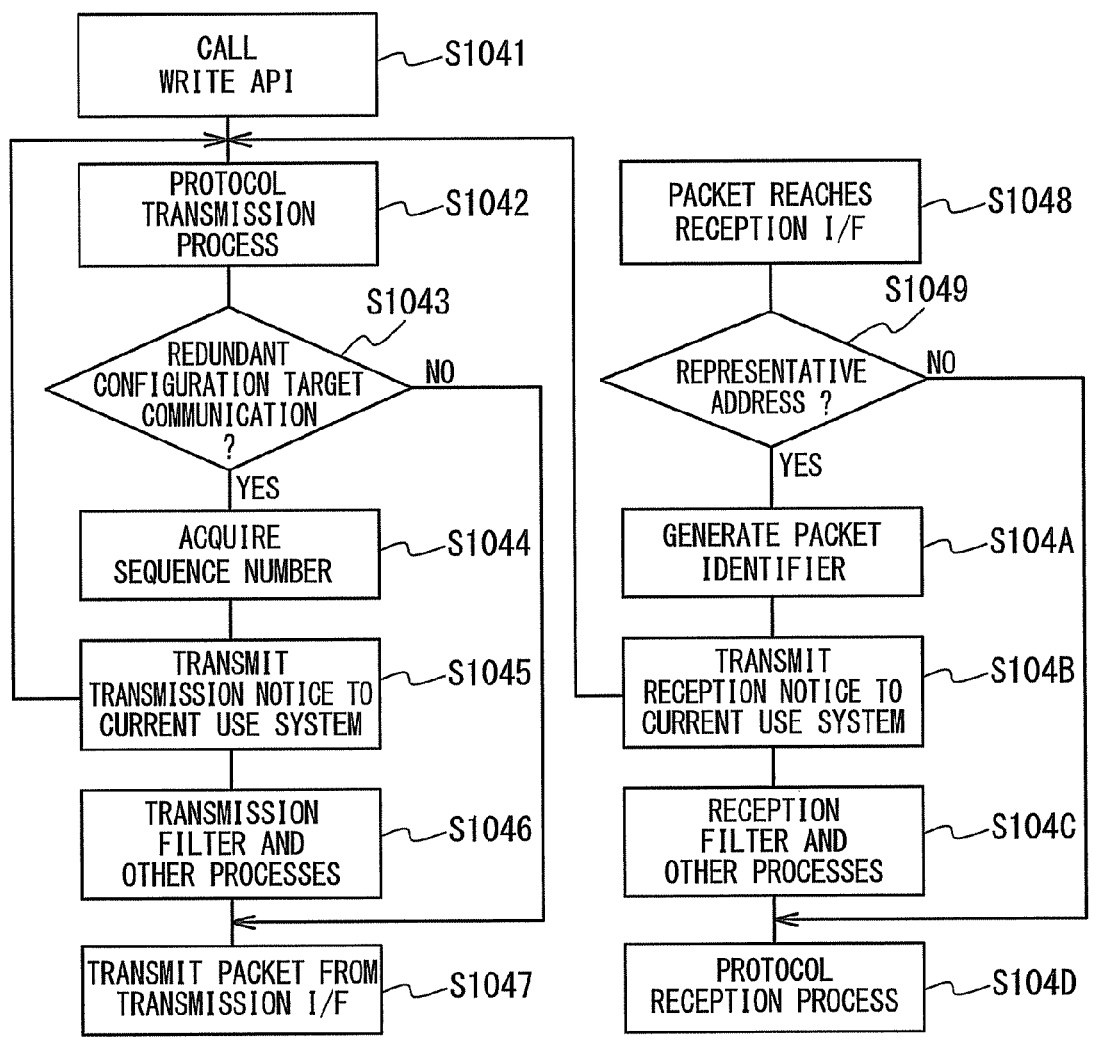
FIG. 38 is a flowchart showing an example of a process in the backup system of the fourth exemplary embodiment.

The operation in the backup system will be described first. FIG. 38 shows a flow of the operation of the backup system.

First, an operation at the time of receiving a packet in the backup system will be described. When the packet is received from the counter apparatus via the reception interface 141, the distributing section 10311 determines whether or not the packet is addressed to the representative address (or whether or not the packet is broadcasted to both of the current use system and the backup system) on the basis of the destination MAC address of the packet (steps S1048 and S1049).

If it is determined that the packet is not addressed to the representative address (NO at step S1049), the distributing section 10311 transfers the received packet to the protocol processing section 121. A protocol reception process is therefore executed.

In contrast, if it is determined that the packet is addressed to the representative address (YES at step S1049), the received packet is transferred to the reception notice transmitting section 10312.

The reception notice transmitting section 10312 therefore generates an identifier to identify the received packet (step S104A). The identifier is information by which the packet can be identified from other packets and a checksum of the packet is used. However, it does not need to be a checksum and any values may be used as an identifier as long as the packet can be identified by the information. For example, the hash value which is calculated by applying the hash function to the packet may also be used as the identifier.

Thereafter, the reception notice transmitting section 10312 generates a reception notice packet including the above identifier to transmit to an address of the cluster member in the current use system (step S104B). This process normally includes the protocol transmission process and is therefore taken over by the protocol transmission process (step S1042) in FIG. 38. After executing the above process, the received packet is subjected to the filtering process by the filter processing section 10313 (step S104C), and then is transferred to the protocol processing section 121 for the receiving process (step S104D).

Next, the transmitting process in the backup system will be described. When the transmission packet is transferred from the protocol processing section 121, the distributing section 10321 in the transmission side distributing filter 1032 determines whether or not the packet is to be made redundant (steps S1042 and S1043). This determination is based on the content of a header of the packet and a transmission source address. It should be noted that a packet originated from a write API call made by the write API section 152 (step S1041), a reception notice packet and a transmission notice packet are transferred form the protocol processing section 121 to the distributing section 10321.

Then, if the transmission packet is not to be made redundant (NO at step S1043), the distributing section 10321 transmits the transmission packet via the transmission interface 142 (step S1047).

In contrast, if a transmission packet is to be made redundant (YES at step S1043), the distributing section 10321 transfers the transmission packet to the transmission notice transmitting section 10322.

Accordingly, the transmission notice transmitting section 10322 first obtains a sequence number (i.e. transmission sequence number) from a header portion of the transmission packet (step S1044). Next, a transmission notice packet including the above sequence number is generated and transmitted to an address of the cluster member in the current use system (step S1045). This process is also taken over by the protocol transmission process (step S1042) like the case of a reception notice packet.

After executing the above process, the filter processing section 10323 executes a filtering process which is defined in the transmission side distributing filter 1032 (step S1046). The above filtering process in the backup system includes at least a process to discard the transmission packet to be made redundant.

As described above, a notice is transmitted to a cluster member in the current use system every time to execute a process to transmit/receive a transmission/reception packet to be made redundant.

[Operation of Current Use System]

Figure 39A:
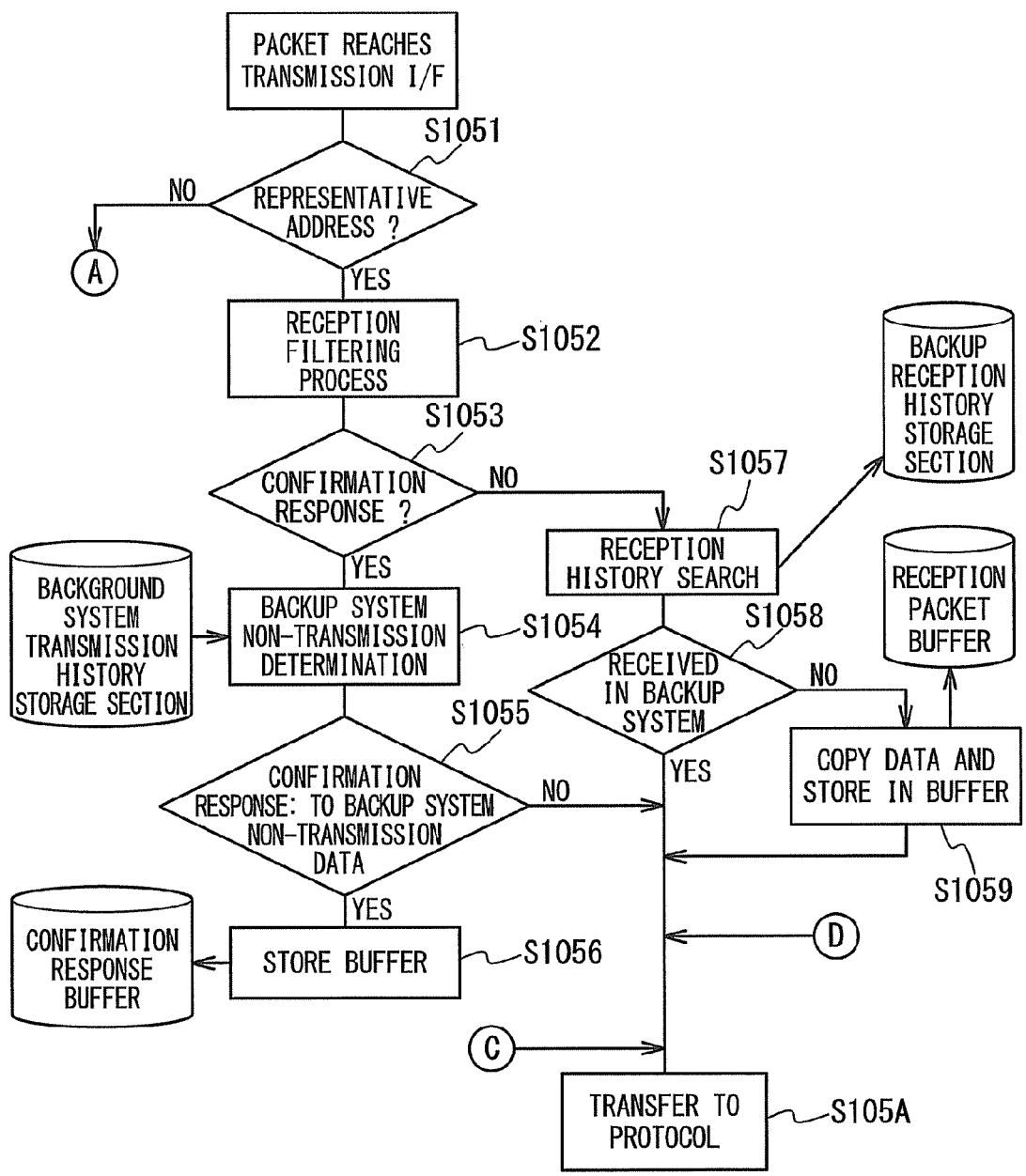
FIG. 39A is a flowchart showing an example of the process in the current use system of the fourth exemplary embodiment.
Figure 39B:
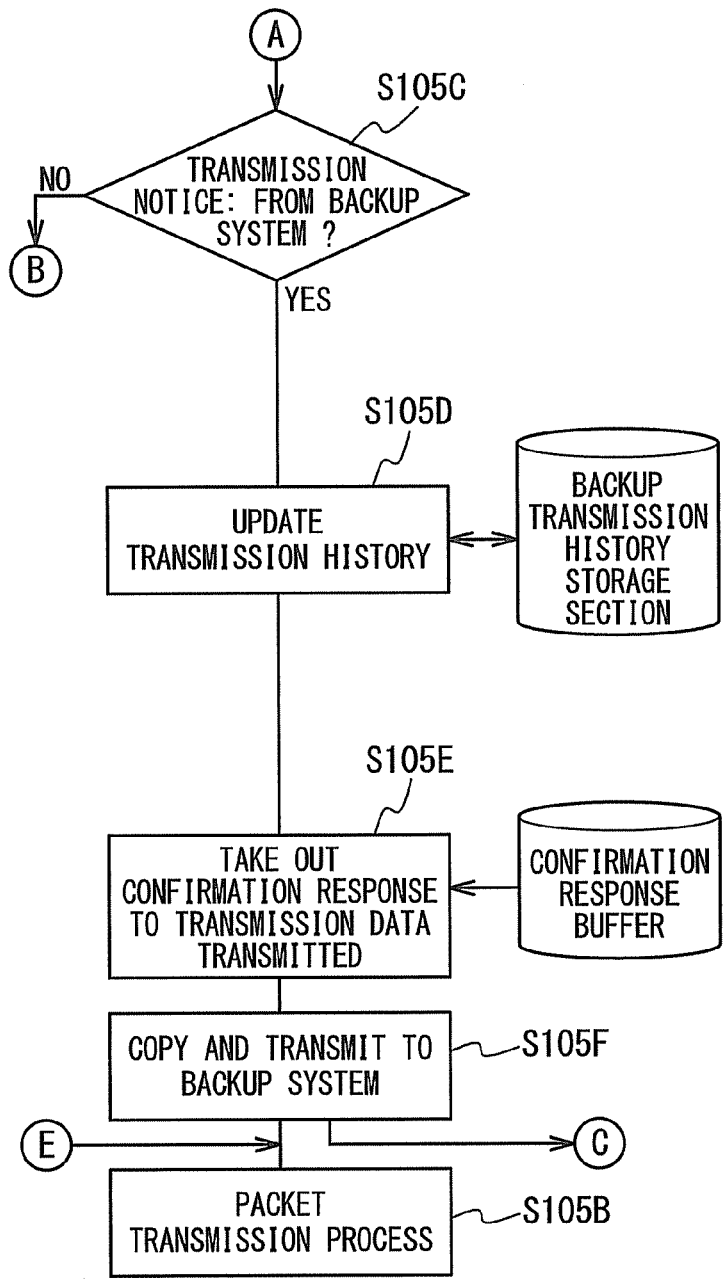
FIG. 39B is a flowchart showing an example of the process in the current use system of the fourth exemplary embodiment.
Figure 39C:
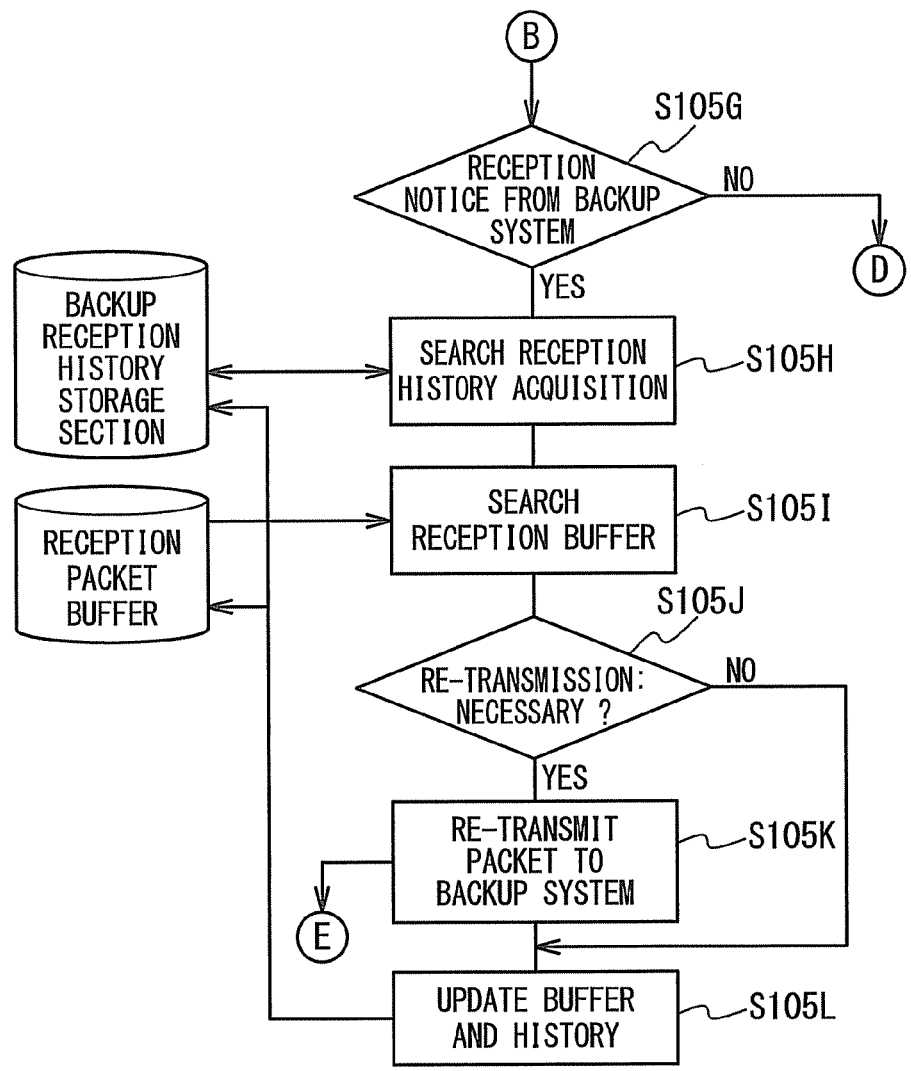
FIG. 39C is a flowchart showing an example of the process in the current use system of the fourth exemplary embodiment.

Next, an operation of the current use system will be described. FIGS. 39A, 39B and 39C show a flow of the operation in the current use system.

When the packet is received via the reception interface 141, the distributing section 10211 in the reception side distributing filter 1021 as shown in FIG. 37 determines whether or not the packet is addressed to a representative address on the basis of a destination MAC address (step S1051).

If the packet is addressed to the representative address (YES at step S1051), the distributing section 10211 transfers the reception packet to the reception packet control section 10212. The reception packet control section 10212 therefore executes the filtering process which is defined in the reception side distributing filter 1021 as needed (step S1052).

Thereafter, the reception packet control section 10212 determines whether or not the reception packet is the confirmation response packet including confirmation response data transmitted from the counter apparatus (step S1053).

Then, if it is determined to be the confirmation response packet transmitted from the counter apparatus (YES at step S1053), a confirmation response number in a header portion of the packet (or a sequence number of a normally received packet) is extracted and this confirmation response number is used as a key to search the backup-system transmission history storage section 10217 in order to examine whether or not the backup system has been already transmitted a packet corresponding to the above confirmation response packet (step S1054). That is, it is determined that the packet has been already transmitted if a sequence number which is identical to the confirmation response number is stored in the backup-system transmission history storage section 10217, or it is determined that the packet is not transmitted yet if it is not stored therein.

Then, if the packet is determined to be the confirmation response packet to the packet which is not transmitted yet from the backup system (YES at step S1055), the above confirmation response packet is stored in the confirmation response buffer 10216 to hold a reception process thereafter (step S1056).

In contrast, if the packet is determined to be the confirmation response packet to the packet which has been already transmitted from the backup system (NO at step S1055), the confirmation response packet is transferred to the protocol processing section 121 (step S105A).

Moreover, if the packet transferred from the distributing section 10211 is determined to be a normal packet including data transmitted from the counter apparatus at the aforementioned step S1053 (i.e. NO in the determination result), the reception packet control section 10212 searches the backup-system reception history storage section 10214 to determine whether or not the same packet has been already received in the backup system (step S1057). That is, it is determined that the same packet has been already received in the backup system if the identifier identical to that of the received packet is stored in the backup-system transmission history storage section 10214, whereas it is determined that the same packet is not received yet if the identifier is not stored therein.

Then, if it is determined that the same packet has been already received in the backup system (YES at step S1058), the reception packet control section 10212 transfers the received packet to the protocol processing section 121 and further deletes the identifier of the above packet from the backup-system reception history storage section 10214 (step S105A).

In contrast, if it is determined that the same packet is not received yet in the backup system (NO at step S1058), it may be necessary to transmit the above packet to the backup system. The above packet is copied and stored in the reception packet buffer 10213 and the above packet is further transferred to the protocol processing section 121 (steps S1059 and S105A).

The process to receive the packet which is to be made redundant (i.e. a packet addressed to a representative address) is as described above.

Next, a case of receiving the packet which is not addressed to the representative address will be described.

If the packet received via the reception interface 141 is not addressed to a representative address (NO at step S1051), the distributing section 10211 examines whether or not the packet is a transmission notice packet transmitted from the backup system (step S105C).

If the packet is the transmission notice packet (YES at step S105C), the above packet is transferred to the transmission notice receiving section 10218. The transmission notice receiving section 10218 therefore extracts a sequence number from the above transmission notice packet to store in the backup-system transmission history storage section 10217 (step S105D). Sequence numbers are generally consecutive, so that only the sequence number of the packet transmitted at last may be held in the backup-system transmission history storage section 10217.

When the sequence number is stored in the backup-system transmission history storage section 10217, the reception packet control section 10212 searches the confirmation response buffer 10216 to find out a confirmation response packet having the sequence number identical to the above newly stored sequence number (step S105E). That is, since the packet belonging to the above sequence number is not transmitted yet from the backup system, a confirmation response packet stored (or held) in the confirmation response buffer 10216 at the step S105b is searched.

If such a confirmation response packet cannot be searched, the reception packet control section 10212 ends the process. In contrast, if the confirmation response packet can be searched, the searched confirmation response packet is transferred to the protocol processing section 121 to execute the receiving process in the current use system while transmitting the above confirmation response packet to the cluster member in the backup system via the protocol processing sections 121, 122, . . . , and 12k, the read API section 151, the copying and collating section 171 and the transferring section 174 (steps S105F, S105A and S105B). The reason why the confirmation response packet is transmitted to the cluster member in the backup system is in that even if this confirmation response packet is received in the backup system, it is highly possible that the confirmation response packet which has been issued for a non-transmitted packet is discarded.

In this way, the confirmation response packet issued for the packet which is not transmitted yet in the backup system is always retained in the confirmation response buffer 10216 in the current use system without being transferred to the protocol processing section 121. Furthermore, when a transmission notice packet arrives from the backup system, the confirmation response packet retained in the confirmation response buffer 10216 is transmitted to the protocol processing section 121. Through the above processes, it is possible to solve the program (2-b) caused by failing to receive the confirmation response packet issued for the non-transmitted packet in the backup system.

The operation when the transmission notice packet is received from the backup system is as described above.

Next, an operation when the reception notice packet is received from the backup system will be described.

When the packet received via the reception interface 141 is determined to be the reception notice packet from the backup system (YES at step S105G), the distributing section 10211 transfers the packet to the reception notice receiving section 10215 and the reception packet control section 10212.

The reception packet control section 10212 therefore refers to the backup-system reception history storage section 10214 and the reception packet buffer 10213 (steps S105H and S105I) to examine whether the state corresponds to any one of the following (x-1), (x-2), (y-1), (y-2) and (z):

(x-1) a state that an identifier included in the reception notice packet is stored in the backup-system reception history storage section 10214 and a packet corresponding to the above identifier is stored in the reception packet buffer 10213;

(x-2) a state that an identifier included in the reception notice packet is stored in the backup-system reception history storage section 10214 and a packet corresponding to the above identifier is not stored in the reception packet buffer 10213;

(y-1) a state that an identifier included in the reception notice packet is not stored in the backup-system reception history storage section 10214, a packet corresponding to the above identifier (referred to as a packet P1) and packets received prior to the packet P1 are stored in the reception packet buffer 10213, and the packets received prior to the packet P1 include a packet which is not store an identifier corresponding to the backup-system reception history storage section 10214 (referred to as a packet P2);

(y-2) a state that an identifier included in the reception notice packet is not stored in the backup-system reception history storage section 10214, the packet P1 corresponding to the above identifier and packets received prior to the packet P1 are stored in the reception packet buffer 10213, and the packets received prior to the packet P1 store all identifiers corresponding to the backup-system reception history storage section 10214; and (z) a state that an identifier included in the reception notice packet is not stored in the backup-system reception history storage section 10214 and a packet corresponding to the above identifier (referred to as a packet P3) is not stored in the reception packet buffer 10213.

Thereafter, the reception packet control section 10212 executes a process at the steps S105J to S105L in accordance with a current state of the backup-system reception history storage section 10214 and the reception packet buffer 10213.

In case of the state (x-1), it is determined as unnecessary to retransmit a packet because the packet is received in the backup system (NO at step S105J). The same packet is also received in the current use system in this state, and the entry of the packet is deleted from the reception packet buffer 10213 and the backup-system reception history storage section 10214 (step S105L).

In case of the state (x-2), it is determined as unnecessary to retransmit a packet because the packet is received in the backup system (NO at step S105J). Moreover, the content of the backup-system reception history storage section 10214 is maintained without any changes because the packet may not be received yet in the current use system or may have been dropped. It should be noted that a flag is attached to the identifier so that the identifier is deleted to prevent memory leakage if the packet does not arrive after passing a predetermined period of time.

In case of the state (y-1), it is highly possible that the packet P2 which is received in the current use system is dropped in the backup system. This is because the packet is received from the same data link in the current use system and the backup system, which suggests that the order of receiving a packet is rarely switched. Therefore, in this case, it is determined as necessary to retransmit a packet (YES at step S105J), and the packet P2 stored in the reception packet buffer 10213 is transmitted to the backup system (steps S105K and S105B). Moreover, in this case, the reception notice receiving section 10215 is instructed to store the identifier at the step S105L. Accordingly, the reception notice receiving section 10215 stores the identifier included in the reception notice packet, which has been transferred form the distributing section 10211 at the afore-mentioned step S105G, in the backup-system reception history storage section 10214.

In case of the state (y-2), the current use system and the backup system have same packet reception histories, so that it is determined as unnecessary to retransmit the packet (NO at step S105J), which is further followed by deleting entire entries from the backup-system reception history storage section 10214 and the reception packet buffer 10213 (step S105L).

In case of the state (z), a packet is received in the backup system, and it is determined as unnecessary to retransmit the packet (No at step S105J). Moreover, since the packet which is received in the backup system may not be possibly received in the current use system, the reception notice receiving section 10215 is instructed to store an identifier at the step S105L. The reception notice receiving section 10215 therefore stores the identifier included in the reception notice packet, which has been transferred from the distributing section 10211 at the afore-mentioned step S105G, in the backup-system reception history storage section 10214. It should be noted that a flag is attached to the identifier so that the identifier is deleted to prevent memory leakage if the identifier does not arrive after passing a predetermined period of time.

Through the above processes, the packet which arrives in the current use system but does not arrive in the backup system is retransmitted from the current use system by confirming the backup-system reception history storage section 10214. Accordingly, it is possible to solve the problem (1-a) which is caused by dropping the reception packet only in the backup system.

Effects of Fourth Exemplary Embodiment

As described above, according to the present exemplary embodiment, it is possible to avoid continuation of a deviated protocol state caused due to dropping of the packet and transmission delay. This is because the cluster member in the backup system is provided with the transmission notice transmitting section 10322 for transmitting a transmission notice packet indicating information on a transmission packet manipulated by the protocol process in the protocol processing sections 121, 122, . . . , and 12*k*, while the cluster member in the current use system is provided with the reception packet control section 10212. The reception packet control section 10212 stores a confirmation response packet in the confirmation response buffer 10216 under the condition that the transmission notice packet indicating information on the above transmission packet has not been transmitted from the cluster member in the backup system when the confirmation response packet to the above transmission packet is transmitted from the confirmation response buffer 10216 and the counter apparatus which is a destination of the transmission packet. The reception packet control section 10212 also transmits the confirmation response packet to the cluster member in the backup system under the condition that the confirmation response packet to the transmission packet which is indicated by the transmission notice packet is stored in the confirmation response buffer 10216 when the transmission confirmation packet is transmitted from the cluster member in the backup system.

Fifth Exemplary Embodiment

The first and fourth exemplary embodiments are provided on the premises that identical transmission data is generated at least in the current use system and the backup system and a process to transmit a packet including the identical data is executed.

The identical packet is generated in a protocol which stores a message boundary such as SCTP if the identical data is written by an application program, whereas different packets are generated due to deviated message partitions if transmission timings are different even if the identical data is written in a protocol which does not store a message boundary such as TCP.

Figure 40:
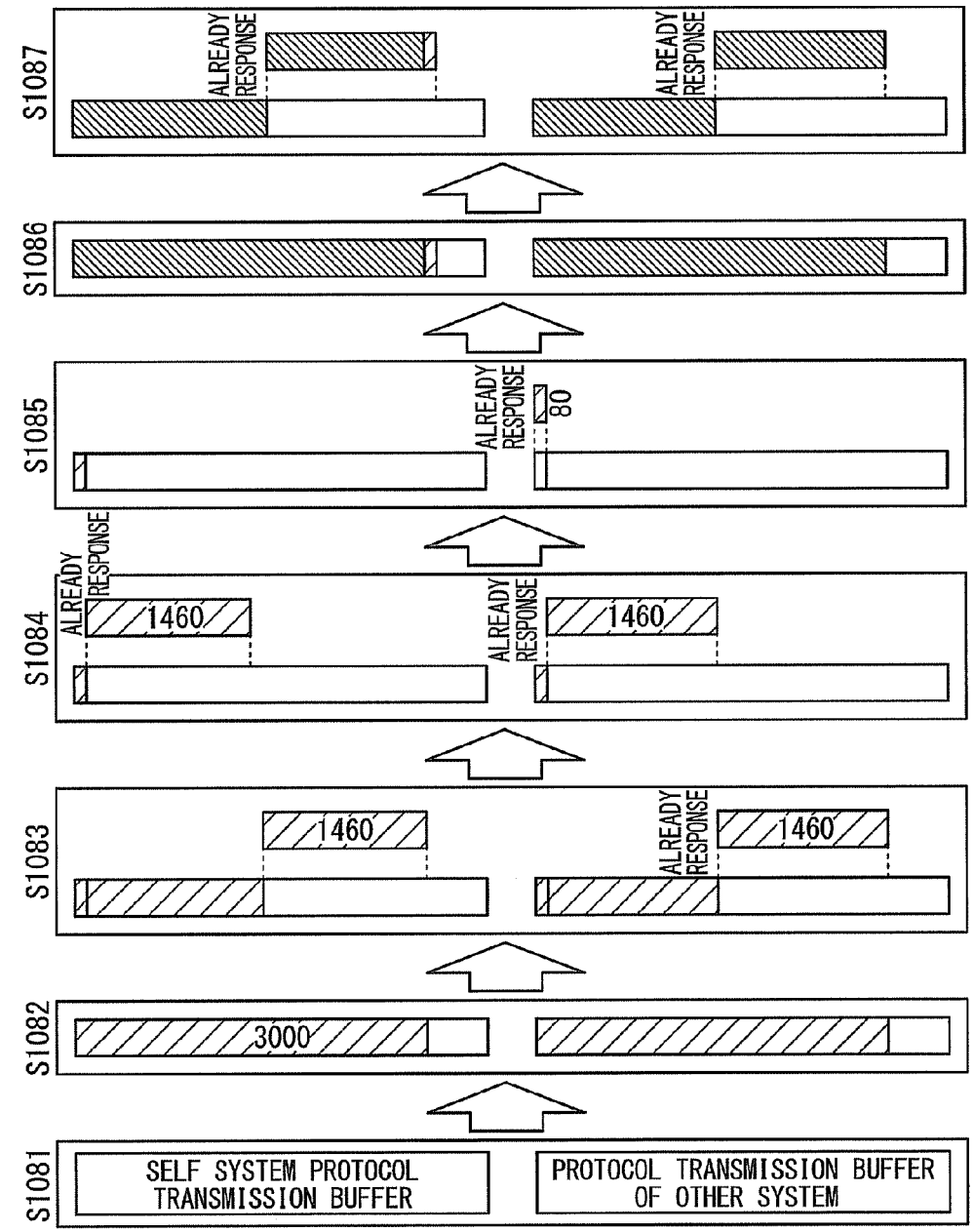
FIG. 40 is a block diagram showing a problem to be solved by the cluster system according to a fifth exemplary embodiment of the present invention.

FIG. 40 shows a specific example. FIG. 40 shows temporal changes in the content of a protocol transmission buffer in its own system and another system. Both of the systems have an empty protocol transmission buffer at first (S1081).

For example, it is assumed that data of 3000 bytes is written by the application program when the length of a data included in a packet is 1460 bytes (S1082). At this time, two packets, each of which includes the data of 1460 bytes and one packet including the data of 80 bytes are to be transmitted if there is no following data (S1083 to S1085). The transmission data is held in the protocol transmission buffer until a confirmation response packet arrives from the counter apparatus.

Here, if the writing process of the subsequent transmission data is executed in a state that a confirmation response is not issued for the last data (of 80 bytes) in its own system whereas a confirmation response packet issued for the last packet arrives prior to executing the writing process in another system, the protocol transmission buffer in its own system has two write data mixed whereas the protocol transmission buffer in another system holds second write data only (S1086).

If the transmitting process of a subsequent packet is executed in this state, its own system outputs connection data including the old data of 80 bytes and the new data of 1380 bytes, whereas another system outputs only the new data of 1460 bytes (S1087). Deviation may be thus generated in the boundary of transmission data included in the packet.

Even in such a case, defects are not usually observed because the protocol transmission buffer is empty when the confirmation response is issued for entire transmission data placed in the protocol transmission buffer, which allows identical data to be placed again in the protocol transmission buffer when the data is written at the next time and a break of transmission data in each packet is aligned.

However, if a period to receive the confirmation response is controlled by causing the sequence number of the transmission packet to correspond to a confirmation response number, as described in the fourth exemplary embodiment, deviation in the boundary of the transmission data makes it difficult to realize correspondence between the confirmation response and transmission data. In order to solve such a problem, the present exemplary embodiment prevents the data of a transmission buffer from being mixed by different writing operations.

Configuration of Fifth Exemplary Embodiment

Figure 41:
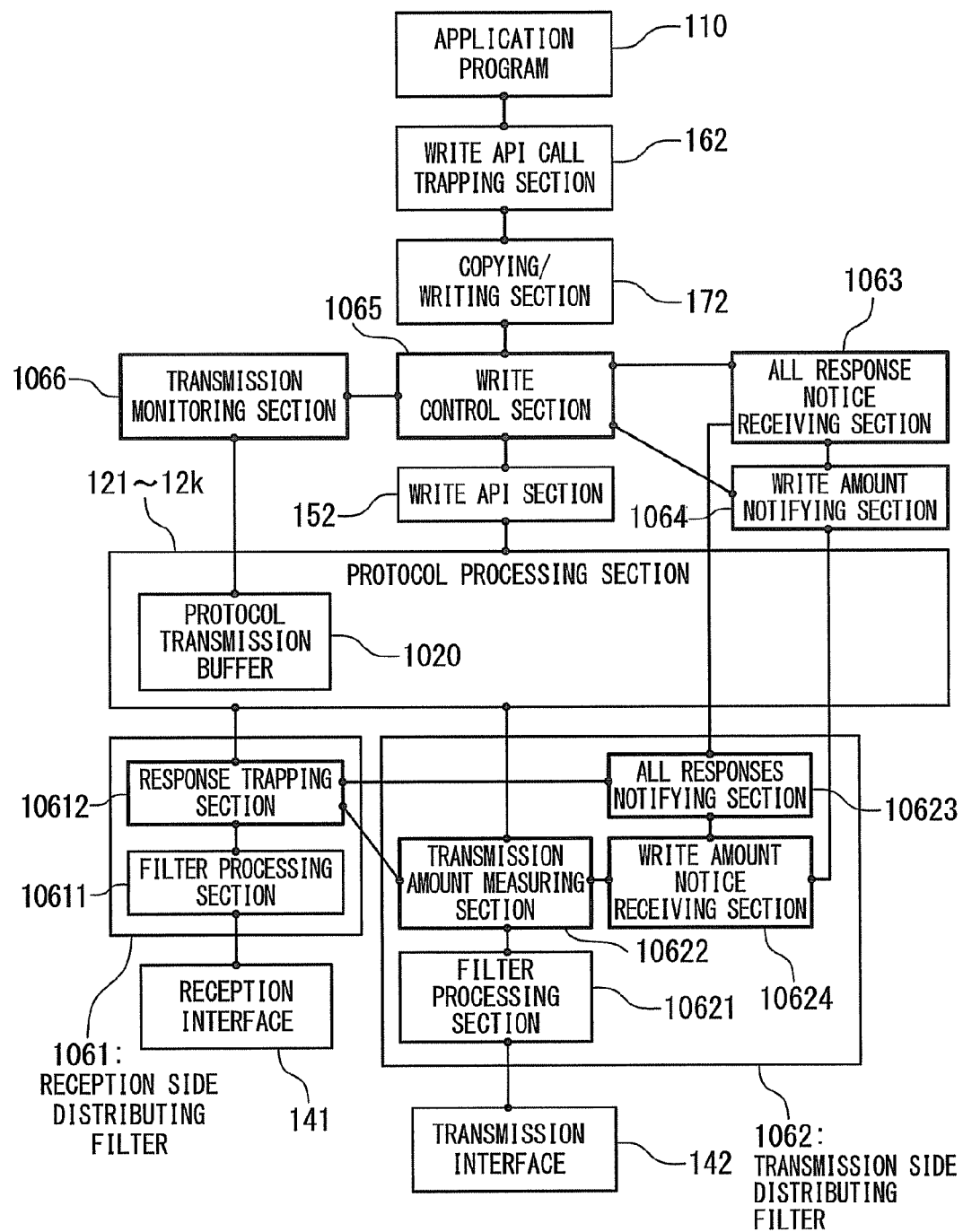
FIG. 41 is a block diagram showing a configuration example of the cluster member in the fifth exemplary embodiment.

FIG. 41 is a block diagram showing a configuration example of the cluster member according to the present exemplary embodiment. The difference between the cluster member according to the present exemplary embodiment and the cluster member 100*c* according to the fourth exemplary embodiment as shown in FIG. 35 is in that a write control section 1065, a transmission buffer monitoring section 1066, an all response notice receiving section 1063 and a write amount notifying section 1064 are provided between the copying and writing section 172 to the write API section 152, and a reception side distributing filter 1061 and a transmission side distributing filter 1062 are provided in place of the reception side distributing filter 131*c* and the transmission side distributing filter 132*c*. It should be noted that it is omitted in FIG. 41 to show the read API call trapping section 161, the copying and collating section 171, the read API section 151, the control section 173 and the transferring section 174. Also, reference numbers identical to those of FIG. 35 refer to identical components. The cluster member according to the present exemplary embodiment can also be realized by using a program in the same manner as the cluster member according to the fourth exemplary embodiment.

The write control section 1065 has a function to delay the timing to write transmission data as needed.

The transmission buffer monitoring section 1066 has a function to check whether or not a protocol transmission buffer 1020 belonging to each of the protocol processing sections 121, 122, . . . , and 12*k* is empty.

The all response notice receiving section 1063 has a function to receive a whole response notice issued by the transmission side distributing filter 1062.

The write amount notifying section 1064 has a function to notify an amount of data to be written as the transmission data to the transmission side distributing filter 1062.

The transmission side distributing filter 1062 has one feature in that the write amount notice receiving section 10642, the transmission amount measuring section 10622 and the all response notifying section 10623 are included therein. It should be noted that FIG. 41 shows only a filter processing section 10621 as one of other configuration components which are provided in the transmission side distributing filters 132 and 132*c* and omitted to be shown herein.

The reception side distributing filter 1061 also has one feature in that a response trapping section 10612 is included. FIG. 41 shows only the filter processing section 10611 as one of other configuration components which are provided in the reception side distributing filters 131 and 131*c* and omitted to be shown herein.

The write amount notice receiving section 10624 has a function to receive a write amount notice issued by the write amount notifying section 1064 at the time of writing data.

The transmission amount measuring section 10622 has a function to measure an amount of data included in the packet transmitted from its own filter 1062.

The all response notifying section 10623 has a function to notify the all response notice receiving section 1063 on the API side that the whole amount of write data has been transmitted and responded.

The response trapping section 10612 has a function to trap a confirmation response packet having a predetermined sequence number.

Operation of Fifth Exemplary Embodiment

Figure 42A:
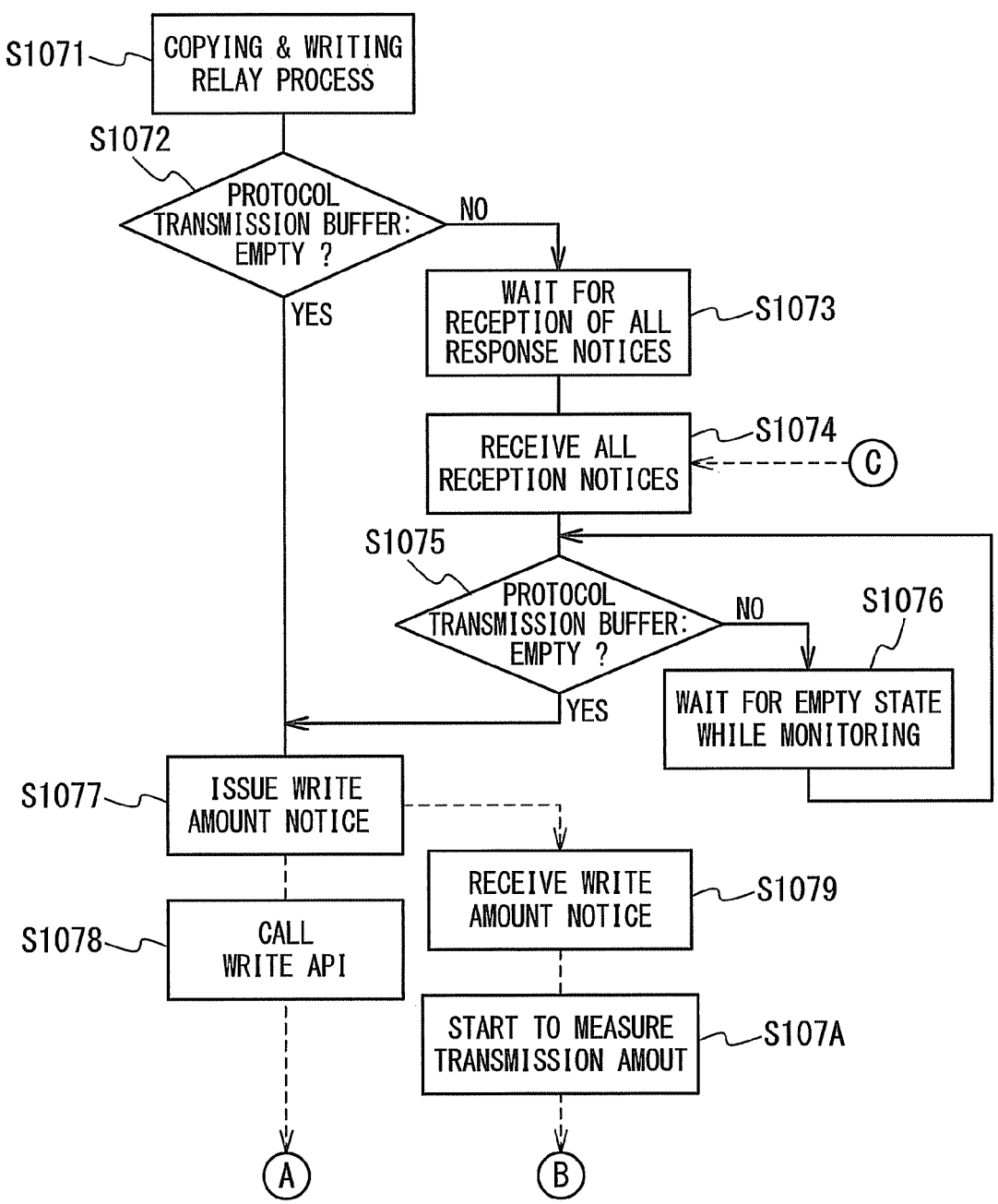
FIG. 42A is a flowchart showing an example of a process in the fifth exemplary embodiment.
Figure 42B:
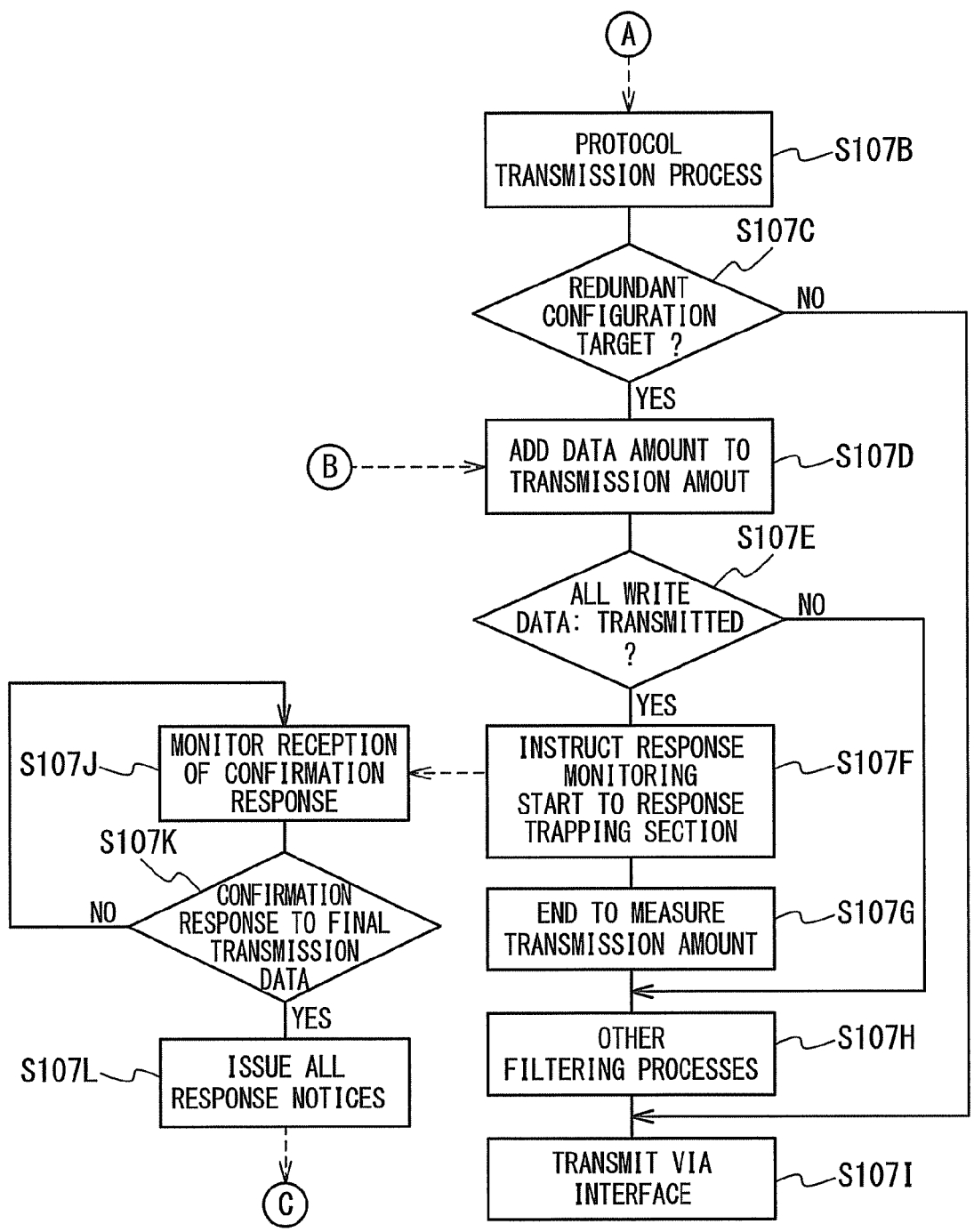
FIG. 42B is a flowchart showing an example of a process in the fifth exemplary embodiment.

FIGS. 42A and 42B show the operation of the present exemplary embodiment.

When the application program 110 calls the write API section 152, the write API call trapping section 162 executes a redundancy process prior to actually calling the write API section 152 (step S1071). The redundancy process is followed by a further process which is executed prior to the writing process.

First, the write API call trapping section 162 checks whether or not remaining data is present in the protocol transmission buffer 1020, or whether or not the protocol transmission buffer 1020 is empty, by using the transmission buffer monitoring section 1066 (step S1072). If there is the remaining data (NO at step S1072), the transmission is ended to wait for the remaining data to disappear (step S1073).

An inspection of the remaining data is generally carried out by polling the protocol transmission buffer 1020 in a predetermined interval, but if the predetermined interval is shortened for quality improvement, frequent inspections are required and computing resources are wasted. It may take a long time to make the protocol transmission buffer 1020 empty, so that such monitoring is inefficient. Therefore, inspection of the remaining data is not carried out until all the response notices are received in the present exemplary embodiment.

When the all response notice receiving section 1063 receives all the response notices (step S1074), the write API call trapping section 162 instructs the transmission buffer monitoring section 1066 to start the inspection. Thus, the transmission buffer monitoring section 1066 inspects the protocol transmission buffer 1020 until the remaining data disappears (steps S1075 and S1076).

If no remaining data is detected by the transmission buffer monitoring section 1066 (YES at step S1075), the write API call trapping section 162 transmits an amount of data to be written (i.e. write amount) to the transmission side distributing filter 1062 via the write amount notifying section 1064 (step S1077). Thereafter, the write API section 152 is called to execute the writing process (steps S1078 and S107B).

When the write amount notice receiving section 10624 receives a write amount (step S1079), the transmission amount measuring section 10622 in the transmission side distributing filter 1062 starts measuring an amount of transmission data from this point of time (step S107A).

Whenever the packet to be made redundant is transferred from the protocol processing section 121 in a bottom layer, the transmission amount measuring section 10622 integrates an amount of data included therein to a transmission amount (steps S107C and S107D).

Thereafter, the transmission amount measuring section 10622 checks whether or not an integrated transmission amount is coincident with a write amount received by the write amount notice receiving section 10624 in order to determine whether or not the transmission packet transferred from the protocol processing section 121 this time is the last transmission packet to transmit the write data (step S107E).

If the transmission packet is not the last transmission packet to transmit the write data (NO at step S107E), the transmission amount measuring section 10622 transfers the above transmission packet to the filter processing section 10621. Therefore, the filter processing section 10612 executes the filtering process to the above transmission packet as needed, and then transmits the packet via the transmission interface 142 (steps S107H and S107I).

In contrast, if the transmission packet is the last transmission packet to transmit the write data (YES at step S107E), the transmission amount measuring section 10622 outputs to the response trapping section 10612, a confirmation response monitor instruction which instructs to trap a confirmation response packet transmitted from the counter apparatus to the above last transmission packet (step S107F). It should be noted that the confirmation response monitor instruction includes the sequence number of the above last packet. Thereafter, the transmission amount measuring section 10622 ends a process to measure the transmission amount to transfer the above last packet to the filter processing section 10621 (step S107G). The filter processing section 10621 therefore executes the filtering process as needed, and then transmits the last transmission packet via the transmission interface 142 (steps S107H and S107I).

Meanwhile, when a confirmation response monitor instruction is supplied from the transmission amount measuring section 10622, the response trapping section 10612 checks whether or not the received confirmation response packet is issued for the last transmission packet whenever the confirmation response packet in connection with measurement of a transmission amount is received (steps S107J and S107K). More specifically, it is checked whether or not a confirmation response number included in the received confirmation response packet is coincident with the sequence number included in the confirmation response monitor instruction in order to determine whether or not the confirmation response packet is issued for the last transmission packet.

If the confirmation response packet is not issued for the last transmission packet (NO at step S107K), the response trapping section 10612 waits for receiving the next confirmation response packet to execute a process similar to the aforementioned process (step S107J).

In contrast, if the confirmation response packet is issued for the last transmission packet (YES at step S107K), entire data to be transmitted which is stored in the protocol transmission buffer 1020 is assumed to be confirmed and responded by the counter apparatus, which means that the protocol transmission buffer 1020 is empty, so that the response trapping section 10612 notifies this state to the all response notifying section 10623. The all response notifying section 10623 therefore issues all the response notices to the whole response notice receiving section 1063 (step S107L).

When the all response notice receiving section 1063 receives all the response notices (step S1074), the write API call trapping section 162 waits for the protocol transmission buffer 1020 to become empty (steps S1075 and S1076), and executes the afore-mentioned process at the step S1077 and the processes thereafter when the protocol transmission buffer 1020 becomes empty.

As described above, the data is always written when the protocol transmission buffer 1020 is empty in the present exemplary embodiment, whereby a plurality of transmission data to be written cannot be included in a single packet and transmitted, creating no deviation in the boundary of transmission data when it is packetized in the current use system and the backup system.

The invention claimed is:

1. A cluster system comprising a plurality of cluster members,
    wherein each of said plurality of cluster members comprises a processor and a memory comprising:
    a protocol processing section configured to execute a protocol process;
    a communication API section configured to read data from said protocol processing section and write data in said protocol processing section depending on a kind of call; and
    a trapping section configured to trap a call to said communication API section from an application program operating on a self cluster member to call said communication API section instead of the application program, to execute a process determined depending on the kind of the call, to the data read from said protocol processing section by said communication API section based on the call or the data written into said protocol processing section by said communication API section based on the call, and to execute a process determined based on a kind of a data transmitted from another cluster member to the transmitted data,
    each of said plurality of cluster members is operable independently and individually to execute a communication process via an API section in an application process and a protocol process.

2. A cluster system comprising a plurality of cluster members connected by a network to each other and operable independently and individually,
    wherein each of said plurality of cluster members operating as a current use system comprises a processor and a memory comprising:
    a current use system protocol processing section configured to execute a protocol process;
    a current use system communication API section configured to read a data from said current use system protocol processing section in response to a read call and to write a data in said current use system protocol processing section in response to a write call;
    a current use system call trapping section configured to trap the read call or the write call from an application program operating on said self cluster member, to carry out the read call to said current use system communication API section instead of the application program when the read call is trapped, to transfer the data read from said current use system protocol processing section by said current use system communication API section in response to the read call to the application program, and to carry out the write call to said current use system communication API section instead of the application program when the write call is trapped; and
    a current use system transferring section configured to transfer a replica data of a write data to one cluster member of a backup system when said current use system call trapping section traps the write call, and
    at least one of said plurality of cluster members operating as the backup system, comprises:
    a backup system protocol processing section configured to execute the protocol process;
    a backup system communication API section configured to read a data from said backup system protocol processing section in response to a read call and to write a data in said backup system protocol processing section in response to a write call;
    a backup system writing section configured to carry out the write call to said backup system communication API section when the replica data is transferred from said current use system transferring section such that the replica data is written in said backup system protocol processing section; and
    a discarding section configured to discard a reception data and a transmission data subjected to a protocol process by said backup system protocol processing section.

3. The cluster system according to claim 2, wherein said current use system transferring section transmits a replica data of a read data read from said current use system protocol processing section by said current use system communication API section to the cluster member of the backup system of said self cluster member,
    the cluster member operating as said backup system comprises a backup system collating section configured to collate the replica data of the read data transmitted from said current use system and the data received through said backup system protocol processing section and to notify a collation result to the cluster member as a transmission source of the replica data, and
    said current use system call trapping section discards the data read from said current use system protocol processing section by said current use system communication API section when the collation result notified from said backup system collating section indicates a non-coincidence.

4. The cluster system according to claim 3, wherein said backup system writing section notifies to the cluster member as the transmission source of the replica data, a write result indicating whether or not a protocol process to the replica data of the write data is ended normally in said backup system protocol processing section, and
    said current use system call trapping section discards the write data instructed to write by the write call, when the write result notified from said backup system writing section indicates an abnormal end.

5. The cluster system according to claim 2, wherein said backup system cluster member comprises a transmission notice transmitting section configured to transmit a transmission notice indicating a transmission packet subjected to the protocol process by said backup system protocol processing section to said current use system cluster member, and
    said current use system cluster member comprises:
    a confirmation response buffer; and
    a reception packet control section configured to store a confirmation response in the confirmation response buffer under a condition that the transmission notice indicating the transmission packet is not transmitted from said backup system cluster member, and to transmit the confirmation response to said backup system cluster member under a condition that the confirmation response to the transmission packet indicating the transmission notice is stored in said confirmation response buffer when the transmission notice is transmitted from said backup system cluster member.

6. The cluster system according to claim 5, wherein the transmission notice contains a sequence number of the transmission packet subjected to the protocol process by said backup system protocol processing section, and
said current use system cluster member comprises:
a backup system transmission history storage section; and
a transmission notice receiving section configured to store the sequence number contained in the transmission notice which is transmitted from said backup system cluster member in said backup system transmission history storage section, and
said reception packet control section stores the confirmation response in the confirmation response buffer under a condition that the sequence number has not been stored in said backup system communication history storage section, and transmits the confirmation response to said backup system cluster member under a condition that the confirmation response corresponding to the sequence number has been stored in said confirmation response buffer when the sequence number is stored in said backup system transmission history storage section.

7. The cluster system according to claim 2, wherein said backup system cluster member comprises a reception notice transmitting section configured to transmit a reception notice indicating a received packet, to said current use system cluster member, and
said current use system cluster member comprises:
a reception packet buffer; and
a reception packet control section configured to store a packet in said reception packet buffer under a condition that the reception notice indicating the packet is not transmitted from said backup system cluster member when receiving the packet, and to transmit the packet received previously to said backup system cluster member under a condition that the packet received previously to a packet which the reception notice indicates is stored in said reception packet buffer when the reception notice is transmitted from said backup system cluster member.

8. The cluster system according to claim 7, wherein the reception notice contains the identifier of the received packet,
said current use system cluster member comprises:
a backup system reception history storage section; and
a reception notice receiving section configured to store the identifier contained in the reception notice transmitted from said backup system cluster member in said backup system reception history storage section, and
said reception packet control section stores the packet in said reception packet buffer under a condition that the identifier of the packet has not been stored in said backup system reception history storage section when receiving the packet, and transmits the packet received previously to said backup system cluster member under a condition that the packet received previously to the packet which the reception notice indicates, is stored in said reception packet buffer when the identifier of the packet has been stored in said backup system reception history storage section.

9. The cluster system according to claim 5, wherein each of said current use system cluster member and said backup system cluster member monitors a transmission buffer of the protocol process and delays a next writing process until said transmission buffer becomes empty.

10. A cluster system comprising a plurality of cluster members,
wherein each of said plurality of cluster members comprises a processor and a memory comprising:
a protocol processing section configured to execute a protocol process;
a reception side distributing filter configured to transfer the reception packet to said protocol processing section when determining that the reception packet is the reception packet to be processed in said self cluster member, based on a predetermined protocol processing distribution rule;
a communication API section configured to read a data from said protocol processing section in response to a read call and to write a write data in said protocol processing section in response to a write call;
a call trapping section configured to trap the read call or the write call from an application program operating on a self cluster member, to carry out the read call to said communication API section instead of the application program when trapping the read call, to transfer a reception data to the application program when a data read from said protocol processing section by said communication API section in response to the read call is the reception data from another cluster member, to transfer a transmission data to said protocol processing section when being the transmission data from another cluster member, to transfer the data to an application process distributing section in a case other than the above cases, and to transfer the transmission data instructed by the trapped write call to a protocol process distributing section when trapping the write call;
said application process distributing section configured to determine the cluster member in charge of an application process to the data transferred from said call trapping section based on a predetermined application process distribution rule, to transfer the data to the application program operating on said self cluster member when the determined cluster member is said self cluster member, and to transfer the data to a transferring section when the determined cluster member is another cluster member;
said protocol process distributing section configured to determine the cluster member in charge of a protocol process to the data transferred from said call trapping section based on a predetermined protocol process distribution rule, to transfer the data to the protocol processing section on said self cluster member when the determined cluster member is said self cluster member, and to transfer the data to said transferring section when the determined cluster member is another cluster member; and
said transferring section configured to transmit the data transferred from said application process distributing section and said protocol process distributing section to the other cluster member.

11. The cluster system according to claim 10, wherein the application process distribution rule is based on a hash value of an application data, and
the protocol process distribution rule is based on a hash value calculated from a parameter of a header of the packet.

12. A cluster system comprising a plurality of cluster members, each of the plurality of cluster members comprising a processor and a memory, wherein a traffic is distributed by picking up a portion in charge by a self cluster member from traffic broadcasted to all of said plurality of cluster members and discarding a remaining portion, (a) a reception side distributing filter configured to hold a calculation rule used to calculate an integer value from a predetermined section of a packet and an integer value allocated to said self cluster member is provided between a reception interface and a protocol processing section of each cluster member, said reception side distributing filter calculates the integer value for every packet by using the calculation rule, and transfers the packet to a receiving process of said protocol processing section only when the calculation result is equal to the allocated integer value, an identical value is allocated to said reception side distributing filters of a current use system and a backup system, distribution of the traffic and a redundant process of a protocol process are made possible by allocating a set of integer values as the calculation results obtained based on the calculation rule to said plurality of cluster members with no space, (b) a distributing and redundancy processing section configured to hold a calculation rule used to calculate an integer value from an application data contained in the reception packet and a distribution rule as a list of integer values allocated to said plurality of cluster members is provided between the application program and the protocol processing section of each cluster member, said distributing and redundancy processing section transfers a data to the cluster member allocated with the integer value which is calculated from the reception data based on the distribution rule, such that a reading process of the data is executed when the application program of the destination cluster member executes the reading process, said distributing and redundancy processing section holds the calculation rule used to calculate an integer value by using the same rule as said reception side distributing filter from header information used for a transmitting process of the data written by the application program and the list of the integer values allocated for all of said plurality of cluster members, calculates the integer value based on the calculation rule used for the data written by the application program, transfers a write data to a plurality of cluster members allocated with the integer value, and make allocation of the cluster members to the application process and a redundant protocol process controllable independently, and (c) a transmission side packet filter configured to discard a packet processed as a backup system cluster member is provided between a transmission side interface and said protocol processing section of each of said plurality of cluster members.

13. A server cluster comprising a plurality of cluster members, wherein each of said plurality of cluster members comprises a processor and a memory comprising:

a protocol processing section configured to execute a protocol process;

a communication API section configured to read data from said protocol processing section and write data in said protocol processing section depending on a kind of call; and a trapping section configured to trap a call to said communication API section from an application program operating on a self cluster member to call said communication API section instead of the application program, to execute a process determined depending on the kind of the call, to the data read from said protocol processing section by said communication API section based on the call or the data written into said protocol processing section by said communication API section based on the call, and to execute a process determined based on a kind of a data transmitted from another cluster member to the transmitted data, each of said plurality of cluster members is operable independently and individually to execute a communication process via an API section in an application process and a protocol process.

14. A server cluster comprising a plurality of cluster members connected by a network to each other and operable independently and individually, wherein each of said plurality of cluster members operating as a current use system comprises a processor and a memory comprising:

a current use system protocol processing section configured to execute a protocol process;

a current use system communication API section configured to read a data from said current use system protocol processing section in response to a read call and to write a data in said current use system protocol processing section in response to a write call;

a current use system call trapping section configured to trap the read call or the write call from an application program operating on said self cluster member, to carry out the read call to said current use system communication API section instead of the application program when the read call is trapped, to transfer the data read from said current use system protocol processing section by said current use system communication API section in response to the read call to the application program, and to carry out the write call to said current use system communication API section instead of the application program when the write call is trapped; and a current use system transferring section configured to transfer a replica data of a write data to one cluster member of a backup system when said current use system call trapping section traps the write call, and at least one of said plurality of cluster members operating as the backup system, comprises:

a backup system protocol processing section configured to execute the protocol process;

a backup system communication API section configured to read a data from said backup system protocol processing section in response to a read call and to write a data in said backup system protocol processing section in response to a write call;

a backup system writing section configured to carry out the write call to said backup system communication API section when the replica data is transferred from said current use system transferring section such that the replica data is written in said backup system protocol processing section; and a discarding section configured to discard a reception data and a transmission data subjected to a protocol process by said backup system protocol processing section.

15. The server cluster according to claim 14, wherein said current use system transferring section transmits a replica data of a read data read from said current use system protocol processing section by said current use system communication API section to the cluster member of the backup system of said self cluster member, the cluster member operating as said backup system comprises a backup system collating section configured to collate the replica data of the read data transmitted from said current use system and the data received through said backup system protocol processing section and to notify a collation result to the cluster member as a transmission source of the replica data, and said current use system call trapping section discards the data read from said current use system protocol processing section by said current use system communication API section when the collation result notified from said backup system collating section indicates a non-coincidence.

16. The server cluster according to claim 15, wherein said backup system writing section notifies to the cluster member as the transmission source of the replica data, a write result indicating whether or not a protocol process to the replica data of the write data is ended normally in said backup system protocol processing section, and said current use system call trapping section discards the write data instructed to write by the write call, when the write result notified from said backup system writing section indicates an abnormal end.

17. The server cluster according to claim 14, wherein said backup system cluster member comprises a transmission notice transmitting section configured to transmit a transmission notice indicating a transmission packet subjected to the protocol process by said backup system protocol processing section to said current use system cluster member, and said current use system cluster member comprises:
a confirmation response buffer; and
a reception packet control section configured to store a confirmation response in the confirmation response buffer under a condition that the transmission notice indicating the transmission packet is not transmitted from said backup system cluster member, and to transmit the confirmation response to said backup system cluster member under a condition that the confirmation response to the transmission packet indicating the transmission notice is stored in said confirmation response buffer when the transmission notice is transmitted from said backup system cluster member.

18. The server cluster according to claim 17, wherein the transmission notice contains a sequence number of the transmission packet subjected to the protocol process by said backup system protocol processing section, and said current use system cluster member comprises:
a backup system transmission history storage section; and
a transmission notice receiving section configured to store the sequence number contained in the transmission notice which is transmitted from said backup system cluster member in said backup system transmission history storage section, and said reception packet control section stores the confirmation response in the confirmation response buffer under a condition that the sequence number has not been stored in said backup system communication history storage section, and transmits the confirmation response to said backup system cluster member under a condition that the confirmation response corresponding to the sequence number has been stored in said confirmation response buffer when the sequence number is stored in said backup system transmission history storage section.

19. The server cluster according to claim 14, wherein said backup system cluster member comprises a reception notice transmitting section configured to transmit a reception notice indicating a received packet, to said current use system cluster member, and said current use system cluster member comprises:
a reception packet buffer; and
a reception packet control section configured to store a packet in said reception packet buffer under a condition that the reception notice indicating the packet is not transmitted from said backup system cluster member when receiving the packet, and to transmit the packet received previously to said backup system cluster member under a condition that the packet received previously to a packet which the reception notice indicates is stored in said reception packet buffer when the reception notice is transmitted from said backup system cluster member.

20. The server cluster according to claim 19, wherein the reception notice contains the identifier of the received packet, said current use system cluster member comprises:
a backup system reception history storage section; and
a reception notice receiving section configured to store the identifier contained in the reception notice transmitted from said backup system cluster member in said backup system reception history storage section, and said reception packet control section stores the packet in said reception packet buffer under a condition that the identifier of the packet has not been stored in said backup system reception history storage section when receiving the packet, and transmits the packet received previously to said backup system cluster member under a condition that the packet received previously to the packet which the reception notice indicates, is stored in said reception packet buffer when the identifier of the packet has been stored in said backup system reception history storage section.

21. The server cluster according to claim 17, wherein each of said current use system cluster member and said backup system cluster member monitors a transmission buffer of the protocol process and delays a next writing process until said transmission buffer becomes empty.

22. A server cluster comprising a plurality of cluster members, wherein each of said plurality of cluster members comprises a processor and a memory comprising:
a protocol processing section configured to execute a protocol process;
a reception side distributing filter configured to transfer the reception packet to said protocol processing section when determining that the reception packet is the reception packet to be processed in said self cluster member, based on a predetermined protocol processing distribution rule;
a communication API section configured to read a data from said protocol processing section in response to a read call and to write a write data in said protocol processing section in response to a write call;
a call trapping section configured to trap the read call or the write call from an application program operating on a self cluster member, to carry out the read call to said communication API section instead of the application program when trapping the read call, to transfer a reception data to the application program when a data read from said protocol processing section by said communication API section in response to the read call is the reception data from another cluster member, to transfer a transmission data to said protocol processing section when being the transmission data from another cluster member, to transfer the data to an application process distributing section in a case other than the above cases, and to transfer the transmission data instructed by the trapped write call to a protocol process distributing section when trapping the write call;

said application process distributing section configured to determine the cluster member in charge of an application process to the data transferred from said call trapping section based on a predetermined application process distribution rule, to transfer the data to the application program operating on said self cluster member when the determined cluster member is said self cluster member, and to transfer the data to a transferring section when the determined cluster member is another cluster member;

said protocol process distributing section configured to determine the cluster member in charge of a protocol process to the data transferred from said call trapping section based on a predetermined protocol process distribution rule, to transfer the data to the protocol processing section on said self cluster member when the determined cluster member is said self cluster member, and to transfer the data to said transferring section when the determined cluster member is another cluster member; and said transferring section configured to transmit the data transferred from said application process distributing section and said protocol process distributing section to the other cluster member.

23. The server cluster according to claim 22, wherein the application process distribution rule is based on a hash value of an application data, and the protocol process distribution rule is based on a hash value calculated from a parameter of a header of the packet.

24. A server cluster comprising a plurality of cluster members, each of the plurality of cluster members comprising a processor and a memory, wherein a traffic is distributed by picking up a portion in charge by a self cluster member from the traffic broadcasted to all of said plurality of cluster members and discarding a remaining portion, a transmission side distributing filter and a reception side distributing filter configured to hold a calculation rule used to calculate an integer value from a predetermined section of a packet and an integer value allocated to said self cluster member are provided between a transmission interface and a reception interface and a protocol processing section of each cluster member, said reception side distributing filter calculates the integer value for every packet by using the calculation rule, and transfers the packet to a receiving process of said protocol processing section only when the calculation result is equal to the allocated integer value, said transmission side distributing filter calculates the integer value for every packet transferred from said protocol processing section by using the calculation rule, and transfers the packet to said transmission interface only when the calculation result is equal to the allocated integer value, an identical value is allocated to said reception side distributing filters of a current use system and a backup system, and a redundant process is made possible by distributing the value to said transmission side distributing filter of said current use system, and distribution of the traffic and the redundant process of a protocol process are made possible by allocating a set of integer values as the calculation results obtained based on the calculation rule to said plurality of cluster members with no space.

25. A cluster member comprises a processor and a memory comprising:

a protocol processing section configured to execute a protocol process;

a communication API section configured to read data from said protocol processing section and write data in said protocol processing section depending on a kind of call; and a trapping section configured to trap a call to said communication API section from an application program operating on a self cluster member to call said communication API section instead of the application program, to execute a process determined depending on the kind of the call, to the data read from said protocol processing section by said communication API section based on the call or the data written into said protocol processing section by said communication API section based on the call, and to execute a process determined based on a kind of a data transmitted from another cluster member to the transmitted data, each of said plurality of cluster members is operable independently and individually to execute a communication process via an API section in an application process and a protocol process.

26. A cluster member which is operable independently and individually, comprising a processor and a memory comprising:

a current use system protocol processing section configured to execute a protocol process;

a current use system communication API section configured to read a data from said current use system protocol processing section in response to a read call and to write a data in said current use system protocol processing section in response to a write call;

a current use system call trapping section configured to trap the read call or the write call from an application program operating on said self cluster member, to carry out the read call to said current use system communication API section instead of the application program when the read call is trapped, to transfer the data read from said current use system protocol processing section by said current use system communication API section in response to the read call to the application program, and to carry out the write call to said current use system communication API section instead of the application program when the write call is trapped; and a current use system transferring section configured to transfer a replica data of a write data to one cluster member of a backup system when said current use system call trapping section traps the write call.

27. The cluster member according to claim 26, wherein said current use system transferring section transmits a replica data of a read data read from said current use system protocol processing section by said current use system communication API section to the cluster member of the backup system of said self cluster member, and said current use system call trapping section discards the data read from said current use system protocol processing section by said current use system communication API section when a collation result notified from a backup system collating section indicates a non-coincidence.

28. The cluster member according to claim 27, wherein said current use system call trapping section discards the write data instructed to write by the write call, when the write result notified from a backup system writing section indicates an abnormal end.

29. The cluster member according to claim 26, further comprising:

a confirmation response buffer; and a reception packet control section configured to store a confirmation response in the confirmation response buffer under a condition that the transmission notice indicating the transmission packet is not transmitted from said backup system cluster member and to transmit the confirmation response to said backup system cluster member under a condition that the confirmation response to the transmission packet indicating the transmission notice is stored in said confirmation response buffer when the transmission notice is transmitted from said backup system cluster member.

30. The cluster member according to claim 26, further comprising:
a backup system transmission history storage section;
a transmission notice receiving section configured to store the sequence number contained in the transmission notice which is transmitted from said backup system cluster member in said backup system transmission history storage section; and
a reception packet control section configured to store the confirmation response in the confirmation response buffer under a condition that the sequence number has not been stored in said backup system communication history storage section, and to transmit the confirmation response to said backup system cluster member under a condition that the confirmation response corresponding to the sequence number has been stored in said confirmation response buffer when the sequence number is stored in said backup system transmission history storage section.

31. The cluster member according to claim 26, further comprising:
a reception packet buffer; and
a reception packet control section configured to store a packet in said reception packet buffer under a condition that the reception notice indicating the packet is not transmitted from said backup system cluster member when receiving the packet, and to transmit the packet received previously to said backup system cluster member under a condition that the packet received previously to a packet which the reception notice indicates is stored in said reception packet buffer when the reception notice is transmitted from said backup system cluster member.

32. The cluster member according to claim 26, further comprising:
a backup system reception history storage section;
a reception notice receiving section configured to store the identifier contained in the reception notice transmitted from said backup system cluster member in said backup system reception history storage section; and
a reception packet control section configured to store the packet in said reception packet buffer under a condition that the identifier of the packet has not been stored in said backup system reception history storage section when receiving the packet, and to transmit the packet received previously to said backup system cluster member under a condition that the packet received previously to the packet which the reception notice indicates, is stored in said reception packet buffer when the identifier of the packet has been stored in said backup system reception history storage section.

33. The cluster member according to claim 29, wherein a transmission buffer of the protocol process is monitored and a next writing process is delayed until said transmission buffer becomes empty.

34. A cluster member which is operable independently and individually, comprising a processor and a memory comprising:
a backup system protocol processing section configured to execute a protocol process;
a backup system communication API section configured to read a data from said backup system protocol processing section in response to a read call and to write a write data in said backup system protocol processing section in response to a write call;
an application program which calls said backup system communication API section to execute communication;
a backup system writing section configured to carry out the write call to said backup system communication API section when the replica data is transferred from said current use system cluster member such that the replica data is written in said backup system protocol processing section; and
a discarding section configured to discard a reception data and a transmission data which are subjected to a protocol process by said backup system protocol processing section,
wherein said backup system writing section and said discarding section are provided between said backup system communication API section and said application program.

35. The cluster member according to claim 34, further comprising:
a backup system collating section configured to collate the replica data of the read data transmitted from a current use system cluster member and the data received through said backup system protocol processing section and to notify a collation result to the cluster member as a transmission source of the replica data.

36. The cluster member according to claim 35, wherein said backup system writing section notifies to the cluster member as the transmission source of the replica data, a write result indicating whether or not a protocol process to the replica data of the write data is ended normally in said backup system protocol processing section.

37. The cluster member according to claim 34, further comprising:
a transmission notice transmitting section configured to transmit a transmission notice indicating a transmission packet subjected to the protocol process by said backup system protocol processing section to said current use system cluster member.

38. The cluster member according to claim 34, further comprising:
a reception notice transmitting section configured to transmit a reception notice indicating a received packet, to said current use system cluster member.

39. The cluster member according to claim 37, wherein said backup system cluster member monitors a transmission buffer of the protocol process and delays a next writing process until said transmission buffer becomes empty.

40. A cluster member comprises a processor and a memory comprising:
a protocol processing section configured to execute a protocol process;
a reception side distributing filter configured to transfer the reception packet to said protocol processing section when determining that the reception packet is the reception packet to be processed in said self cluster member, based on a predetermined protocol processing distribution rule;
a communication API section configured to read a data from said protocol processing section in response to a read call and to write a write data in said protocol processing section in response to a write call;
a call trapping section configured to trap the read call or the write call from an application program operating on a self cluster member, to carry out the read call to said communication API section instead of the application program when trapping the read call, to transfer a reception data to the application program when a data read from said protocol processing section by said communication API section in response to the read call is the reception data from another cluster member, to transfer a transmission data to said protocol processing section when being the transmission data from another cluster member, to transfer the data to an application process distributing section in a case other than the above cases, and to transfer the transmission data instructed by the trapped write call to a protocol process distributing section when trapping the write call;

said application process distributing section configured to determine the cluster member in charge of an application process to the data transferred from said call trapping section based on a predetermined application process distribution rule, to transfer the data to the application program operating on said self cluster member when the determined cluster member is said self cluster member, and to transfer the data to a transferring section when the determined cluster member is another cluster member;

said protocol process distributing section configured to determine the cluster member in charge of a protocol process to the data transferred from said call trapping section based on a predetermined protocol process distribution rule, to transfer the data to the protocol processing section on said self cluster member when the determined cluster member is said self cluster member, and to transfer the data to said transferring section when the determined cluster member is another cluster member; and said transferring section configured to transmit the data transferred from said application process distributing section and said protocol process distributing section to the other cluster member.

41. The cluster member according to claim 40, wherein the application process distribution rule is based on a hash value of an application data, and the protocol process distribution rule is based on a hash value calculated from a parameter of a header of the packet.

42. A cluster member comprises a processor and a memory comprising:

a reception side distributing filter provided between a transmission and reception interface and a protocol processing section and configured to hold a calculation rule used to calculate an integer value from a predetermined section of a packet and an integer value allocated to said cluster member itself, wherein said reception side distributing filter calculates the integer value for every packet by using the calculation rule, and transfers the packet to a receiving process of said protocol processing section only when the calculation result is equal to the allocated integer value, said transmission side distributing filter calculates the integer value for every packet transferred from said protocol processing section by using the calculation rule, such that the packet is transmitted from said transmission interface, only when the calculation result is equal to the allocated integer value, an identical value is allocated to said reception side distributing filters of a current use system and a backup system, and the value is allocated to said current use system transmission side distributing filter to allow a redundancy process, and distribution of a traffic and the redundant process are made possible by allocating a set of integer values as the calculation results obtained based on the calculation rule to a plurality of cluster members with no space.

43. A method of making a cluster member redundant, wherein said cluster member is operable independently and individually, said method comprising:

a current use system call trapping step in which a current use system cluster member operating as a current system traps the read call or the write call from an application program operating on said cluster member itself, carries out the read call to said current use system communication API section instead of the application program when the read call is trapped, transfers the data read from said current use system protocol processing section by said current use system communication API section in response to the read call to the application program, and carries out the write call to said current use system communication API section instead of the application program when the write call is trapped;

a current use system transferring step in which said current use system cluster member transfers a replica data of a write data to one cluster member of a backup system to said cluster member itself when the write call is trapped in said current use system call trapping step; and a backup system writing step in which a backup system cluster member operating as a backup system carries out the write call to said backup system communication API section when the replica data is transferred from said current use system cluster member such that the replica data is written in a backup system protocol processing section; and an application program which calls said backup system communication API section to execute communication;

a discarding step in which said backup system cluster member discards a reception data and a transmission data subjected to a protocol process by said backup system protocol processing section, wherein said backup system writing step and said discarding step are provided between said backup system communication API section and said application program.

44. The method of making a cluster member redundant according to claim 43, further comprising:

a transmission notice transmitting step in which said backup system cluster member transmits a transmission notice indicating a transmission packet subjected to the protocol process by said backup system protocol processing section to said current use system cluster member; and a reception packet control step in which said current use system cluster member stores a confirmation response in a confirmation response buffer under a condition that the transmission notice indicating the transmission packet is not transmitted from said backup system cluster member, and transmits the confirmation response to said backup system cluster member under a condition that the confirmation response to the transmission packet indicating the transmission notice is stored in said confirmation response buffer when the transmission notice is transmitted from said backup system cluster member.

45. The method of making a cluster member redundant according to claim 43, further comprising:

a reception notice transmitting step in which said backup system cluster member transmits a reception notice indicating a received packet, to said current use system cluster member; and a reception packet control section in which said current use system cluster member stores a packet in a reception packet buffer under a condition that the reception notice indicating the packet is not transmitted from said backup system cluster member when receiving the packet, and transmits the packet received previously to said backup system cluster member under a condition that the packet received previously to a packet which the reception notice indicates is stored in said reception packet buffer when the reception notice is transmitted from said backup system cluster member.

46. The method of making a cluster member redundant according to claim 44, further comprising:
- a current use system side delaying step in which said current use system cluster member monitors a transmission buffer of the protocol process and delays a next writing process until said transmission buffer becomes empty, and
- a backup system side delaying step in which said backup system cluster member monitors a transmission buffer of the protocol process and delays a next writing process until said transmission buffer becomes empty.

47. A load balancing method comprising:
- a reception side distributing step in which a cluster member transfers a reception packet to a protocol processing section when determining that the reception packet is a reception packet to be processed in said cluster member itself, based on a predetermined protocol processing distribution rule;
- a call trapping step in which said cluster member traps a read call or a write call from an application program operating on said cluster member, carries out the read call to a communication API section instead of the application program when the read call is trapped, transfers the reception data to the application program when a data read from said protocol processing section by said communication API section in response to the read call is the reception data from another cluster member, transfers a transmission data to said protocol processing section when being the transmission data from another cluster member, transfers the data to an application process distributing step in a case other than the above cases, and transfers the transmission data instructed by the trapped write call to a protocol process distributing step when the write call is trapped;
- said application process distributing step in which said cluster member determines a cluster member in charge of an application process to the data transferred from said call trapping step based on a predetermined application process distribution rule, transfers the data to the application program operating on said cluster member when the determined cluster member is said cluster member, and transfers the data to a transferring step when the determined cluster member is another cluster member;
- said protocol process distributing step in which said cluster member determines the cluster member in charge of a protocol process to the data transferred from said call trapping section based on a predetermined protocol process distribution rule, transfers the data to said protocol processing section on said cluster member when the determined cluster member is said cluster member, and transfers the data to said transferring step when the determined cluster member is another cluster member; and
- said transferring step of transferring the data transferred in said application process distributing step and said protocol process distributing step to the other cluster member.

48. A load balancing method comprising a plurality of cluster members, wherein a traffic is distributed by picking up a portion in charge by a self cluster member from the traffic broadcasted to all of said plurality of cluster members and discarding a remaining portion, said load balancing method comprising:
- a transmission side distributing filter and a reception side distributing filter configured to hold a calculation rule used to calculate an integer value from a predetermined section of a packet and the integer value allocated to said self cluster member are provided between a transmission interface and a reception interface and a protocol processing section of each cluster member,
- said reception side distributing filter calculates the integer value for every packet by using the calculation rule, and transfers the packet to a receiving process of said protocol processing section only when the calculation result is equal to the allocated integer value,
- said transmission side distributing filter calculates the integer value for every packet transferred from said protocol processing section by using the calculation rule, and transfers the packet to said transmission interface only when the calculation result is equal to the allocated integer value,
- an identical value is allocated to said reception side distributing filters of a current use system and a backup system, and a redundant process is made possible by distributing the value to said transmission side distributing filter of only said current use system, and
- distribution of the traffic and the redundant process of a protocol process are made possible by allocating a set of integer values as the calculation results obtained based on the calculation rule to said plurality of cluster members with no space.

49. A non-transitory computer readable recording medium in which a computer executable program code is recorded for making a computer to function as:
- a protocol processing section configured to execute a protocol process;
- a communication API section configured to read data from said protocol processing section and write data in said protocol processing section depending on a kind of call; and
- a trapping section configured to trap a call to said communication API section from an application program operating on a self cluster member to call said communication API section instead of the application program, to execute a process determined depending on the kind of the call, to the data read from said protocol processing section by said communication API section based on the call or the data written into said protocol processing section by said communication API section based on the call, and to execute a process determined based on a kind of a data transmitted from another cluster member to the transmitted data,
- each of said plurality of cluster members is operable independently and individually to execute a communication process via an API section in an application process and a protocol process.

50. A non-transitory computer readable recording medium in which a computer executable program code is recorded for making a computer to function as:

a current use system protocol processing section configured to execute a protocol process;

a current use system communication API section configured to read a data from said current use system protocol processing section in response to a read call and to write a data in said current use system protocol processing section in response to a write call;

a current use system call trapping section configured to trap the read call or the write call from an application program operating on said self cluster member, to carry out the read call to said current use system communication API section instead of the application program when the read call is trapped, to transfer the data read from said current use system protocol processing section by said current use system communication API section in response to the read call to the application program, and to carry out the write call to said current use system communication API section instead of the application program when the write call is trapped; and a current use system transferring section configured to transfer a replica data of a write data to one cluster member of a backup system when said current use system call trapping section traps the write call.

51. The recording medium according to claim 50, wherein said current use system transferring section transmits a replica data of a read data read from said current use system protocol processing section by said current use system communication API section to the cluster member of the backup system of said self cluster member, and said current use system call trapping section discards the data read from said current use system protocol processing section by said current use system communication API section when the collation result notified from said backup system collating section indicates a non-coincidence.

52. The recording medium according to claim 51, wherein said current use system call trapping section discards the write data instructed to write by the write call, when the write result notified from a backup system writing section indicates an abnormal end.

53. The recording medium according to claim 50, wherein said computer comprises a confirmation response buffer, and said computer is made to function as a reception packet control section configured to store a confirmation response in the confirmation response buffer under a condition that the transmission notice indicating the transmission packet is not transmitted from said backup system cluster member, and to transmit the confirmation response to said backup system cluster member under a condition that the confirmation response to the transmission packet indicating the transmission notice is stored in said confirmation response buffer when the transmission notice is transmitted from said backup system cluster member.

54. The recording medium according to claim 50, wherein said computer comprises a backup system transmission history storage section, and said computer is made to function as a reception packet control section configured to store a packet in said reception packet buffer under a condition that the reception notice indicating the packet is not transmitted from said backup system cluster member when receiving the packet, and to transmit the packet received previously to said backup system cluster member under a condition that the packet received previously to a packet which the reception notice indicates is stored in said reception packet buffer when the reception notice is transmitted from said backup system cluster member.

55. The recording medium according to claim 53, wherein said computer is made to function as a delay section configured to monitor a transmission buffer of the protocol process is monitored and to delay a next writing process until said transmission buffer becomes empty.

56. A non-transitory computer readable recording medium in which a computer executable program code is recorded for making a computer to function as:

a backup system protocol processing section configured to execute a protocol process;

a backup system communication API section configured to read a data from said backup system protocol processing section in response to a read call and to write a write data in said backup system protocol processing section in response to a write call;

a backup system writing section configured to carry out the write call to said backup system communication API section when the replica data is transferred from said current use system cluster member such that the replica data is written in said backup system protocol processing section;

an application program which calls said backup system communication API section to execute communication; and a discarding section configured to discard a reception data and a transmission data which are subjected to a protocol process by said backup system protocol processing section, wherein said backup system writing section and said discarding section are provided between said backup system communication API section and said application program.

57. The recording medium according to claim 56, wherein said computer is made to function as a backup system collating section configured to collate the replica data of the read data transmitted from a current use system cluster member and the data received through said backup system protocol processing section and to notify a collation result to the cluster member as a transmission source of the replica data.

58. The recording medium according to claim 57, wherein said backup system writing section notifies to the cluster member as the transmission source of the replica data, a write result indicating whether or not a protocol process to the replica data of the write data is ended normally in said backup system protocol processing section.

59. The recording medium according to claim 56, wherein said computer is made to function as a transmission notice transmitting section configured to transmit a transmission notice indicating a transmission packet subjected to the protocol process by said backup system protocol processing section to said current use system cluster member.

60. The recording medium according to claim 56, wherein said computer is made to function as a reception notice transmitting section configured to transmit a reception notice indicating a received packet, to said current use system cluster member.

61. The recording medium according to claim 59, wherein said computer is made to function as a delay section monitors a transmission buffer of the protocol process and delays a next writing process until said transmission buffer becomes empty.

62. A non-transitory computer readable recording medium in which a computer executable program code is recorded for making a computer to function as:

a protocol processing section configured to execute a protocol process;

a reception side distributing filter configured to transfer the reception packet to said protocol processing section when determining that the reception packet is the reception packet to be processed in said self cluster member, based on a predetermined protocol processing distribution rule;

a communication API section configured to read a data from said protocol processing section in response to a read call and to write a write data in said protocol processing section in response to a write call;

a call trapping section configured to trap the read call or the write call from an application program operating on a self cluster member, to carry out the read call to said communication API section instead of the application program when trapping the read call, to transfer a reception data to the application program when a data read from said protocol processing section by said communication API section in response to the read call is the reception data from another cluster member, to transfer a transmission data to said protocol processing section when being the transmission data from another cluster member, to transfer the data to an application process distributing section in a case other than the above cases, and to transfer the transmission data instructed by the trapped write call to a protocol process distributing section when trapping the write call;

said application process distributing section configured to determine the cluster member in charge of an application process to the data transferred from said call trapping section based on a predetermined application process distribution rule, to transfer the data to the application program operating on said self cluster member when the determined cluster member is said self cluster member, and to transfer the data to a transferring section when the determined cluster member is another cluster member;

said protocol process distributing section configured to determine the cluster member in charge of a protocol process to the data transferred from said call trapping section based on a predetermined protocol process distribution rule, to transfer the data to the protocol processing section on said self cluster member when the determined cluster member is said self cluster member, and to transfer the data to said transferring section when the determined cluster member is another cluster member; and said transferring section configured to transmit the data transferred from said application process distributing section and said protocol process distributing section to the other cluster member.

* * * * *